US009785457B2

(12) United States Patent
Nakagawa

(10) Patent No.: US 9,785,457 B2
(45) Date of Patent: Oct. 10, 2017

(54) MULTI-TENANT SYSTEM AND CONTROL METHOD OF MULTI-TENANT SYSTEM

(71) Applicant: FUJITSU LIMITED, Kawasaki-shi, Kanagawa (JP)

(72) Inventor: Yukihiro Nakagawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 490 days.

(21) Appl. No.: 14/084,667

(22) Filed: Nov. 20, 2013

(65) Prior Publication Data

US 2014/0208317 A1 Jul. 24, 2014

(30) Foreign Application Priority Data

Jan. 23, 2013 (JP) ................................ 2013-010571

(51) Int. Cl.
*H04L 12/28* (2006.01)
*G06F 9/455* (2006.01)
(Continued)

(52) U.S. Cl.
CPC ...... *G06F 9/45533* (2013.01); *H04L 12/4633* (2013.01); *H04L 12/4641* (2013.01);
(Continued)

(58) Field of Classification Search
CPC . H04L 12/4641; H04L 12/4633; H04L 45/64; H04L 49/70; H04L 12/465;
(Continued)

(56) References Cited

U.S. PATENT DOCUMENTS

2011/0090911 A1* 4/2011 Hao .................... H04L 12/4633 370/395.53
2011/0299424 A1* 12/2011 Rikitake ............ H04L 12/4625 370/254

(Continued)

FOREIGN PATENT DOCUMENTS

JP 2002-247089 8/2002
JP 2008-227695 9/2008
JP 2011-254378 12/2011

OTHER PUBLICATIONS

Mahalingam, M. et al. "VXLAN: A Framework for Overlaying Virtualized Layer 2 Networks over Layer 3 Networks", Aug. 26, 2011, pp. 1-20. [online] [searched on Dec. 21, 2012], internet <http://tools.ietf.org/html/draft-mahalingam-dutt-dcops-vxlan-00#page-9>.

*Primary Examiner* — Alex Skripnikov
*Assistant Examiner* — Lionel Preval
(74) *Attorney, Agent, or Firm* — Fujitsu Patent Center

(57) ABSTRACT

A management device allocates a first identifier that identifies, from among tenants included in a multi-tenant system, a tenant that uses virtual machines running on the multi-tenant system. The management device performs the following process, for each terminating device, from among tenants in the multi-tenant system, on virtual machines that are running on a second network in which terminating devices are installed. Specifically, the management device allocates a second identifier that identifies a tenant that uses virtual machines running on the multi-tenant system. Furthermore, the management device creates, for each terminating device, conversion information in which the first identifier that is allocated to each of the virtual machines is associated with the second identifier. Then, the management device sets each terminating device such that a packet is
(Continued)

encapsulated in accordance with the created conversion information.

8 Claims, 30 Drawing Sheets

(51) Int. Cl.
*H04L 12/931* (2013.01)
*H04L 12/24* (2006.01)
*H04L 12/46* (2006.01)
*H04L 29/12* (2006.01)

(52) U.S. Cl.
CPC ........ *H04L 41/0803* (2013.01); *H04L 49/354* (2013.01); *H04L 61/103* (2013.01); *H04L 61/2038* (2013.01); *H04L 61/2061* (2013.01)

(58) Field of Classification Search
CPC ............... H04L 49/354; H04L 12/2602; H04L 12/4654; H04L 12/4675; H04L 45/586; H04L 49/3009; G06F 2009/45595; G06F 9/45533; G06F 9/45558
USPC ...... 370/389, 392, 254; 718/1; 709/217, 223
IPC .......... G06F 9/45533; H04L 12/4633,12/4641, 61/103, 61/2038, 61/2061, 41/0803, 49/354
See application file for complete search history.

(56) References Cited

U.S. PATENT DOCUMENTS

| | | | | |
|---|---|---|---|---|
| 2013/0332577 | A1* | 12/2013 | Nakil | H04L 41/0668 709/219 |
| 2013/0346583 | A1* | 12/2013 | Low | H04L 12/4641 709/223 |
| 2014/0006585 | A1* | 1/2014 | Dunbar | H04L 41/00 709/223 |
| 2014/0115584 | A1* | 4/2014 | Mudigonda | H04L 67/1095 718/1 |
| 2014/0185616 | A1* | 7/2014 | Bloch | G06F 9/45533 370/392 |
| 2014/0201733 | A1* | 7/2014 | Benny | G06F 9/455 718/1 |
| 2015/0180959 | A1* | 6/2015 | Bloch | G06F 9/45533 709/217 |
| 2015/0271067 | A1* | 9/2015 | Li | H04L 45/50 370/392 |

* cited by examiner

| VTEP ID | SWITCH ID | SERVER ID |
|---|---|---|
| #1 | #1 | #1, #3 |
| #2 | #2 | #2 |
| #3 | #3 | #4 |

| VM ID | SERVER ID |
|---|---|
| 1-1 | #1 |
| 1-2 | #1 |
| 2-1 | #2 |
| 2-2 | #2 |

| VM ID | VNI |
|---|---|
| 1-1 | 22 |
| 1-2 | 34 |
| 2-1 | 22 |

| VTEP ID | VLAN NUMBER |
|---|---|
| #1 | 30, 40,... |

| VTEP ID | VLAN NUMBER | ALLOCATION COUNT | VM ID |
|---|---|---|---|
| #1 | 10 | 2 | 1-1, 2-1 |
| #1 | 20 | 1 | 1-2 |
| #2 | 110 | 1 | 3-1 |
| #2 | 120 | 1 | 4-1 |

⋮

31

| VNI | VLAN NUMBER |
|---|---|
| 22 | 10 |
| 34 | 20 |

| MAC ADDRESS | VLAN NUMBER | TRANSFER DESTINATION |
|---|---|---|
| MAC #1 | 10 | SERVER 2a |
| MAC #2 | 20 | SERVER 2b |
| MAC #3, MAC #4 | 30, 40,... | NETWORK |

| VTEP | EXTENDED VLAN NUMBER |
|---|---|
| #1 | 101, 103,... |

| VTEP | EXTENDED VLAN NUMBER | ALLOCATION COUNT |
|---|---|---|
| #1 | 100 | 1 |
| #1 | 102 | 2 |
| #2 | 100 | 1 |

⋮

31b

| VNI | VLAN NUMBER | EXTENDED VLAN NUMBER |
|---|---|---|
| 22 | 10 | 100 |
| 34 | 20 | 101 |
| 50 | 10 | 102 |
| ⋮ | ⋮ | ⋮ |
| | | |
| | | |

31c

| | GROUP INFORMATION | | | | | | | |
|---|---|---|---|---|---|---|---|---|
| | VF | | | | | | | |
| | 1 | 2 | 3 | 4 | 5 | 6 | ··· | |
| EXTENDED VLAN "100" | 1 | 0 | 0 | 1 | 1 | 0 | ··· | |
| EXTENDED VLAN "101" | 0 | 1 | 0 | 0 | 0 | 1 | ··· | |
| EXTENDED VLAN "102" | 0 | 0 | 1 | 0 | 0 | 0 | ··· | |

31b

| VNI | VLAN NUMBER | EXTERNAL VLAN NUMBER |
|---|---|---|
| 22 | 10 | 100 |
| 34 | 20 | 101 |
| 50 | 10 | 102 |
| ⋮ | ⋮ | ⋮ |
| | | |
| | | |

31c

| | GROUP INFORMATION | | | | | | | |
|---|---|---|---|---|---|---|---|---|
| | VF | | | | | | | |
| | 1 | 2 | 3 | 4 | 5 | 6 | ··· | |
| EXTERNAL VLAN "100" | 1 | 0 | 0 | 1 | 1 | 0 | ··· | |
| EXTERNAL VLAN "101" | 0 | 1 | 0 | 0 | 0 | 1 | ··· | |
| EXTERNAL VLAN "102" | 0 | 0 | 1 | 0 | 0 | 0 | ··· | |

MULTI-TENANT SYSTEM AND CONTROL METHOD OF MULTI-TENANT SYSTEM

CROSS-REFERENCE TO RELATED APPLICATION(S)

This application is based upon and claims the benefit of priority of the prior Japanese Patent Application No. 2013-010571, filed on Jan. 23, 2013, the entire contents of which are incorporated herein by reference.

FIELD

The embodiments discussed herein are related to a multi-tenant system and a control method of the multi-tenant system.

BACKGROUND

There is a known conventional technology for virtualizing networks in order to flexibly implement a multi-tenant environment. For example, there is a known technology called a Virtual Extensible Local Area Network (VXLAN), in which a virtual machine encapsulates a packet that is exchanged with another virtual machine and then transfers the encapsulated packet via the Layer (L) 3 network.

FIG. 38 is a schematic diagram illustrating a VXLAN. A multi-tenant system 60 illustrated in FIG. 38 includes a server 61 and a server 67 that are connected via a layer 3 network 66. Furthermore, the server 61 operates a hypervisor 62, whereby it operates, in the hypervisor 62, virtual machines (VMs) 63 and 64 and a virtual tunnel end point (VTEP) 65 that is a tunnel termination point. Furthermore, the server 67 operates a hypervisor 68, whereby it operates, in the hypervisor 68, VMs 69 and 70 and a VTEP 71.

The VM 63, the VM 64, the VM 69, and the VM 70 are virtual machines that are used by tenants and to which a different 24-bit visual networking index (VNI) is allocated for each tenant. Furthermore, the VTEP 65 and the VTEP 71 each attach a header that includes a VNI to a packet that is output from each of the VMs 63, 64, 69, and 70, encapsulates the packet, and then transfer the packet via the layer 3 network 66.

In the example illustrated in FIG. 38, a VNI "22" is allocated to each of the VM 63 and the VM 69 and a VNI "34" is allocated to each of the VM 64 and the VM 70. If the VM 63 issues a packet addressed to the VM 69, the VTEP 65 attaches, to the packet, a VXLAN header that includes the VNI "22" allocated to the VM 63 and then encapsulates the packet.

Then, the VTEP 65 transmits the encapsulated packet to the server 67 via the layer 3 network 66. In contrast, the VTEP 71 deletes the VXLAN header from the received packet and then outputs the packet to the VM 69. Consequently, the multi-tenant system 60 implements packet communication via the layer 3 network 66.

Furthermore, there is a known technology in which a switch converts a packet transmitted by using a Virtual Local Area Network (VLAN) to a VXLAN. For example, FIG. 39 is a schematic diagram illustrating the conversion of a VXLAN performed at two switches. In the example illustrated in FIG. 39, the multi-tenant system 60 includes a switch 72, between the server 61 and the layer 3 network 66, that has a function of the VTEP 65. Furthermore, the multi-tenant system 60 includes a switch 73, between the server 67 and the layer 3 network 66, that has a function of the VTEP 71.

Furthermore, in the example illustrated in FIG. 39, a 12-bit identifier (ID) of the Virtual Local Area Network (VLAN) is allocated to each of the VM 63, the VM 64, the VM 69, and the VM 70. For example, a VLAN number "10" is allocated to each of the VM 63 and the VM 69 and a VLAN number "20" is allocated to each of the VM 64 and the VM 70.

Furthermore, the switches 72 and 73 store therein conversion information that is used to convert the VLAN numbers allocated to the VM 63, the VM 64, the VM 69, and the VM 70 to VNIs. Then, the switches 72 and 73 convert the VLAN numbers to the VNIs. For example, for each VM, the switches 72 and 73 store therein, in an associated manner, the VLAN number "10" and the VNI "22" and store therein, in an associated manner, the VLAN number "20" and the VNI "34", respectively. If the VM 63 outputs a packet addressed to the VM 69, the switch 72 identifies the VNI "22" that is associated with the VLAN number "10" that is allocated to the VM 63.

Then, the switch 72 attaches a header that includes the VNI "22" to the packet that is output from the VM 63, encapsulates the packet, and transmits the packet to the switch 73 via the layer 3 network 66. In contrast, the switch 73 identifies the VLAN number "10" that is associated with the VNI "22" included in the header of the received packet. Then, the switch 73 deletes the header of the received packet and outputs the packet to the VM 69 whose VLAN number is "10".

With regard to the conventional technologies, see Japanese Laid-open Patent Publication No. 2002-247089; Japanese Laid-open Patent Publication No. 2011-254378, and Japanese Laid-open Patent Publication No. 2008-227695, for example. Further, refer to "VXLAN: A Framework for Overlaying Virtualized Layer 2 Networks over Layer 3 Networks draft-mahalingam-dutt-dcops-vxlan-00.txt", URL: http://tools.ietf.org/html/draft-mahalingam-dutt-dcops-vxlan-00#page-9, Last access on Dec. 21, 2012.

However, with the technology that performs conversion of VLANs and VXLANs, each switch uses the same conversion information, in which a VLAN number is associated with a VNI. Consequently, there is a problem in that the number of VNIs that can be used across the entire multi-tenant system is limited to the maximum number of VLANs.

SUMMARY

According to an aspect of an embodiment, a multi-tenant system includes multiple terminating devices and a management device. The multiple terminating devices each transfers, via a first network, a packet that is output from a virtual machine. The management device manages the terminating devices. The management device includes a first allocating unit, a second allocating unit, a creating unit, and a distributing unit. The first allocating unit allocates a first identifier that identifies, from among tenants included in the multi-tenant system, a tenant that uses virtual machines running on the multi-tenant system. The second allocating unit, for each terminating device, allocates, to virtual machines running on a second network in which terminating devices are installed, a second identifier that identifies, from among the tenants included in the multi-tenant system, a tenant that uses virtual machines running on the multi-tenant system. The creating unit creates, for each terminating device, conversion information in which the first identifier that is allocated to each of the virtual machines by the first allocating unit is associated with the second identifier that is allocated to each of the virtual machines by the second allocating unit. The distributing unit distributes the conversion information created by the creating unit to each of the terminating devices. Each of the terminating devices includes a storing unit, an acquiring unit, a converting unit, and a transmitting unit. The storing unit stores therein the conversion information distributed by the distributing unit. The acquiring unit acquires, from the conversion information stored in the storing unit when the acquiring unit receives a packet, a first identifier that is associated with a second identifier that is allocated to a tenant that uses a virtual machine that transmitted the received packet. The converting unit attaches, to the packet, a header that includes the first identifier acquired by the acquiring unit and encapsulates the packet. The transmitting unit transmits the packet encapsulated by the converting unit to a terminating device via the first network.

According to another aspect of an embodiment, a computer-readable recording medium has stored therein a management program. The management program causes a computer to execute the following process. The process includes: allocating a first identifier that identifies, from among tenants included in a multi-tenant system, a tenant that uses virtual machines running on the multi-tenant system; allocating, for each terminating device, a second identifier to virtual machines running on a second network in which terminating devices are installed, where the second identifier identifies, from among the tenants included in the multi-tenant system, a tenant that uses virtual machines running on the multi-tenant system; creating, for each terminating device, conversion information in which the first identifier is associated with the second identifier that is allocated to each of the virtual machines; and setting each of the terminating devices such that a packet is encapsulated in accordance with the created conversion information.

According to still another aspect of an embodiment, a control method of a multi-tenant system that includes multiple terminating devices that transfer, via a first network, a packet output from a virtual machine and that includes a management device that manages the terminating devices, the control method of the multi-tenant system includes: firstly allocating by the management device, a first identifier that identifies, from among tenants included in the multi-tenant system, a tenant that uses virtual machines running on the multi-tenant system; secondly allocating by the management device, for each terminating device, to virtual machines running on the second network in which the terminating devices are installed, a second identifier that identifies, from among tenants included in the multi-tenant system, a tenant that uses virtual machines running on the multi-tenant system; creating by the management device, for each terminating device, conversion information in which the first identifier that is allocated to each of the virtual machines at the firstly allocating is associated with the second identifier that is allocated at the secondly allocating to each of the virtual machines; distributing by the management device, the conversion information created at the creating to each of the terminating devices; storing by the terminating device, the conversion information distributed at the distributing; acquiring by the terminating device, from the conversion information stored at the storing when the terminating device receives a packet, a first identifier that is associated with a second identifier that is allocated to a tenant that uses a virtual machine that transmitted the received packet; attaching by the terminating device, a header that includes the first identifier acquired at the acquiring to the packet and encapsulating the packet; and transmitting by the terminating device, the encapsulated packet to a terminating device via the first network.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a schematic diagram illustrating an example of information stored in a VTEP location DB;

FIG. 7 is a schematic diagram illustrating an example of information stored in a VM location DB;

FIG. 8 is a schematic diagram illustrating an example of information stored in a VM virtual network DB;

FIG. 9 is a schematic diagram illustrating an example of information stored in a VLAN pool;

FIG. 10 is a schematic diagram illustrating an example of information stored in an allocation count management DB;

FIG. 13 is a schematic diagram illustrating an example of a MAC table;

FIG. 26 is a schematic diagram illustrating an example of information stored in an extended VLAN pool;

FIG. 27 is a schematic diagram illustrating an example of information stored in an allocation count management DB according to the fourth embodiment;

DESCRIPTION OF EMBODIMENT(S)

Preferred embodiments of the present invention will be explained with reference to accompanying drawings. The present invention is not limited to these embodiments. Furthermore, the embodiments can be used in any appropriate combination as long as they do not conflict with each other.

[a] First Embodiment

Figure 1:
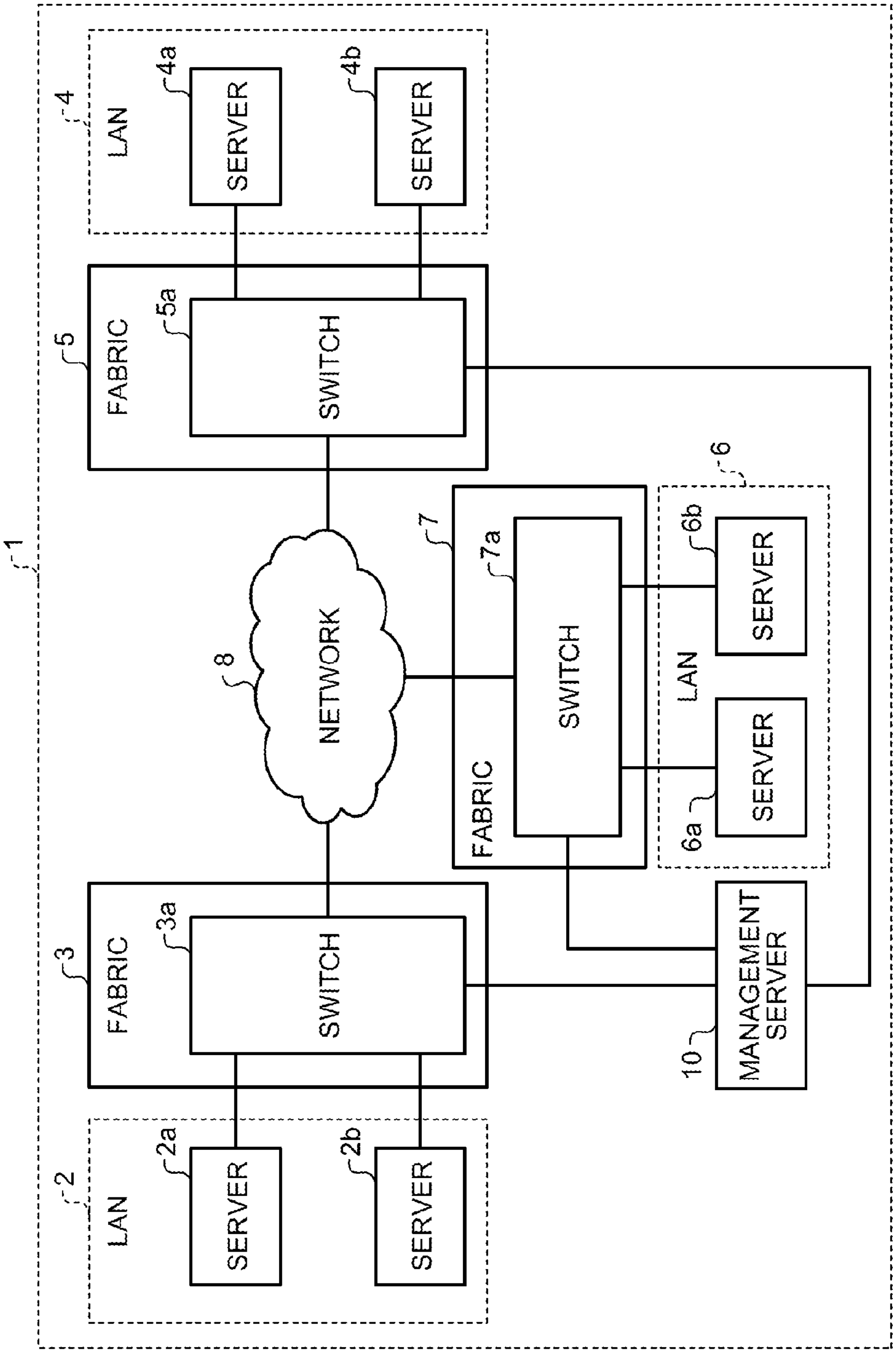
FIG. 1 is a schematic diagram illustrating a multi-tenant system.

In a first embodiment, an example of a multi-tenant system will be described with reference to FIG. 1. FIG. 1 is a schematic diagram illustrating a multi-tenant system. In the example illustrated in FIG. 1, the multi-tenant system 1 includes Local Area Networks (LANs) 2, 4, and 6, fabrics 3, 5, and 7, a network 8, and a management server 10.

The LAN 2 includes servers 2*a* and 2*b*. The LAN 4 includes servers 4*a* and 4*b*. The LAN 6 includes servers 6*a* and 6*b*. The fabric 3 includes a switch 3*a*. The fabric 5 includes a switch 5*a*. The fabric 7 includes a switch 7*a*.

In the description below, it is assumed that the servers 2*b*, 4*a*, 4*b*, 6*a*, and 6*b* have the same function as that performed by the server 2*a*; therefore, descriptions thereof will be omitted. Furthermore, the switches 5*a* and 7*a* have the same function as that performed by the switch 3*a*; therefore, descriptions thereof will be omitted.

The server 2*a* is an information processing apparatus that operates a virtual machine (VM). Specifically, the server 2*a* includes a central processing unit (CPU), a memory, and a communication control unit that performs communication control. The server 2*a* operates a hypervisor that controls VMs, whereby it operates one or more VMs in the hypervisor.

The fabric 3 is an assembly of switches including one or more switches. The entirety of the fabric 3 is identified as a single switch by a VM running on each of the servers 2*a*, 2*b*, 4*a*, 4*b*, 6*a*, and 6*b*. In FIG. 1, for ease of understanding, only the switch 3*a* is illustrated from among the switches included in the fabric 3. Furthermore, in the example illustrated in FIG. 1, the switch 3*a* is directly connected to the servers 2*a* and 2*b* and the network 8; however, the embodiment is not limited thereto.

For example, it is possible that the switch 3*a* is not be directly connected to the servers 2*a* and 2*b* nor the network 8. Specifically, in the multi-tenant system 1, an arbitrary switch included in the fabric 3 may have a function performed by the switch 3*a*.

The switch 3*a* is a terminating device that performs a termination process on a packet that is transferred via the network 8 by using the Virtual Extensible Local Area Network (VXLAN) technology. For example, the switch 3*a* transfers packets that are exchanged between VMs running on the servers 2*a*, 2*b*, 4*a*, 4*b*, 6*a*, and 6*b*. For example, if the switch 3*a* receives a packet that is transmitted by a VM running on the server 2*a* to a VM running on the server 2*b*, the switch 3*a* transfers the received packet to the server 2*b*.

Furthermore, if the switch 3*a* receives a packet that is transmitted by a VM running on the server 2*a* to a VM running on the server 4*a*, the switch 3*a* encapsulates the received packet. Then, the switch 3*a* transfers the encapsulated packet to the switch 5*a* via the network 8. Furthermore, if the switch 3*a* receives the encapsulated packet via the network 8, the switch 3*a* decapsulates the received encapsulated packet and then outputs the decapsulated packet to the server 2*a* or the server 2*b*.

Furthermore, by using conversion information delivered from the management server 10, the switch 3*a* encapsulates a packet and decapsulates the encapsulated packet. Specifically, the switch 3*a* receives, from the management server 10, conversion information in which Visual Network Identifiers (VNIs) allocated to VMs that are running on the servers 2*a* and 2*b* are associated with Virtual Local Area Network (VLAN) numbers.

Then, the switch 3*a* receives, from the servers 2*a* or 2*b*, a packet to which an inner header that includes a VLAN number allocated to the transmission source VM is allocated. Then, the switch 3*a* acquires, from the conversion information, the VNI that is associated with the VLAN number that is included in an inner header and then attaches an outer header that includes the acquired VNI to the packet, thereby encapsulating the packet. Then, the switch 3*a* transmits the encapsulated packet to the switch 5*a* or the switch 7*a* via the network 8.

In contrast, if the switch 3*a* receives the encapsulated packet via the network 8, the switch 3*a* acquires, from the conversion information, a VLAN number associated with the VNI that is included in the outer header of the received packet. Then, if the switch 3*a* deletes the outer header, the switch 3*a* converts the VLAN number retained in the inner header to the VLAN number that is acquired from the conversion information. Then, the switch 3*a* outputs, to the server 2*a* or the server 2*b*, the packet in which the VLAN number was converted.

Figure 2:
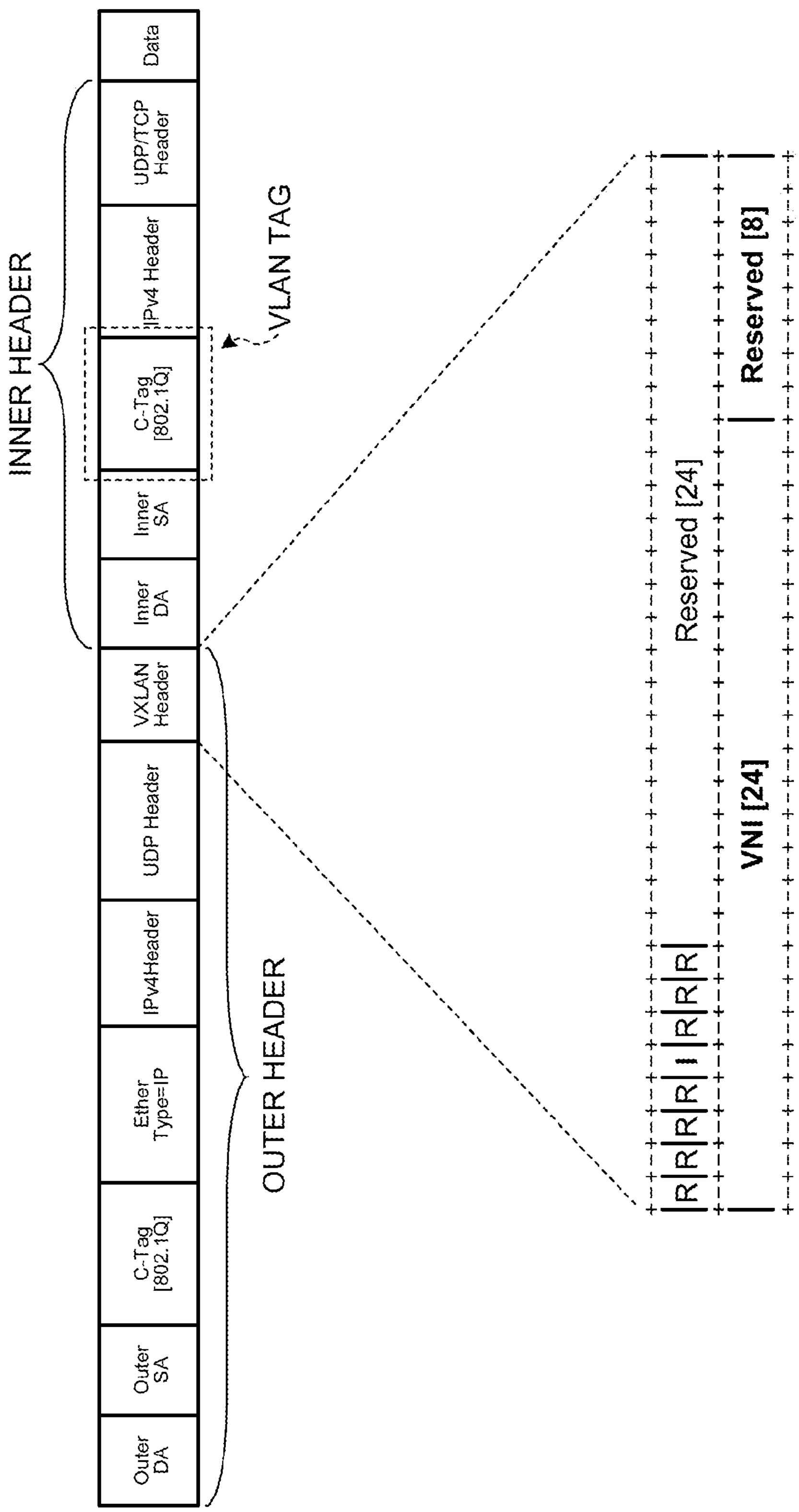
FIG. 2 is a schematic diagram illustrating an example of the frame format of a packet flowing through a network.

In the following, the format of a packet exchanged by the switch 3*a* via the network 8 will be described with reference to FIG. 2. FIG. 2 is a schematic diagram illustrating an example of the frame format of a packet flowing through a network. As illustrated in FIG. 2, the packet flowing through the network 8 has a format in which an outer header and an inner header are attached to data.

Specifically, the "Data" illustrated in FIG. 2 is data that is retained in a packet. The inner header is a header that is retained in information used when a packet is exchanged among the LANs 2, 4, and 6. More specifically, the inner header includes therein an "Inner destination address (DA)", an "Inner source address (SA)", and the "C-tag [802.1Q]". Furthermore, the inner header includes therein an "Internet Protocol version (IPv) 4 Header" and a "User Datagram Protocol (UDP)/TCP (Transmission Control Protocol) Header".

At this point, a virtual MAC address of a destination VM is retained in the "Inner Destination Address (DA)" and a virtual MAC address of a transmission source VM is retained in the "Inner Source Address (SA)". Furthermore, the "C-tag [802.1Q]" mentioned here is a VLAN tag that includes a VLAN number. The "IPv4 Header" is the header of an IP packet, i.e., the IP header of a packet that is output by a VM. The "UDP/TCP Header" is the UDP/TCP header of a packet that is output by a VM.

In contrast, the outer header mentioned here is a header that is used to exchange a packet via the network 8. Specifically, the switch 3*a* attaches an outer header to encapsulate a packet and transfers the encapsulated packet, thereby forming an overlay network, which is a virtual network, in the network 8.

In the example illustrated in FIG. 2, the outer header includes therein an "Outer DA", an "Outer SA", a "C-Tag [802.1Q]", an "Ether Type", an "IPv4 Header", a "UDP Header", and a "VXLAN Header". Here, the "Outer DA" is the MAC address of the destination used when a packet is exchanged in the network 8. The "Outer SA" is the MAC address of the transmission source used when a packet is exchanged in the network 8. The "C-Tag [802.1Q]" is a tag that includes an external VLAN number. The "IPv4 Header" and the "UDP Header" are the IP header and the UDP header, respectively, that are used when a packet is exchanged in the network 8.

The "VXLAN Header" is information used when a packet is transferred by using a VXLAN and retains therein a VNI that is attached to a VM corresponding to the transmission source or destination. Specifically, as illustrated in FIG. 2, the "VXLAN Header" includes an 8-bit flag "RRRRIRRR", 24-bit "Reserved", a 24-bit "VNI", and 8-bit "Reserved". The "Reserved" mentioned here is a spare area and the "VNI" is an area in which 24-bit VNI allocated to each VM is retained.

For example, if the switch 3*a* receives, from the server 2*a*, a packet in which an inner header is added to the data, the switch 3*a* acquires a VLAN number retained in the VLAN tag that is included in the inner header of the received packet. Then, the switch 3*a* acquires a VNI that is associated with the VLAN number acquired from the inner header in the conversion information delivered from the management server 10. Then, the switch 3*a* attaches an outer header in which the acquired VNI is retained in the "VXLAN Header", encapsulates a packet, and then outputs the encapsulated packet to the network 8.

Furthermore, if the switch 3*a* receives an encapsulated packet, the switch 3*a* acquires a VNI from the "VXLAN Header" that is included in the outer header of the received packet and acquires, from the conversion information, a VLAN number that is associated with the acquired VNI. Then, if the switch 3*a* deletes the outer header of the encapsulated packet, the switch 3*a* converts the VLAN number that is retained in the VLAN tag in the inner header to VLAN information that is acquired from the conversion information and then outputs the converted packet to the server 2*a* or the server 2*b*.

A description will be given here by referring back to FIG. 1. The management server 10 is a management device that manages VMs and the switches 3*a*, 5*a*, and 7*a* included in the multi-tenant system 1. Specifically, the management server 10 allocates a VNI indicating a tenant that uses a VM from among all of the VMs running on the multi-tenant system 1.

Furthermore, the management server 10 selects, for each switch, a VLAN number that indicates a tenant that uses a VM in a LAN in which the switches are installed. Then, the management server 10 creates, for each specified switch, conversion information in which a VNI allocated to a VM is associated with a selected VLAN number and distributes the created conversion information to the specified switch.

In the following, an example of a process performed by the management server 10 will be described. In the description below, an example will be described in which VMs used by certain tenants run on the server 2*a*, the server 2*b*, and the server 4*a*. For example, the management server 10 allocates a single VNI "A" to VMs that are used by the same tenant. Then, the management server 10 specifies the switch 3*a* and switch 5*a* that perform the termination process in the LAN 2 and the LAN 4, respectively, in which the VMs are running.

Then, the management server 10 selects a VLAN number "B" indicating the tenant that uses VMs in the LAN 2 and selects a VLAN "C" indicating the tenant that uses VMs in the LAN 4. At this point, the management server 10 may set the same number to the VLAN number "B" and the VLAN number "C" or, alternatively, may set different numbers thereto. Specifically, for each LAN in which one of the switches 3*a*, 5*a*, and 7*a* performs the termination process, the management server 10 selects a VLAN number indicating a tenant that uses VMs.

Consequently, the management server 10 may sometimes attach different VLAN numbers to VMs running in the LAN 2 and to VMs running in the LAN 4 even if the VMs are used by the same tenant. Then, the management server 10 delivers the conversion information in which the VNI "A" is associated with the VLAN number "B" to the switch 3*a* and delivers the conversion information in which the VNI "A" is associated with the VLAN number "C" to the switch 5*a*. Consequently, the management server 10 can prevent the number of VNIs that can be used across the entire multi-tenant system 1 from being limited to the number of VLAN numbers.

Figure 3:
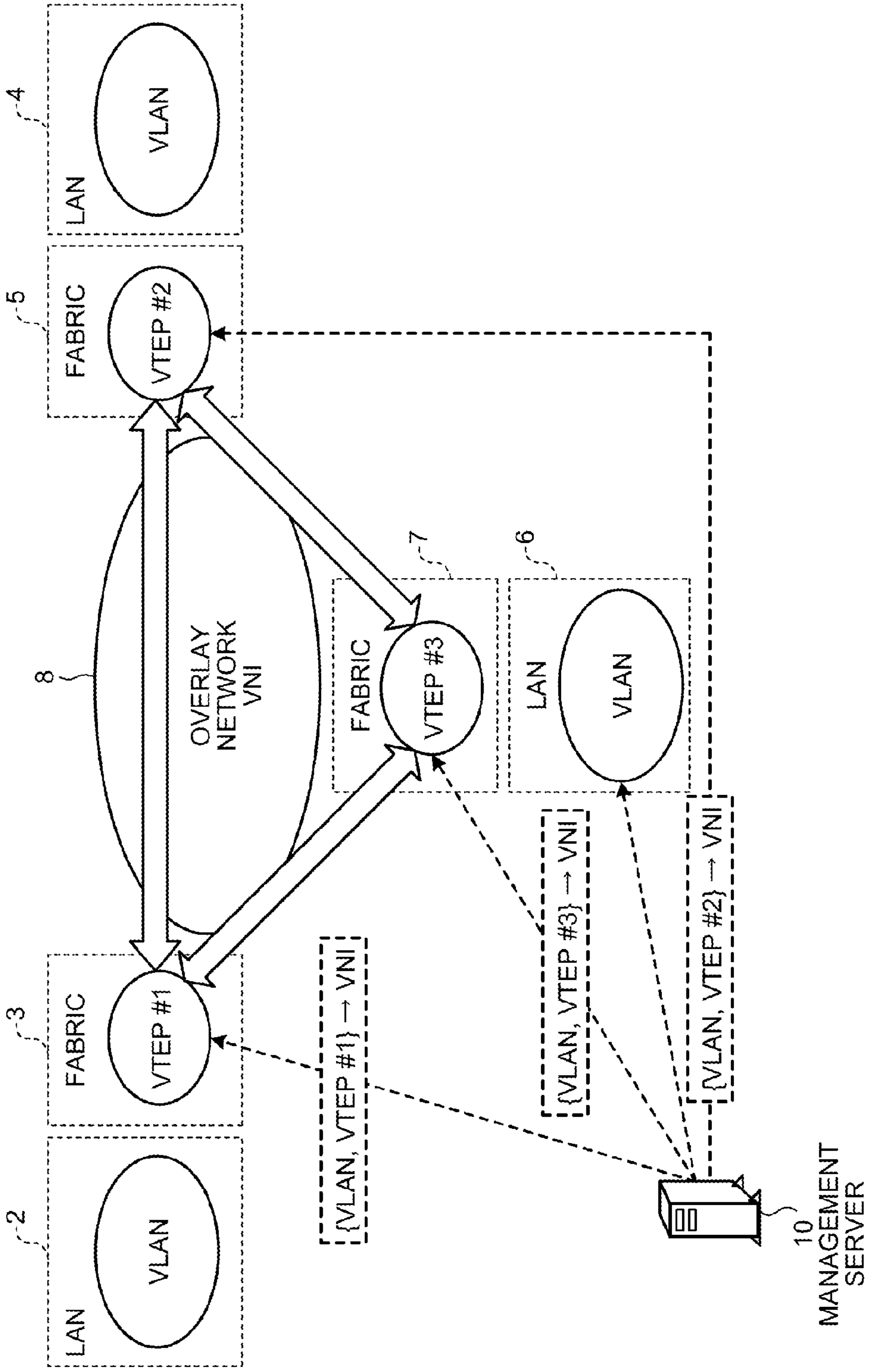
FIG. 3 is a schematic diagram illustrating an example of a process performed by a management server.

In the following, the effect of a process performed by the management server 10 will be described with reference to FIG. 3. FIG. 3 is a schematic diagram illustrating an example of a process performed by a management server. A VNI indicating a tenant that uses VMs is allocated to all of the VMs running on the multi-tenant system 1. Furthermore, a VLAN number indicating a tenant that uses VMs is attached, for each of the switches 3*a*, 5*a*, and 7*a*, to all of the VMs running on the multi-tenant system 1. Specifically, as illustrated in FIG. 3, the LAN 2, the LAN 4, and the LAN

6 each have an independent VLAN. A VLAN number that is independently selected for each VLAN is attached to each VM.

The fabric 3 includes the switch 3*a*, i.e., a Virtual Tunnel End Point (VTEP) #1, that performs the termination process on a packet that is exchanged by the VLAN included in the LAN 2. The fabric 5 includes the switch 5*a*, i.e., a VTEP #2, that performs the termination process on a packet that is exchanged by the VLAN included in the LAN 4. The fabric 7 includes the switch 7*a*, i.e., a VTEP #3, that performs the termination process of a packet that is exchanged by the VLAN included in the LAN 6.

Then, the management server 10 distributes, to the VTEPs #1 to #3 for each of the VTEPs #1 to #3, the conversion information, in which a VLAN number that is associated with a VNI, that is used in a VLAN where the termination process is performed. Specifically, the management server 10 delivers, to the VTEP #1, conversion information that is used to convert, to a VNI, a VLAN number of a VLAN in which the VTEP #1 performs the termination process. Furthermore, the management server 10 delivers, to the VTEP #2, conversion information that is used to convert, to a VNI, a VLAN number of a VLAN in which the VTEP #2 performs the termination process. Furthermore, the management server 10 delivers, to the VTEP #3, the conversion information that is used to convert, to a VNI, a VLAN number of a VLAN in which the VTEP #3 performs the termination process.

Figure 4:
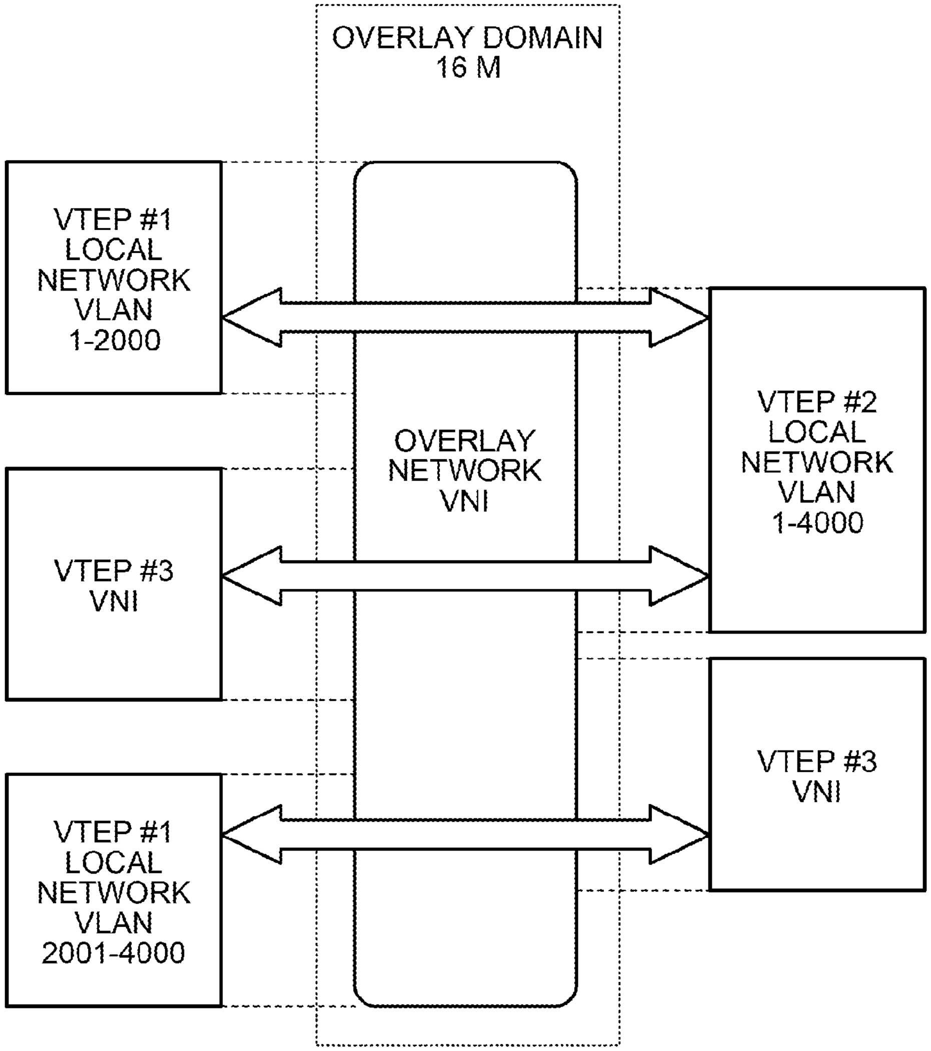
FIG. 4 is a schematic diagram illustrating an example of the effect of the multi-tenant system according to a first embodiment.

Consequently, in the multi-tenant system 1, the relationship between a VNI and a VLAN number attached to each VM is mapped as illustrated in FIG. 4. FIG. 4 is a schematic diagram illustrating an example of the effect of the multi-tenant system according to the first embodiment. For example, in the overlay network that is set in the network 8, because packet communication using a 24-bit VNI is performed, the number of overlay domains corresponding to about 16 megabytes (M) can be set. Furthermore, 4096 domains can be set in a VLAN in which each of the VTEPs #1 to #3 performs a termination process. FIG. 4 illustrates, for ease of understanding, an example case in which 4000 domains are set in each VLAN.

At this point, the multi-tenant system 1 independently selects a VLAN number for each of the VTEPs #1 to #3 that performs the termination process. Then, the multi-tenant system 1 creates, for each of the VTEPs #1 to #3, conversion information that stores therein a VNI and a VLAN number and performs a conversion of a VLAN number and a VNI by using the created conversion information. Consequently, as illustrated in FIG. 4, the multi-tenant system 1 maps, onto a single VNI, an independent VLAN number for each VLAN in which VMs are installed.

Specifically, the multi-tenant system 1 independently sets a VLAN number, which is allocated to a VM in each VLAN, for each VLAN instead of the VLAN number being shared across the entire multi-tenant system 1. Accordingly, the location in which a VLAN is mapped on a VNI can be freely set for each VLAN. Consequently, the multi-tenant system 1 can prevent the number of VNIs that can be used from being limited to the number of VLANs.

For example, if VMs that are used by the same tenant are running on the servers 2*a*, 2*b*, and 4*a*, the same VNI is allocated to the VMs running on the servers 2*a*, 2*b*, and 4*a*. Furthermore, for VMs running on the servers 2*a* and 2*b*, the same VLAN number is allocated and, for VMs running on the server 4*a*, a VLAN number that is different from the VLAN number allocated to the VMs running on the servers 2*a* and 2*b* is allocated.

Then, the management server 10 creates, for each of the switches 3*a*, 5*a*, and 7*a*, conversion information in which VNIs, which are allocated across the entire multi-tenant system 1, are associated with VLAN numbers, which are selected for each of the switches 3*a*, 5*a*, and 7*a*. Then, the management server 10 distributes the created conversion information to each of the switches 3*a*, 5*a*, and 7*a*. Consequently, each of the switches 3*a*, 5*a*, and 7*a* can perform the conversion of the VNIs, which are allocated to the entire multi-tenant system 1, and VLAN numbers, which are selected from the LANs 2, 4, and 6. Consequently, the multi-tenant system 1 can prevent the number of VNIs that can be used being limited.

Furthermore, the multi-tenant system 1 may sometimes attach multiple VNIs to VMs that are used by a single tenant. In such a case, the multi-tenant system 1 attaches a VLAN number to each VM that is running on each of the LANs 3, 4, and 6 in accordance with the VNI that is allocated to each VM.

Figure 5:
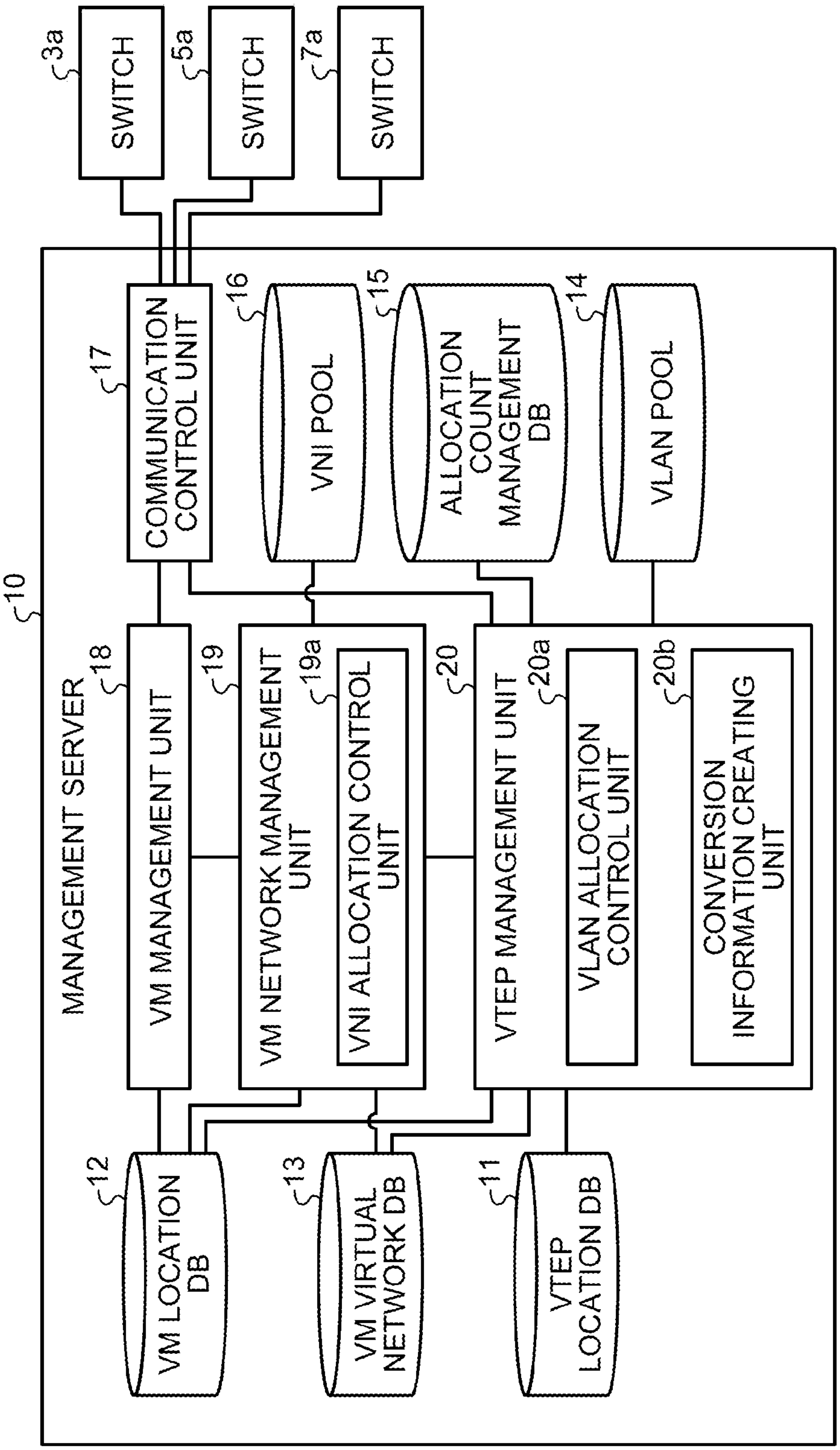
FIG. 5 is a schematic diagram illustrating an example of the functional configuration of the management server.

In the following, the functional configuration of the management server 10 will be described with reference to FIG. 5. FIG. 5 is a schematic diagram illustrating an example of the functional configuration of the management server. In the example illustrated in FIG. 5, the management server 10 includes a VTEP location database (DB) 11, a VM location DB 12, a VM virtual network DB 13, a VLAN pool 14, an allocation count management DB 15, and a VNI pool 16. Furthermore, the management server 10 includes a communication control unit 17, a VM management unit 18, a VM network management unit 19, and a VTEP management unit 20. The VM network management unit 19 includes a VNI allocation control unit 19*a*. The VTEP management unit 20 includes a VLAN allocation control unit 20*a* and a conversion information creating unit 20*b*.

Figures 6, 7, 8:
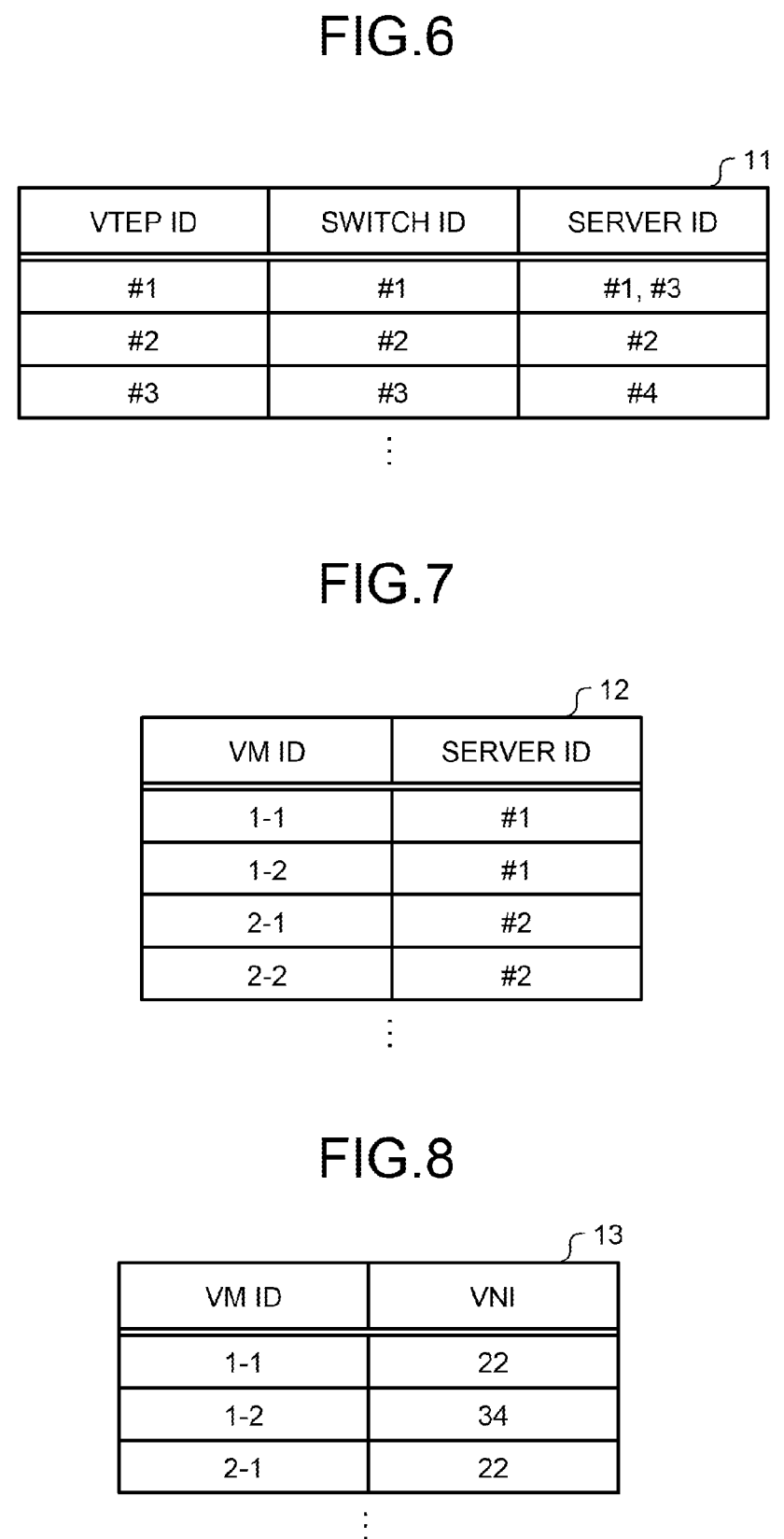

The VTEP location DB 11 stores therein switches that function as VTEPs. For example, FIG. 6 is a schematic diagram illustrating an example of information stored in a VTEP location DB. In the example illustrated in FIG. 6, the VTEP location DB 11 stores therein, in an associated manner, a VTEP ID that indicates a VTEP, a switch ID that indicates a switch operating as a VTEP indicated by its identifier, and a server ID that indicates a server in which a VTEP performs the termination process.

For example, the VTEP location DB 11 stores therein, in an associated manner, the VTEP ID "#1", the switch ID "#1" of the switch 3*a*, the server ID "#1" of the server 2*a*, and the server ID "#3" of the server 2*b*. Furthermore, the VTEP location DB 11 stores therein, in an associated manner, the VTEP ID "#2", the switch ID "#2" of the switch 5*a*, and the server ID "#2" of the server 4*a*. Furthermore, the VTEP location DB 11 stores therein, in an associated manner, the VTEP ID "#3", the switch ID "#3" of the switch 7*a*, and the server ID "#4" of the server 6*a*.

A description will be given here by referring back to FIG. 5. The VM location DB 12 stores therein information indicating which server runs a VM that is included in the multi-tenant system 1. For example, FIG. 7 is a schematic diagram illustrating an example of information stored in a VM location DB. In the example illustrated in FIG. 7, the VM location DB 12 stores therein, in an associated manner, a virtual machine identifier (VM ID) that is an identifier of a VM and a server ID that is an identifier of a server.

In the example illustrated in FIG. 7, the VM location DB 12 stores therein, in an associated manner, the VM ID "1-1" and the server ID "#1"; stores therein, in an associated manner, the VM ID "1-2" and the server ID "#1"; stores therein, in an associated manner, the VM ID "2-1" and the server ID "#2"; and stores therein, in an associated manner, the VM ID "2-2" and the server ID "#2". Specifically, the VM location DB 12 stores therein information indicating that the server 2*a* operates the VMs indicated by the VM IDs of "1-1" and "1-2". Furthermore, the VM location DB 12 stores therein information indicating that the server 4*a* operates the VMs indicated by the VM IDs of "2-1" and "2-2".

A description will be given here by referring back to FIG. 5. The VM virtual network DB 13 stores therein the VNIs that are allocated to each VM. For example, FIG. 8 is a schematic diagram illustrating an example of information stored in a VM virtual network DB. In the example illustrated in FIG. 8, the VM virtual network DB 13 stores therein, in an associated manner, a VM ID and a VNI that is allocated to a VM indicated by the VM ID.

In the example illustrated in FIG. 8, the VM virtual network DB 13 stores therein information indicating that the VNI "22" is allocated to the VM that is indicated by the VM ID "1-1". Furthermore, in the example illustrated in FIG. 8, the VM virtual network DB 13 stores therein information indicating that the VNI "34" is allocated to the VM that is indicated by the VM ID "1-2".

A description will be given here by referring back to FIG. 5. The VLAN pool 14 stores therein, for each VTEP, a VLAN number that is not allocated to a VM in a VLAN in which a VTEP performs the termination process on a packet. For example, FIG. 9 is a schematic diagram illustrating an example of information stored in a VLAN pool. In the example illustrated in FIG. 9, the VLAN pool 14 stores therein, in an associated manner, a VTEP ID and a VLAN number.

In the example illustrated in FIG. 9, the VLAN pool 14 stores therein, in an associated manner, the VTEP ID "#1" and the VLAN number "30, 40 . . . ". Specifically, the VLAN pool 14 stores therein information indicating that, in a VLAN in which the VTEP indicated by the VTEP ID of "#1" performs the termination process, the VLAN numbers "30" and "40" and other VLAN numbers that are not illustrated in FIG. 9 are not allocated.

A description will be given here by referring back to FIG. 5. The allocation count management DB 15 stores therein a VLAN number, which is allocated to a VM in a VLAN in which a VTEP performs the termination process on a packet, and stores therein the number of VMs to which the VLAN number is allocated. For example, FIG. 10 is a schematic diagram illustrating an example of information stored in an allocation count management DB. In the example illustrated in FIG. 10, the allocation count management DB 15 stores therein, in an associated manner, a VTEP ID, a VLAN number, an allocation count, and a VM ID to which the VLAN number is allocated.

In the example illustrated in FIG. 10, the allocation count management DB 15 stores therein, in an associated manner, the identifier "#1" of the VTEP, the VLAN number "10", the allocation count "2", and the VM IDs "1-1, 2-1". Furthermore, the allocation count management DB 15 stores therein, in an associated manner, the identifier "#1" of the VTEP, the VLAN number "20", the allocation count "1", and the VM ID "1-2". Furthermore, the allocation count management DB 15 stores therein, in an associated manner, the identifier "#2" of the VTEP, the VLAN number "110", the allocation count "1", and the VM ID "3-1". Furthermore, the allocation count management DB 15 stores therein, in an associated manner, the identifier "#2" of the VTEP, the VLAN number "120", the allocation count "1", and the VM ID "4-1".

Specifically, the allocation count management DB 15 stores therein information indicating that, in the VLAN in which the VTEP indicated by the VTEP ID "#1" performs the termination process, two VMs to each of which the VLAN number "10" is allocated are running. Furthermore, the allocation count management DB 15 stores therein information indicating that, in the VLAN in which the VTEP indicated by the VTEP ID "#1" performs the termination process, a single VM to which the VLAN number "20" is allocated is running.

Furthermore, the allocation count management DB 15 stores therein information indicating that, in the VLAN in which the VTEP indicated by the VTEP ID "#2" performs the termination process, the VM to which the VLAN number "110" is allocated is running. Furthermore, the allocation count management DB 15 stores therein information indicating that, in the VLAN in which the VTEP indicated by the VTEP ID "#2" performs the termination process, the VM to which the VLAN number "120" is allocated is running.

A description will be given here by referring back to FIG. 5. The VNI pool 16 is a storing unit that stores therein a VNI that is not allocated to any VM. For example, if the VNIs "100" to "200" are allocated to the VMs in the multi-tenant system 1, the VNI pool 16 stores therein VNIs other than the VNIs "100" to "200".

The communication control unit 17 is a control unit that performs communication control among the VM management unit 18, the VTEP management unit 20, and the switches 3*a*, 5*a*, and 7*a*. For example, if the VM management unit 18 outputs an instruction to, for example, create, move, or stop a VM, the communication control unit 17 transmits the instruction, which is output by the VM management unit 18, to the servers 2*a*, 2*b*, 4*a*, 4*b*, 6*a*, and 6*b* via the switches 3*a*, 5*a*, and 7*a*, respectively. Furthermore, if the communication control unit 17 receives conversion information that is distributed from the VTEP management unit 20 to each of the switches 3*a*, 5*a*, and 7*a*, the communication control unit 17 distributes the received conversion information to each of the switches 3*a*, 5*a*, and 7*a*.

The VM management unit 18 manages the VMs running on the multi-tenant system 1. Specifically, in accordance with the calculation resources of the servers 2*a*, 2*b*, 4*a*, 4*b*, 6*a*, and 6*b*, the VM management unit 18 controls live migration, such as the creation, movement, stopping, or the like of VMs running on the multi-tenant system 1. Then, if the result of the live migration indicates that there is a change in the VMs running on the servers 2*a*, 2*b*, 4*a*, 4*b*, 6*a*, and 6*b*, the VM management unit 18 updates the VM location DB 12 such that the data is updated in accordance with the change result. Then, the VM management unit 18 notifies the VM network management unit 19 of the changes.

For example, if the VM management unit 18 stops the VM indicated by the VM ID "1-1", the VM management unit 18 deletes the entry in which the VM ID "1-1" is stored from among the pieces of information retained in the VM location DB 12. Then, the VM management unit 18 notifies the VM network management unit 19 that the VM indicated by the VM ID "1-1" is stopped.

Furthermore, if the VM management unit 18 allocates the VM ID "1-3" to a new VM and makes the new VM run on the server 2*a*, the VM management unit 18 retains the following entries in the VM location DB 12. Namely, the VM management unit 18 retains, in the VM location DB 12 in an associated manner, the VM ID "1-3" and the server ID "#1" of the server 2*a*. Then, the VM management unit 18 notifies the VM network management unit 19 that the VM the VM location DB 12 by the VM ID "1-3" is created.

Furthermore, if the VM management unit 18 moves the VM the VM location DB 12 by the VM ID "1-1" from the server 2*a* to the server 4*a*, the VM management unit 18 converts, from among the identifiers of the servers stored in the VM location DB 12, the server ID "#1" that is associated with the VM ID "1-1" to "#2". Then, if a VM moves across the VLANs in which VTEPs perform the termination process, the VM management unit 18 outputs an instruction to update the conversion information to the VLAN allocation control unit 20*a* in the VTEP management unit 20 via the VM network management unit 19. Specifically, the VM management unit 18 sends, as a notification together with the update instruction of the conversion information, the VM ID of the VM that will be moved, the server ID that indicates the move source server, and the server ID that indicates the move destination server.

The VNI allocation control unit 19*a* allocates a VNI to each VM. Specifically, if the VNI allocation control unit 19*a* receives a notification that a VM has been created, the VNI allocation control unit 19*a* identifies a tenant that uses the created VM. Furthermore, the VNI allocation control unit 19*a* identifies a VNI that is allocated to a VM that is used by the identified tenant. For example, the VNI allocation control unit 19*a* identifies a VNI that has already been allocated to the VM that is used by the identified tenant or identifies a VNI specified by the tenant. Then, the VNI allocation control unit 19*a* retains, in the VM virtual network DB 13, an entry in which the identified VNI is associated with the VM ID that is received as a notification from the VM management unit 18.

For example, the VNI allocation control unit 19*a* determines whether a VNI that is specified by a new tenant is stored in the VNI pool 16. If it is determined that the specified VNI is stored in the VNI pool 16, the VNI allocation control unit 19*a* deletes the specified VNI from the VNI pool 16. Then, the VNI allocation control unit 19*a* retains, in the VM virtual network DB 13, an entry in which the VM ID that was received as a notification from the VM management unit 18 is associated with the VNI that is selected from the VNI pool 16. In contrast, if the specified VNI is not stored in the VNI pool 16, the VNI allocation control unit 19*a* notifies the tenant such that the tenant needs to specify another VNI.

Furthermore, if an existing tenant specifies a VNI, the VNI allocation control unit 19*a* determines whether the specified VNI is stored in the VNI pool 16. If it is determined that the specified VNI is stored in the VNI pool 16, the VNI allocation control unit 19*a* deletes the specified VNI from the VNI pool 16. Then, the VNI allocation control unit 19*a* retains, in the VM virtual network DB 13, an entry in which the VM ID that is received as a notification from the VM management unit 18 is associated with the VNI that is selected from the VNI pool 16.

If a VNI is specified by an existing tenant and if the specified VNI is not stored in the VNI pool 16, it means the same VNI specified by the existing tenant has already been allocated to the same tenant. Consequently, the VNI allocation control unit 19*a* retains, in the VM virtual network DB 13, an entry in which the VM ID that is received as a notification from the VM management unit 18 is associated with the specified VNI.

Then, the VNI allocation control unit 19*a* outputs an instruction to create conversion information to the VLAN allocation control unit 20*a* in the VTEP management unit 20. Specifically, the VNI allocation control unit 19*a* acquires the server ID that is stored in the VM location DB 12 and that is associated with the VM ID of the VM to be created. Then, the VNI allocation control unit 19*a* outputs, to the VLAN allocation control unit 20*a* together with the instruction to create the conversion information, the VM ID of the VM that will be created and the server ID of the server on which the VM is running.

In contrast, if the VNI allocation control unit 19*a* determines to stop a VM, the VNI allocation control unit 19*a* deletes, from the VM virtual network DB 13, an entry in which the VM ID of the VM to be stopped is associated with the VNI that is allocated to the VM to be stopped. Then, the VNI allocation control unit 19*a* outputs, to the VLAN allocation control unit 20*a*, the deletion instruction of the conversion information and the VM ID of the VM to be stopped.

Furthermore, the VNI allocation control unit 19*a* determines whether the VM ID that is associated with the same VNI as that used by the VM to be stopped is present in the VM virtual network DB 13. If no VM ID that is associated with the same VNI as that used by the VM to be stopped is present, the VNI allocation control unit 19*a* retains, in the VNI pool 16, the VM ID that is associated with the VM to be stopped.

If the VLAN allocation control unit 20*a* receives an instruction to create the conversion information from the VM management unit 18 or the VNI allocation control unit 19*a*, the VLAN allocation control unit 20*a* specifies a VTEP that performs the termination process on a VLAN in which VMs are running. Then, the VLAN allocation control unit 20*a* selects, for each VTEP, in a VLAN in which each VTEP performs the termination process, a VLAN number that indicates a tenant that uses the VM to be created and then allocates the selected VLAN number to the VM to be created.

In the following, the process performed by the VLAN allocation control unit 20*a* will be described in detail. First, a description will be given of a process performed by the VLAN allocation control unit 20*a* when a new VM is created. First, the VLAN allocation control unit 20*a* receives an instruction to create conversion information together with the VM ID of the VM to be created and the server ID of the server on which the VM is running. In such a case, the VLAN allocation control unit 20*a* acquires, from the VTEP location DB 11, the VTEP ID that is associated with the received server ID. Specifically, the VLAN allocation control unit 20*a* specifies a VTEP that performs the termination process in the network in which the server that operates the created VM is installed.

Then, the VLAN allocation control unit 20*a* allocates a VLAN number to the VM to be created in accordance with the VM ID of the VM to be created and the specified VTEP. Specifically, the VLAN allocation control unit 20*a* identifies, from the VTEP location DB 11, the server ID that is associated with the specified VTEP ID.

Then, the VLAN allocation control unit 20*a* identifies, from the VM location DB, a VM ID that is associated with the identified server ID. Then, the VLAN allocation control unit 20*a* browses the VM virtual network DB 13 and determines whether a VM ID to which the same VNI as that allocated to the VM to be created is allocated is present in the identified VM ID. Specifically, the VLAN allocation control unit 20*a* determines whether a VM to which the same VNI as that allocated to the newly created VM is allocated is present under the VTEP that performs the termination process on a packet that is exchanged by the newly created VM.

If it is determined that a VM ID to which the same VNI as that allocated to the VM to be created is allocated is present in the identified VM ID, the VLAN allocation control unit 20*a* performs the following process. Namely, the VLAN allocation control unit 20*a* specifies a VM ID to which the same VNI as that allocated to the VM to be created is allocated and then identifies, from the allocation count management DB 15, the specified VM ID and the allocated VLAN number.

Then, the VLAN allocation control unit 20*a* adds 1 to the allocation count that is associated with the identified VLAN number. Then, the VLAN allocation control unit 20*a* outputs, to the conversion information creating unit 20*b*, the VM ID of the VM to be created, the specified VTEP ID of the VTEP, the identified VLAN number, and the instruction to create the conversion information.

In contrast, if no VM ID to which the same VNI allocated to the VM to be created is allocated is present in the identified VM ID, the VLAN allocation control unit 20*a* performs the following process. First, The VLAN allocation control unit 20*a* selects one VLAN number from among the VLAN numbers associated with the specified VTEP ID of the VTEP stored in the VLAN pool 14. Then, the VLAN allocation control unit 20*a* deletes the selected VLAN number from the VLAN pool 14.

Then, the VLAN allocation control unit 20*a* retains, in an associated manner in the allocation count management DB 15, the selected VLAN number, the specified VTEP ID of the VTEP, an allocation count of 1, and the VM ID of the VM that is newly created. Then, the VLAN allocation control unit 20*a* outputs, to the conversion information creating unit 20*b*, the VM ID of the VM to be created, the specified VTEP ID of the VTEP, the specified VLAN number, and an instruction to create conversion information.

In the following, a description will be given of a process performed by the VLAN allocation control unit 20*a* when a VM is stopped. First, the VLAN allocation control unit 20*a* receives the VM ID of the VM to be stopped and an instruction to delete the conversion information. Then, the VLAN allocation control unit 20*a* specifies an entry, from the allocation count management DB 15, in which the received VM ID is retained and then subtracts 1 from the allocation count of the specified entry. Then, the VLAN allocation control unit 20*a* determines whether the result obtained by subtracting 1 from the allocation count indicates that the allocation count is "0".

If the result obtained by subtracting 1 from the allocation count indicates that the allocation count is "0", the VLAN allocation control unit 20*a* stores therein the VTEP ID and the VLAN number that are retained in the specified entry and then deletes the specified entry. Furthermore, the VLAN allocation control unit 20*a* retains, in an associated manner in the VLAN pool 14, the stored VLAN number and the VTEP ID. Furthermore, the VLAN allocation control unit 20*a* outputs, to the conversion information creating unit 20*b*, the stored VLAN number, the VTEP ID, and an instruction to delete the conversion information.

In contrast, if the result of subtracting 1 from the allocation count indicates that the allocation count is not "0", the VLAN allocation control unit 20*a* ends the process without processing, for example, without deleting the specified entry and outputting the instruction to delete the conversion information, and the like. Specifically, if the result of subtracting 1 from the allocation count indicates that the allocation count is not "0", it means a VM with the same VLAN number as that allocated to the stopped VM is still running on the same VLAN in which the server that stopped the VM is present. Consequently, if the result obtained by subtracting 1 from the allocation count indicates that the allocation count is not "0", the VLAN allocation control unit 20*a* ends the process without outputting the instruction to delete the conversion information.

In the following, a description will be given of a process performed by the VLAN allocation control unit 20*a* when a VM is moved. First, the VLAN allocation control unit 20*a* receives, together with an instruction to update the conversion information from the VM management unit 18, the VM ID of the VM to be moved, the server ID that indicates the move source server, and the server ID that indicates the move destination server.

In such a case, the VLAN allocation control unit 20*a* recognizes the server ID that indicates the move destination server as the server ID of the server that creates a new VM and also recognizes the received VM ID as the VM ID of the new VM. Then, the VLAN allocation control unit 20*a* performs the process that is performed when the new VM described above is created.

Then, the VLAN allocation control unit 20*a* recognizes the server ID that indicates the move source server as the server ID of the server that operates the VM to be stopped and recognizes the received VM ID as the VM ID of the VM to be stopped. Then, the VLAN allocation control unit 20*a* performs the process that is to be performed when the VM described above is stopped. Specifically, if a VM is moved, the VLAN allocation control unit 20*a* performs both the process for creating a VM and the process for stopping the VM.

The conversion information creating unit 20*b* creates conversion information in which the VNI that is allocated by the VNI allocation control unit 19*a* is associated with the VLAN number that is selected by the VLAN allocation control unit 20*a* and then delivers the conversion information to each of the switches 3*a*, 5*a*, and 7*a*. In the following, a description will be given of a process performed by the conversion information creating unit 20*b*.

First, the conversion information creating unit 20*b* receives, from the VLAN allocation control unit 20*a*, the VM ID of the VM to be created, the VTEP ID, the VLAN number, and an instruction to create conversion information. In such a case, the conversion information creating unit 20*b* acquires, from the VM virtual network DB 13, the VNI that is associated with the VM ID of the VM to be created. Then, the conversion information creating unit 20*b* creates conversion information in which the VLAN number that is received from the VLAN allocation control unit 20*a* is associated with the VNI that is acquired from the VM virtual network DB 13.

Furthermore, the conversion information creating unit 20*b* identifies, from the VTEP location DB 11, a switch ID that is associated with the VTEP ID received from the VLAN allocation control unit 20*a*. Then, the conversion information creating unit 20*b* delivers the created conversion information to the switch indicated by the identified switch ID via the communication control unit 17.

For example, the conversion information creating unit 20*b* receives, from the VLAN allocation control unit 20*a*, the VM ID "1-1", the VTEP ID "#1", the VLAN number "10", and the instruction to create conversion information. Then, the conversion information creating unit 20*b* acquires the VNI "22" that is associated with the VM ID "1-1" from the VM virtual network DB 13. Furthermore, the conversion information creating unit 20*b* acquires the switch ID "#1" that is associated with the VTEP ID "#1" from the VTEP location DB 11. Then, the conversion information creating unit 20*b* delivers the change information in which the VLAN number "10" is associated with the VNI "22" to the switch 3*a* indicated by the switch ID "#1".

Furthermore, the conversion information creating unit 20*b* receives, from the VLAN allocation control unit 20*a*, the VLAN number, VTEP ID, and the instruction to delete the conversion information. In such a case, the conversion information creating unit 20*b* identifies, from the VTEP location DB 11, the switch ID that is associated with the received VTEP ID. Then, the conversion information creating unit 20*b* instructs, via the communication control unit 17, the switch that is indicated by the identified switch ID to delete the conversion information that includes the received VLAN number.

For example, the conversion information creating unit 20*b* receives, from the VLAN allocation control unit 20*a*, the VM ID "2-1", the VTEP ID "#2", the VLAN number "110", and the instruction to delete the conversion information. In such a case, the conversion information creating unit 20*b* identifies, from the VTEP location DB 11, the switch ID "#2" that is associated with the VTEP ID "#2" and then instructs the switch 5*a* indicated by the switch ID "#2" to delete the conversion information that includes the VLAN number "110".

Figures 11, 12:
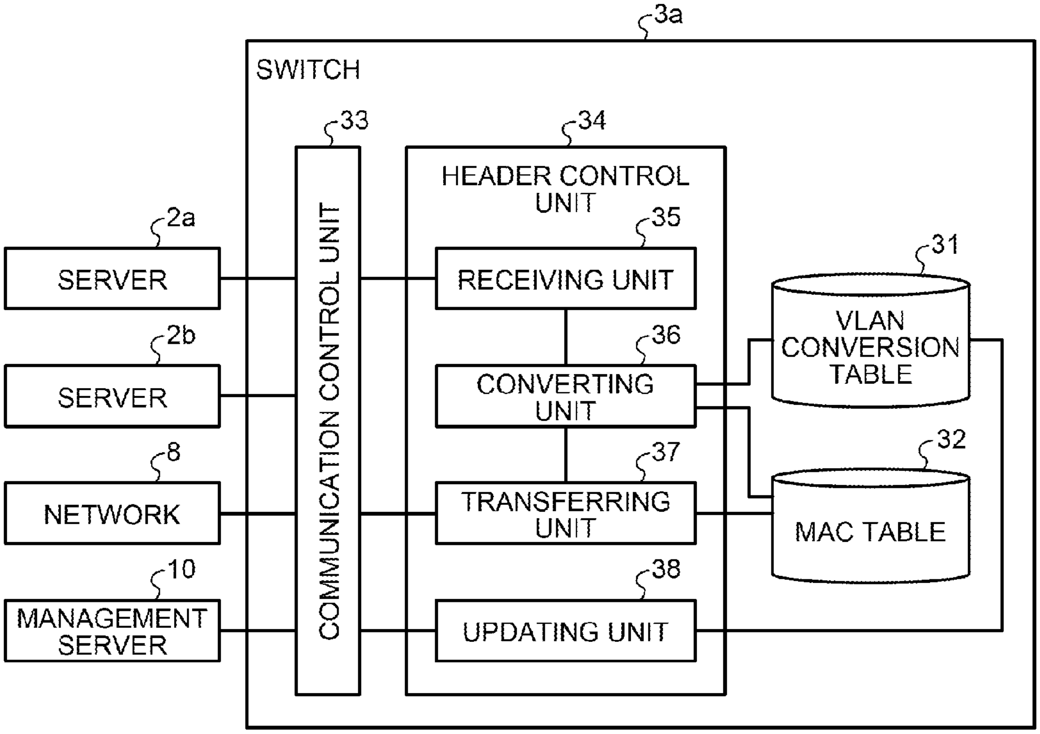
FIG. 11 is a schematic diagram illustrating an example of the functional configuration of a switch.
FIG. 12 is a schematic diagram illustrating an example of a VLAN conversion table.

In the following, the functional configuration of the switch 3*a* will be described with reference to FIG. 11. FIG. 11 is a schematic diagram illustrating an example of the functional configuration of a switch. In the example illustrated in FIG. 11, the switch 3*a* includes a VLAN conversion table 31, a MAC table 32, a communication control unit 33, and a header control unit 34. The header control unit 34 includes a receiving unit 35, a converting unit 36, a transferring unit 37, and an updating unit 38.

The VLAN conversion table 31 stores therein conversion information. For example, FIG. 12 is a schematic diagram illustrating an example of a VLAN conversion table. In the example illustrated in FIG. 12, the VLAN conversion table 31 stores therein the conversion information in which the VNI "22" is associated with the VLAN number "10" and the conversion information in which the VNI "34" is associated with the VLAN number "20".

A description will be given here by referring back to FIG. 11. The MAC table 32 stores therein a MAC table that is used when the switch 3*a* transfers a packet. For example, FIG. 13 is a schematic diagram illustrating an example of a MAC table. As illustrated in FIG. 13, the MAC table 32 stores therein a MAC table in which a MAC address, a VLAN number, and a transfer destination are associated with each other. Specifically, the MAC table 32 stores therein, in an associated manner, a MAC address that is the transmission destination of a packet, a VLAN number that is the transmission destination of the packet, and the transfer destination of the packet.

In the example illustrated in FIG. 13, the MAC table 32 stores therein information indicating that the packet with the destination MAC address of "MAC #1" and the destination VLAN number of "10" is transferred to the server 2*a*. Furthermore, the MAC table 32 stores therein information indicating that the packet with the destination MAC address of "MAC #2" and the destination VLAN number of "20" is transferred to the server 2*b*. Furthermore, the MAC table 32 stores therein information indicating that the packet with the destination MAC address of "MAC #3" or "MAC #4" and the destination VLAN number of "30", "40", or the like is transferred to the network 8.

A description will be given here by referring back to FIG. 11. If the communication control unit 33 receives a packet from one of the servers 2*a* and 2*b* and the network 8, the communication control unit 33 transfers the received packets to the receiving unit 35. Furthermore, if the communication control unit 33 receives a packet from the transferring unit 37, the communication control unit 33 transfers the packet to one of the servers 2*a* and 2*b* and the network 8 in accordance with the destination of the received packet. Furthermore, if the communication control unit 33 receives, from the management server 10, the conversion information or an instruction to delete the conversion information, the communication control unit 33 outputs the received conversion information or the instruction to delete the conversion information to the updating unit 38.

If the receiving unit 35 receives a packet, the receiving unit 35 outputs the received packet to the converting unit 36. If the converting unit 36 receives the packet, the converting unit 36 performs the conversion process on the received packet. Specifically, if the header portion of the received packet is the inner header, i.e., if the received packet is not encapsulated, the converting unit 36 acquires a destination MAC address from the Inner SA that is retained in the inner header. Then, the converting unit 36 refers to the MAC table 32 and determines whether the transfer destination that is associated with the acquired destination MAC address is the network 8. Specifically, the converting unit 36 determines whether the packet is transferred via the network 8.

If it is determined that the transfer destination that is associated with the acquired destination MAC address is the network 8, i.e., the packet is transferred via the network 8, the converting unit 36 encapsulates the packet. Specifically, the converting unit 36 acquires a VLAN number from the VLAN tag (C-tag) that is retained in the inner header. Then, the converting unit 36 acquires a VNI that is associated with the VLAN number from the VLAN conversion table 31. Then, the converting unit 36 attaches, to the packet, the outer header in which the VNI acquired from the VLAN conversion table 31 is retained, thereby encapsulating the packet.

Then, the converting unit 36 outputs the encapsulated packet to the transferring unit 37. In contrast, if the transfer destination that is associated with the acquired destination MAC address is not the network 8, the converting unit 36 outputs the received packet to the transferring unit 37 without encapsulating the packet.

Furthermore, if the header portion of the received packet is the outer header, i.e., if the received packet is encapsulated, the converting unit 36 acquires a VNI from the C-tag that is retained in the outer header. Then, the converting unit 36 acquires the VLAN number that is associated with the acquired VNI from the VLAN conversion table 31. Then, the converting unit 36 deletes the outer header of the received packet and then converts the VLAN number that is retained in the VLAN tag in the inner header to the VLAN number that is acquired from the VLAN conversion table 31. Then, the converting unit 36 outputs the packet to the transferring unit 37.

The transferring unit 37 performs the transfer process on a packet. Specifically, if the transferring unit 37 receives an encapsulated packet from the converting unit 36, the transferring unit 37 acquires a destination MAC address from the Inner DA that is retained in the inner header in the received packet. Then, the transferring unit 37 reads the transfer destination that is associated with the acquired destination MAC address from the MAC table 32 and then instructs the communication control unit 33 to transfer the packet to the read transfer destination. The transferring unit 37 instructs the communication control unit 33 to output the encapsulated packet to the network 8.

Furthermore, if the transferring unit 37 receives a packet that is not encapsulated, the transferring unit 37 acquires a destination MAC address from the Inner DA in the received packet. Then, the transferring unit 37 reads, from the MAC table 32, the MAC address of the transfer destination VTEP that is associated with the acquired destination MAC address and then instructs the communication control unit 33 to transfer the packet to the read transfer destination.

The updating unit 38 updates the VLAN conversion table 31. For example, if the updating unit 38 receives conversion information from the management server 10, the updating unit 38 retains the received conversion information in the VLAN conversion table 31. Furthermore, if the updating unit 38 receives an instruction to delete the conversion information together with the VLAN number from the management server 10, the updating unit 38 specifies conversion information that includes the received VLAN number from among the pieces of conversion information stored in the VLAN conversion table 31. Then, the updating unit 38 deletes the specified conversion information.

Although the description was omitted in the above, the header control unit 34 may also have a function of learning the MAC table 32 by using the transmission source MAC address of the received packet. For example, the converting unit 36 identifies a transmission source MAC address from an Outer SA or an Inner SA of the received packet and then identifies a VLAN number from the C-tag. Then, the converting unit 36 may also retain, in an associated manner in the MAC table 32, a device that is the transmission source of the packet, the identified transmission source MAC address, and the VLAN number retained in the packet.

Figure 14:
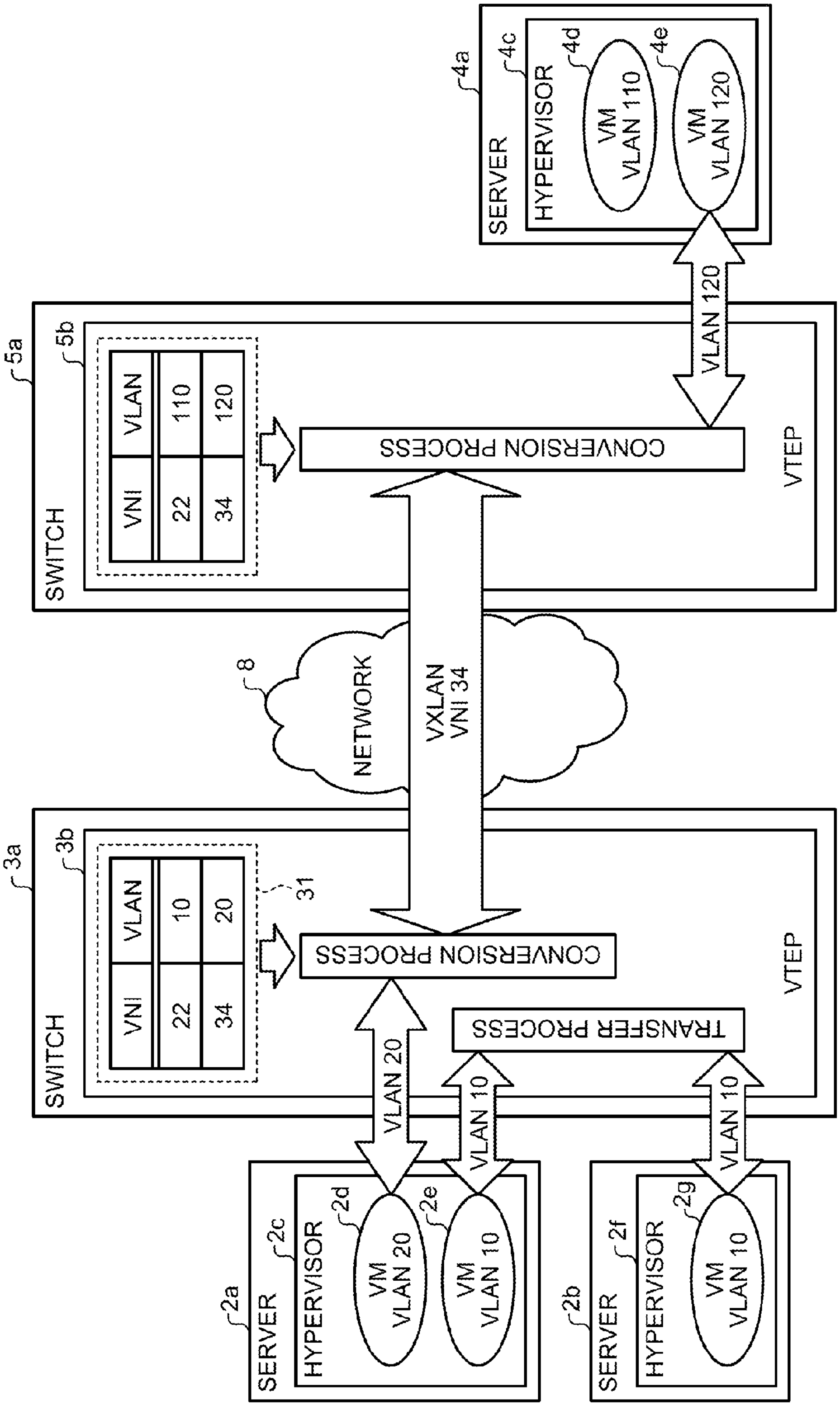
FIG. 14 is a schematic diagram illustrating an example of a conversion process performed by the switch.

In the following, an example of the conversion process performed by a switch will be described with reference to FIG. 14. FIG. 14 is a schematic diagram illustrating an example of a conversion process performed by the switch. In the example illustrated in FIG. 14, the server 2*a* executes the hypervisor 2*c*, whereby the server 2*a* operates the VM 2*d* and the VM 2*e* on the hypervisor 2*c*. Furthermore, the server 2*b* executes the hypervisor 2*f*, whereby the server 2*a* operates the VM 2*g* on the hypervisor 2*f*. Furthermore, the server 4*a* executes the hypervisor 4*c*, whereby the server 2*a* operates the VM 4*d* and the VM 4*e* on the hypervisor 4*c*.

At this point, the switch 3*a* functions as the VTEP 3*b*, which performs the termination process on a packet exchanged by the server 2*a* and the server 2*b*. Furthermore, the switch 5*a* functions as the VTEP 5*b*, which performs the termination process on a packet exchanged by the server 4*a*. Furthermore, it is assumed that the VM 2*d* and the VM 4*e* are VMs that are used by the tenant "B" and that the VM 2*e*, the VM 2*g*, and the VM 4*d* are VMs that are used by the tenant "A". Furthermore, in the example illustrated in FIG. 14, it is assumed that VMs that are used by the same tenant can perform packet communication with each other and that VMs that are used by different tenants are not able to perform packet communication with each other.

Here, the management server 10 allocates a VNI for each tenant that uses VMs from among the VMs 2*d*, 2*e*, 2*g*, 4*d*, and 4*e* across the entire multi-tenant system 1. For example, the management server 10 allocates the VNI "22" to VMs that are used by the tenant "A" and allocates the VNI "34" to VMs that are used by the tenant "B".

Furthermore, the management server 10, for each of the VTEPs 3*b* and 5*b*, independently allocates, to each of the VMs 2*d*, 2*e*, 2*g*, 4*d*, and 4*e*, a VLAN number of a VLAN in which each of the VTEPs 3*b* and 5*b* performs the termination process. Specifically, the management server 10 selects, in the VLAN in which the VTEP 3*b* performs the termination process, a unique VLAN number allocated for each tenant that uses one or more VMs from among the VMs 2*d*, 2*e*, and 2*g*. Furthermore, the management server 10 selects, in a VLAN in which the VTEP 5*b* performs the termination process, a unique VLAN number allocated for each tenant that uses one or more VMs from among the VMs 2*d*, 2*e*, and 2*g*.

Consequently, in the example illustrated in FIG. 14, the management server 10 allocates the VLAN number "20" to the VM 2*d* and allocates the VLAN number "10" to the VM 2*e* and the VM 2*g*. Furthermore, the management server 10 allocates the VLAN number "110" to the VM 4*d* and allocates the VLAN number "120" to the VM 4*e*. Specifically, even if VMs are used by the same tenant, the management server 10 permits a different VLAN number to be attached to each of the VMs that are included in different VTEPs.

Then, the management server 10 creates conversion information for each of the VTEPs 3*b* and 5*b* and distributes the created conversion information to the VTEPs 3*b* and 5*b*. Specifically, in the example illustrated in FIG. 14, the management server 10 delivers, to the VTEP 3*b*, the conversion table in which the VNI "22" is associated with the VLAN "10" and the VNI "34" is associated with the VLAN "20". Furthermore, the management server 10 delivers, to the VTEP 5*b*, the conversion table in which the VNI "22" is associated with the VLAN "110" and the VNI "34" is associated with the VLAN "120".

At this point, if the VM 2*e* with the VLAN number "10" outputs a packet whose destination is the VM 2*g* with the VLAN number "10", the VTEP 3*b* transfers, without encapsulating the packet, the packet to the VM 2*g* that is operated by the server 2*b*. Specifically, the VTEP 3*b* performs a packet transfer process that is the same process as that performed in a normal VLAN.

In contrast, if the VM 2*d* outputs a packet whose destination is VM 4*e*, the VM 2*d* outputs the packet by retaining the VLAN number "20" in the inner header. In such a case, the VTEP 3*b* refers to the conversion information and acquires the VNI "34" that is associated with the VLAN number "20". Then, the VTEP 3*b* transmits, by retaining the VNI "34" in the outer header, the packet to the VTEP 5*b* via the network 8.

Furthermore, if the VTEP 5*b* receives the packet in which the VNI "34" is retained in the outer header, the VTEP 5*b* refers to the conversion information and acquires the VLAN number "120" that is associated with the VNI "34". Then, if the VTEP 5*b* decapsulates the encapsulated packet, the VTEP 3*b* rewrites the VLAN number "20" retained in the inner header to the VLAN number "120". Then, the VTEP 5*b* outputs, to the VM 4*e*, the packet in which the rewritten VLAN number is retained.

As described above, the multi-tenant system 1 uses the VLAN number "20" from the VM 2*d* to the VTEP 3*b* to perform the packet transfer process that is the same process as that performed in a normal VLAN. Furthermore, the multi-tenant system 1 converts the VLAN number "20" to the VNI "34" at the VTEP 3*b* and performs the packet transfer process on a VXLAN, from the VTEP 3*b* to the VTEP 5*b*, that uses the VNI "34". Then, the multi-tenant system 1 converts VNI "34" to the VLAN number "120" at the VTEP 5*b* and performs the packet transfer process, which is the same process as that performed in a normal VLAN, by using the VLAN number "120" from the VTEP 5*b* to the VM 4*e*.

Consequently, even if the multi-tenant system 1 distributes different conversion information to each of the VTEPs

3*b* and 5*b*, the multi-tenant system 1 can implement packet communication between VMs that are used by a same tenant.

Figure 15:
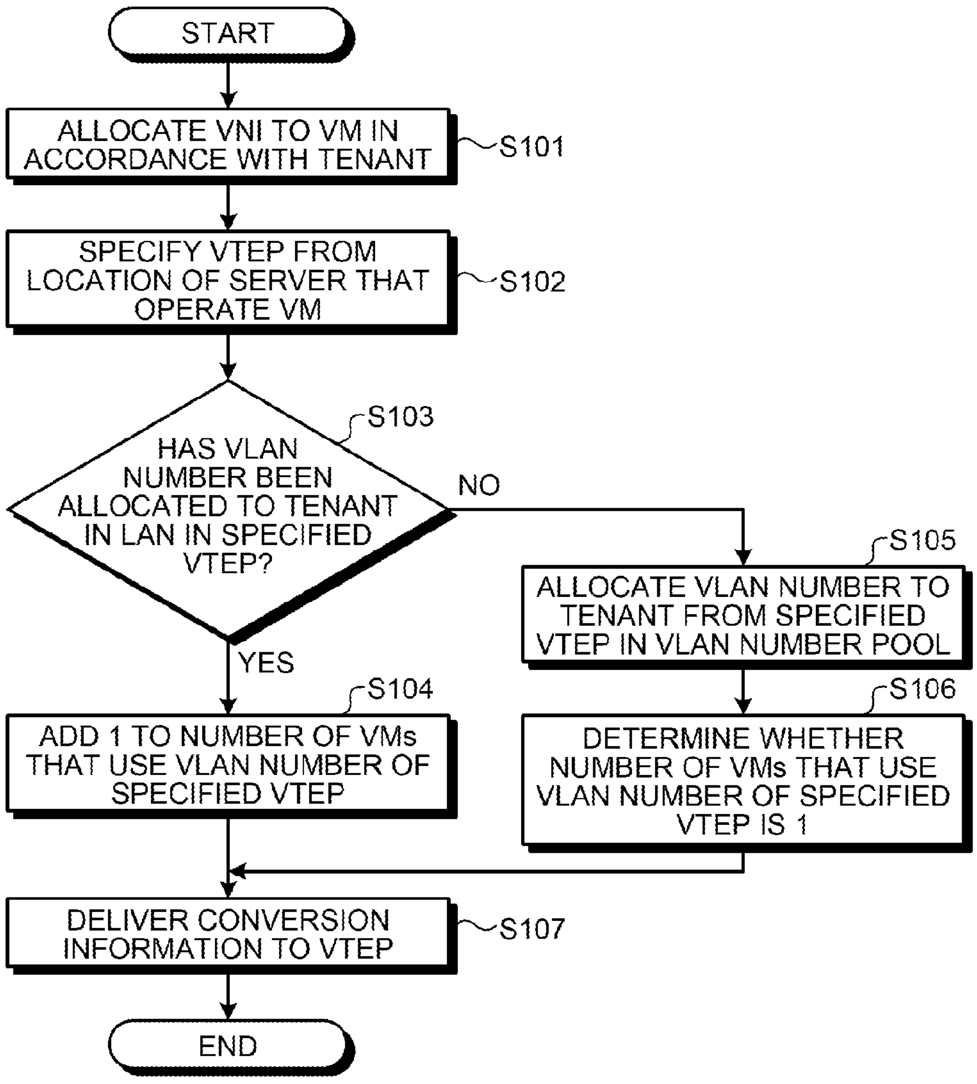
FIG. 15 is a flowchart illustrating the flow of a process for allocating a VNI and a VLAN number to a newly created VM.

In the following, a process performed, by the management server 10, when a VM is created will be described with reference to FIG. 15. FIG. 15 is a flowchart illustrating the flow of a process for allocating a VNI and a VLAN number to a newly created VM. First, the management server 10 allocates a VNI to a VM in accordance with a tenant that is using the VM (Step S101).

Then, the management server 10 specifies a VTEP on the basis of the location of the server that operates the VM (Step S102). Then, the management server 10 determines whether, in the VLAN in which the specified VTEP performs the termination process, a VLAN number has been allocated to VMs that are used by the same tenant (Step S103). If it is determined that VLAN numbers have been allocated to VMs that are used by the same tenant in the VLAN in which the specified VTEP performs the termination process (Yes at Step S103), the management server 10 adds 1 to the allocation count of the allocated VLAN (Step S104).

In contrast, if it is determined that VLAN numbers have not been allocated to VMs that are used by the same tenant in the VLAN in which the specified VTEP performs the termination process (No at Step S103), the management server 10 allocates a VLAN number. Specifically, the management server 10 allocates a VLAN number to a tenant at the specified VTEP in the VLAN pool 14 (Step S105). Then, the management server 10 sets the allocation count of the allocated VLAN number at the specified VTEP to "1" (Step S106). Then, the management server 10 delivers the conversion information to the VTEP (Step S107) and ends the process.

Figure 16:
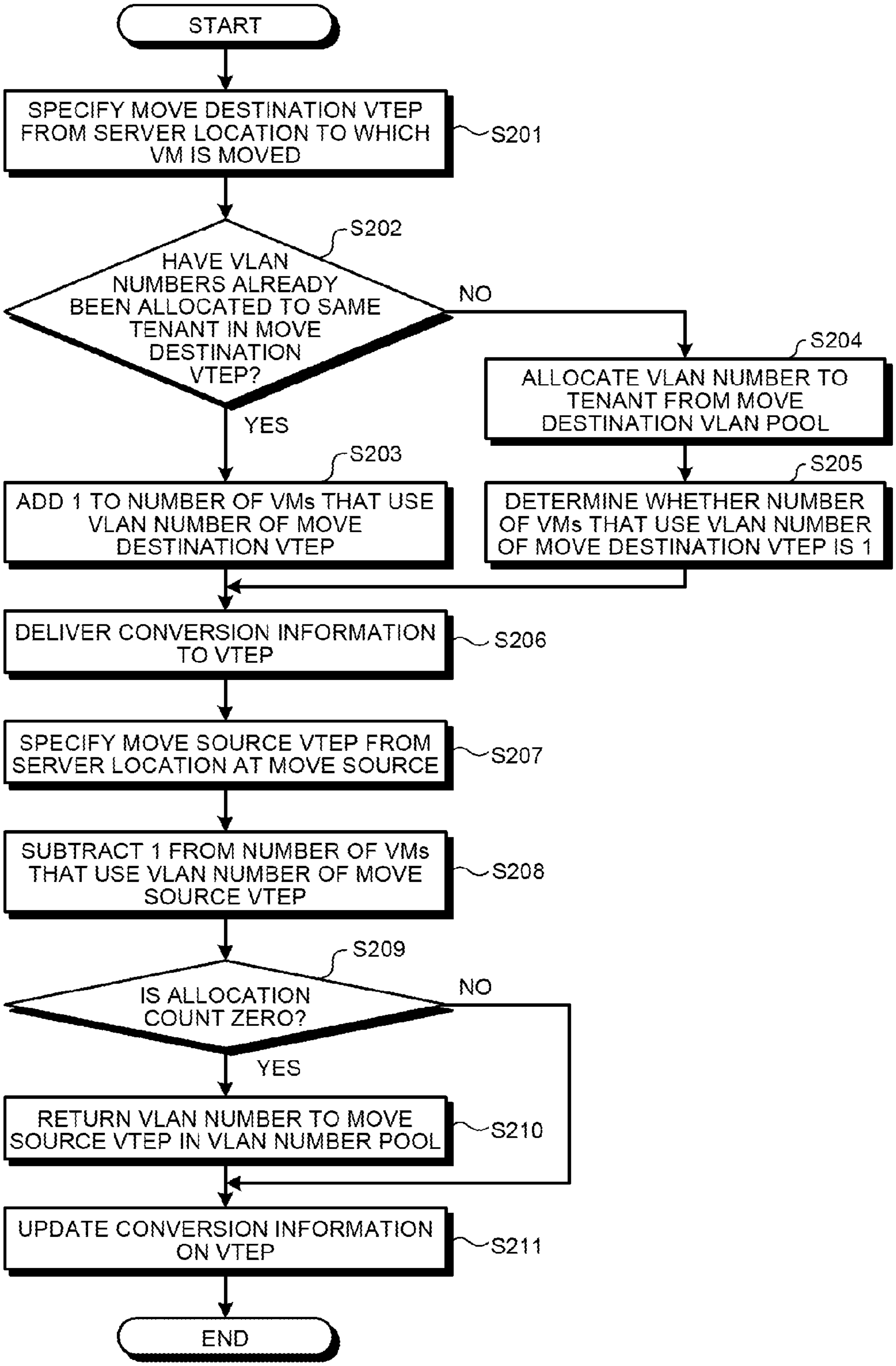
FIG. 16 is a flowchart illustrating the flow of a process for updating the VNI and the VLAN number when the VM is moved.

In the following, the flow of a process performed, by the management server 10, when a VM is moved will be described with reference to FIG. 16. FIG. 16 is a flowchart illustrating the flow of a process for updating the VNI and the VLAN number when the VM is moved. First, on the basis of the location of the move destination server to which the VM moves, the management server 10 specifies a VTEP that performs the termination process on the move destination server (hereinafter, referred to as a "move destination VTEP") (Step S201).

Then, the management server 10 determines whether VLAN numbers have already been allocated to VMs in the same tenant in the VLAN in which the move destination VTEP performs the termination process (Step S202). If it is determined that VLAN numbers have already been allocated to VMs in the same tenant in the VLAN in which the move destination VTEP performs the termination process (Yes at Step S202), the management server 10 performs the following process. Namely, the management server 10 adds 1 to the allocation count of the VLAN number that has already been allocated in the move destination VTEP (Step S203).

In contrast, if it is determined that VLAN numbers have not been allocated to VMs in the same tenant in the VLAN in which the move destination VTEP performs the termination process (No at Step S202), the management server 10 allocates a VLAN number. Namely, the management server 10 allocates, from the VLAN pool 14, a VLAN number to the tenant in the move destination VTEP (Step S204). Then, the management server 10 sets, in the move destination VTEP, the allocation count of the allocated VLAN number to "1" (Step S205). Then, the management server 10 delivers the conversion information to the move destination VTEP (Step S206).

Subsequently, the management server 10 specifies a VTEP that performs the termination process on the move source server of the VM (hereinafter, referred to as a move source VTEP) (Step S207). Then, at the specified move source VTEP, the management server 10 subtracts 1 from the allocation count associated with the VLAN number that is allocated to the VM to be moved (Step S208).

Furthermore, the management server 10 determines whether the allocation count of the VLAN number is "0" (Step S209). If it is determined that the allocation count of the VLAN number is "0" (Yes at Step S209), the management server 10 returns the VLAN number to the move source VTEP in the VLAN pool (Step S210). In contrast, if it is determined that the allocation count of the VLAN number is not "0" (No at Step S209), the management server 10 skips the process at Step S210. Then, the management server 10 updates the conversion information on the move source VTEP (Step S211) and then ends the process.

Figure 17:
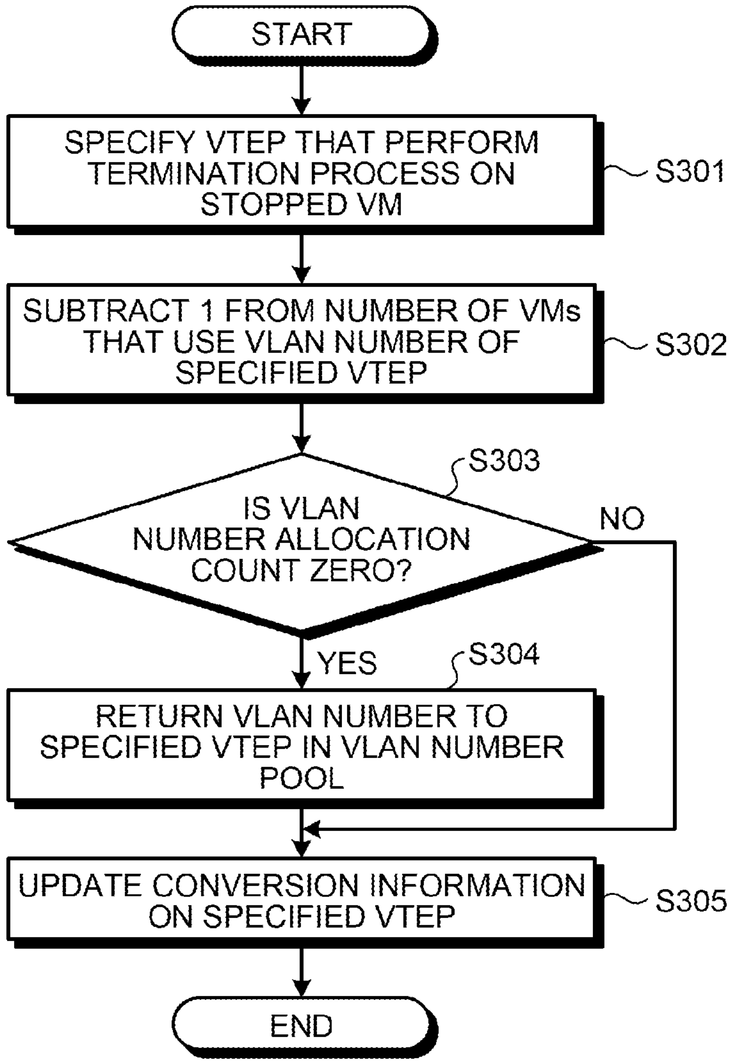
FIG. 17 is a flowchart illustrating the flow of a process for cancelling the allocation of the VNI and the VLAN number when the VM stops.

In the following, the flow of a process performed, by the management server 10, when a VM stops will be described with reference to FIG. 17. FIG. 17 is a flowchart illustrating the flow of a process for cancelling the allocation of the VNI and the VLAN number when the VM stops. First, the management server 10 specifies a VTEP that performs the termination process on a server on which the stopped VM was running (Step S301). Then, the management server 10 subtracts 1 from the allocation count of the VLAN number that is allocated to a running VM in the specified VTEP (Step S302).

Furthermore, the management server 10 determines whether the allocation count of the VLAN number is "0" (Step S303). If it is determined that the allocation count is "0" (Yes at Step S303), the management server 10 returns the VLAN number to the VLAN pool in the specified VTEP (Step S304). In contrast, if the allocation count of the VLAN number is not "0" (No at Step S303), the management server 10 skips the process at Step S304. Then, the management server 10 updates the conversion information on the specified VTEP (Step S305) and ends the process.

Advantage of the Multi-Tenant System 1

As described above, the multi-tenant system 1 includes the multiple VTEPs 3*b* and 5*b* that transfer, via the network 8, a packet output from a VM. Furthermore, the multi-tenant system 1 includes the management server 10 that manages each of the VTEPs 3*b* and 5*b*. The management server 10 allocates a VNI to VMs that are used by the same tenant in the multi-tenant system 1.

Then, the management server 10 selects, for each VTEP, a VLAN number that indicates a tenant that uses VMs in a VLAN in which a VTEP performs the termination process. Then, the management server 10 creates, for each VTEP, conversion information in which a VNI that is allocated to the VMs is associated with the selected VLAN number and distributes the created conversion information to each of the VTEPs.

Furthermore, each of the VTEPs 3*b* and 5*b* stores therein the conversion information distributed by the management server 10. If one of the VTEPs 3*b* and 5*b* receives a packet from a VM in a VLAN in which the termination process is performed, the VTEP that received the packet acquires, from the conversion information, a VNI that is associated with the VLAN number of the VM. Then, the VTEP that received the packet encapsulates the packet by using the acquired VNI and transfers the encapsulated packet via the network 8.

Consequently, the multi-tenant system 1 eliminates limitations on the number of VNIs that can be used when the conversion of a VLAN and a VXLAN is performed. Specifically, the multi-tenant system 1 sets, across the entire multi-tenant system 1, VNIs each of which indicates a tenant that uses VMs. Furthermore, the multi-tenant system 1 allocates, for each VLAN in which each of the VTEPs 3*b* and 5*b* performs the termination process, VLAN numbers each of which indicates a tenant that uses VMs.

Then, the multi-tenant system 1 associates the VNIs that are allocated across the entire multi-tenant system 1 with the VLAN numbers that are allocated for each VTEP in which each of the VTEPs 3*b* and 5*b* performs the termination process. Consequently, the multi-tenant system 1 can freely set the mapping between the VLAN numbers and the VNIs for each VTEP in which each of the VTEPs 3*b* and 5*b* performs the termination process. Consequently, the multi-tenant system 1 can eliminate limitations on the number of VNIs that can be used when the conversion of a VLAN and a VXLAN is performed and thus the multi-tenant system 1 can increase the maximum number of tenants that can be used in the multi-tenant system 1 up to the number of VNIs (24 bits).

Furthermore, for example, if the VTEP 5*b* receives an encapsulated packet from the VTEP 3*b*, the VTEP 5*b* acquires, from the conversion information, the VLAN number that is associated with the VNI that is included in the outer header of the received packet. Then, the VTEP 5*b* converts the VLAN number that is included in the received packet to the VLAN number that is acquired from the conversion information and then transfers the packet to a VM. Consequently, even if different VLAN numbers are allocated to VMs that are used by the same tenant across VLANs in which each of the VTEPs 3*b* and 5*b* performs the termination process, the multi-tenant system 1 can implement packet communication between VMs that are used by the same tenant.

Furthermore, the management server 10 allocates the same VLAN number to VMs that are used by the same tenant in a single VLAN. Then, each of the VTEPs 3*b* and 5*b* transfers, in the VLAN, a packet without encapsulating the packet that is exchanged between VMs that are used by the same tenant in the same VLAN.

Consequently, the multi-tenant system 1 can implement, in a VLAN in which a single VTEP performs the termination process, the operation of multiple VMs that are used by the same tenant and can improve the transfer speed of a packet in the VLAN. Specifically, in the multi-tenant system 1, because a packet transferred in the same VLAN is not encapsulated, the transfer speed of the packet can be improved.

Furthermore, the management server 10 includes the VLAN pool 14, in which a VTEP ID of each VTEP is associated with a VLAN number that is not allocated in a VLAN in which a VTEP performs the termination process. Then, for a VM that is used by a new tenant, the management server 10 allocates a VLAN number that is selected from the VLAN number associated with the VTEP ID of the VTEP that performs the termination process on the VM. Consequently, even if the VLAN number, which is allocated to VMs that are used by each tenant, is different for each VLAN, the management server 10 can select, for each tenant, a unique VLAN number for each of the VMs without performing a complicated process.

Furthermore, the management server 10 includes the allocation count management DB 15 that stores therein, in an associated manner, the VTEP ID of each VTEP, the VLAN number that is used by a VM in a VLAN in which each VTEP performs the termination process, and the allocation count of the VLAN number. Then, if the management server 10 stops a VM, the management server 10 subtracts 1 from the allocation count that is associated with the VLAN number that is used by the VM to be stopped. For the VLAN number whose allocation count is 0, the management server 10 returns the VLAN number to the VLAN pool 14. Consequently, the management server 10 can update the VLAN pool 14 such that an allocatable VLAN number obtained due to the stopping of a VM is stored.

[b] Second Embodiment

For example, the multi-tenant system 1 may also install the VLAN pool 14 and the allocation count management DB 15 in the switch 3*a* and the switch 3*a* may also allocate a VLAN number in accordance with a query received from a VNI converting unit that is running on a hypervisor executed by the server 2*a*. In the following, a second embodiment will be described in which a VLAN number allocation is performed on a hypervisor that is executed by the server 2*a*. In the description below, it is assumed that the servers 2*b*, 4*a*, 4*b*, 6*a*, and 6*b* have the same function as that performed by the server 2*a*; therefore, descriptions thereof will be omitted.

Figure 18:
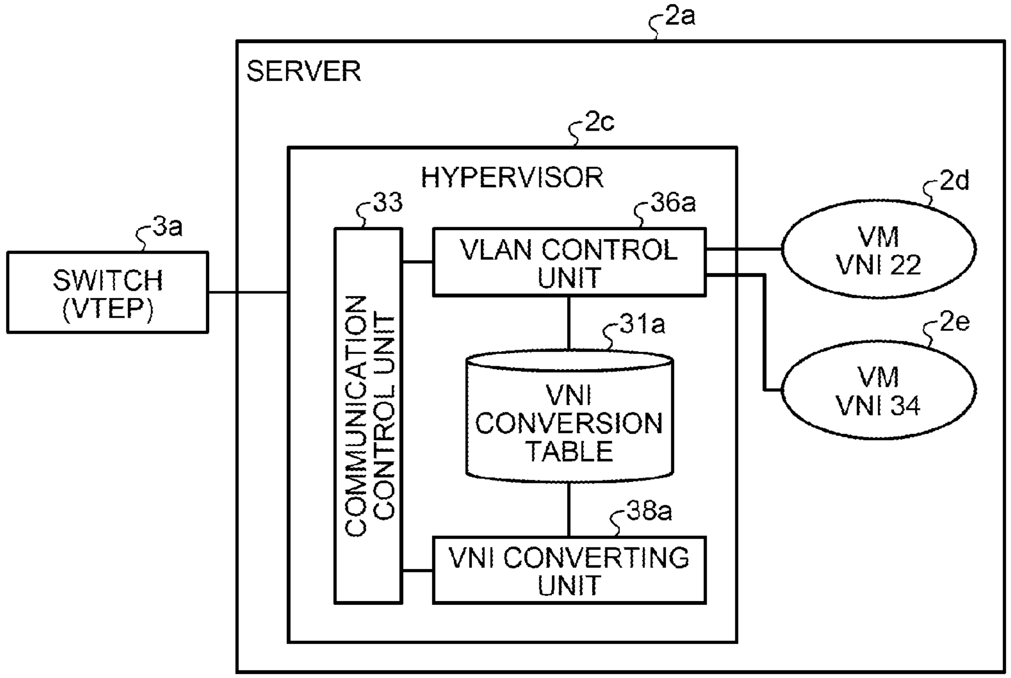
FIG. 18 is a schematic diagram illustrating an example of the functional configuration of a server according to a second embodiment.

For example, FIG. 18 is a schematic diagram illustrating an example of the functional configuration of a server according to the second embodiment. As illustrated in FIG. 2, the server 2*a* operates the hypervisor 2*c*, whereby the server 2*a* operates the VMs 2*d* and 2*e* on the hypervisor 2*c*. Furthermore, the hypervisor 2*c* includes a VNI conversion table 31*a*, the communication control unit 33, a VLAN control unit 36*a*, and a VNI converting unit 38*a*. The communication control unit 33 has the same function as that performed by the communication control unit 33 illustrated in FIG. 11; therefore, a description thereof in detail will be omitted.

The VNI conversion table 31*a* stores therein conversion information in which a VNI of a VM running on the server 2*a* is associated with a VLAN number. Specifically, the VNI conversion table 31*a* stores therein conversion information used for a VNI conversion process that associates VNIs that are allocated across the entire multi-tenant system 1 with unique VLAN numbers on the server 2*a*. The conversion information stored in the VNI conversion table 31*a* is conversion information, from among the pieces of conversion information stored in the VLAN conversion table 31, in which VNIs of VMs running on the server 2*a* are associated with VLAN numbers.

The VLAN control unit 36*a* has the same functions as those performed by the receiving unit 35, the converting unit 36, and the transferring unit 37 illustrated in FIG. 11. For example, the VLAN control unit 36*a* acquires a VLAN number that is associated with a VNI of one of the VMs 2*d* and 2*e* from the VNI conversion table 31*a* and attaches a VLAN tag to a packet by using the acquired VLAN number. Then, the VLAN control unit 36*a* outputs, to the switch 3*a* via the communication control unit 33, the packet to which the VLAN tag is attached.

Furthermore, if the VLAN control unit 36*a* receives a packet with a VLAN tag via the communication control unit 33, the VLAN control unit 36*a* deletes the VLAN tag and outputs the packet to the VM 2*d* or the VM 2*e*.

If the VNI converting unit 38*a* creates a VM that is used by a new tenant on the server 2*a*, the VNI converting unit 38*a* sends, to the switch 3*a*, a query about a VLAN number together with a query about a VNI that is allocated to the tenant that uses the VM to be created. The new tenant mentioned here is a tenant which is running on the server 2*a* and to which a VLAN number is not allocated.

Furthermore, if the VNI converting unit 38*a* stops a VM running on the hypervisor 2*c*, the VNI converting unit 38*a* notifies, via the communication control unit 33, the switch 3*a* of a VLAN that is allocated to the VM to be stopped. Furthermore, if the VNI converting unit 38*a* creates a VM that is used by a tenant, which is not a new tenant, on the server 2*a*, because the conversion information has already been retained in the VNI conversion table 31*a*, the VNI converting unit 38*a* does not send a query about the VLAN number.

Furthermore, if the VNI converting unit 38*a* moves a VM, the VNI converting unit 38*a* determines whether the server 2*a* is a move destination server and whether the tenant that uses the VM to be moved is a new tenant. If it is determined that the server 2*a* is the move destination server and the tenant is a new tenant, the VNI converting unit 38*a* sends a query about the VLAN number to the switch 3*a* together with the VNI that is allocated to the tenant that uses the VM. In contrast, if the server 2*a* is the move source server, the VNI converting unit 38*a* recognizes the VM to be moved as a VM to be stopped and then notifies the switch 3*a* of the VLAN that is allocated to the VM to be stopped.

Figure 19:
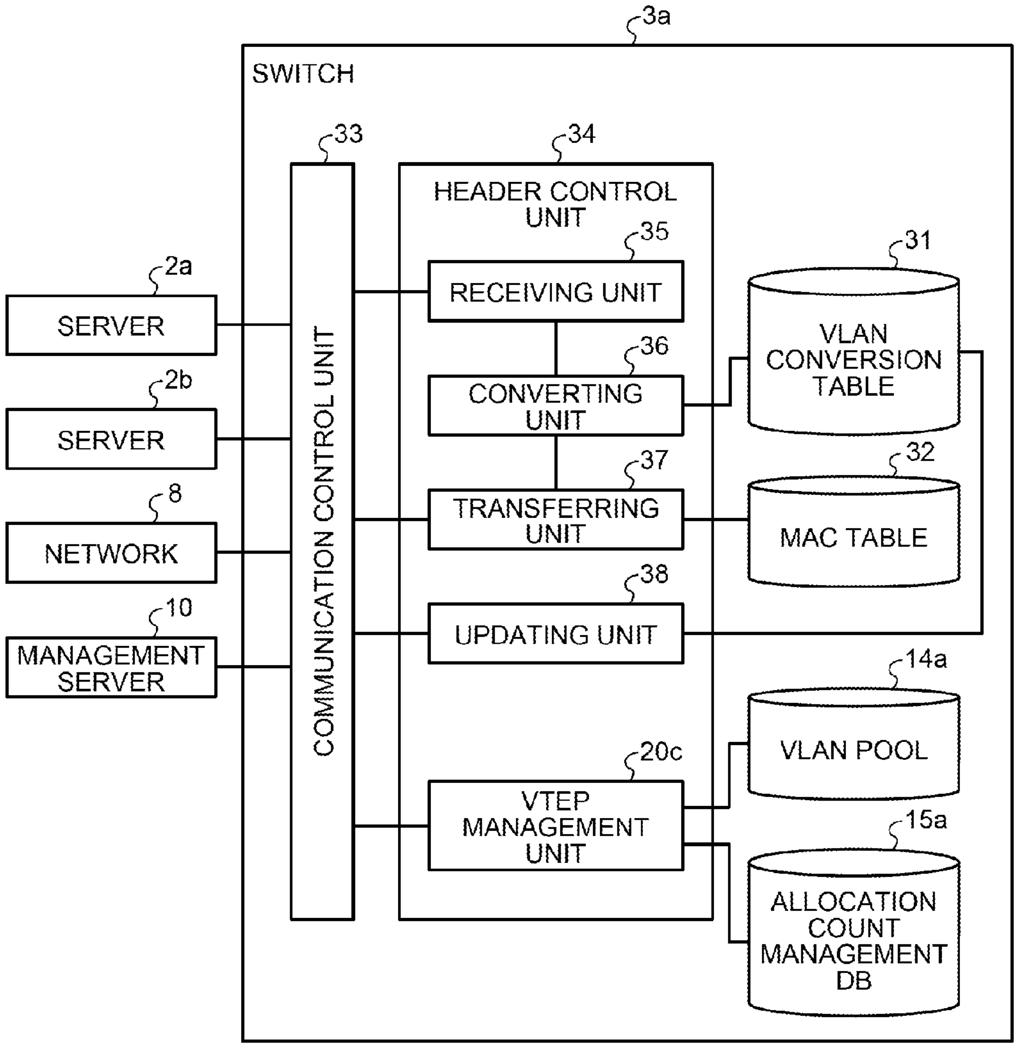
FIG. 19 is a schematic diagram illustrating an example of the functional configuration of a switch according to the second embodiment.

In the following, the functional configuration of the switch 3*a* according to second embodiment will be described with reference to FIG. 19. FIG. 19 is a schematic diagram illustrating an example of the functional configuration of a switch according to the second embodiment. In the example illustrated in FIG. 19, in addition to the functional configuration illustrated in FIG. 11, the switch 3*a* includes a VLAN pool 14*a*, an allocation count management DB 15*a*, and a VTEP management unit 20*c*.

If the VTEP management unit 20*c* receives a query about a VLAN from the server 2*a* together with a VNI, the VTEP management unit 20*c* selects, from the VLAN pool 14*a*, a VLAN number that is allocated to a tenant that uses a VM to be created. Then, the VTEP management unit 20*c* creates conversion information in which the selected VLAN number is associated with the acquired VNI and then transmits the created conversion information to the server 2*a*. Consequently, if the VNI converting unit 38*a* receives new conversion information from the switch 3*a*, the VNI converting unit 38*a* retains the received conversion information in the VNI conversion table 31*a*.

In contrast, if the VTEP management unit 20*c* receives a notification from the server 2*a* that a VM is stopped, the VTEP management unit 20*c* deletes 1 from the allocation count that is associated with the VLAN number allocated to the VM to be stopped and that is from among the allocation counts stored in the allocation count management DB 15*a*. Then, the VTEP management unit 20*c* notifies the server 2*a* that the server 2*a* needs to delete the conversion information that includes therein the VLAN number whose allocation count is "0". Consequently, the VNI converting unit 38*a* deletes, from the VNI conversion table 31*a*, the entry that includes the VLAN number that is allocated to the VM to be stopped.

Figure 20:
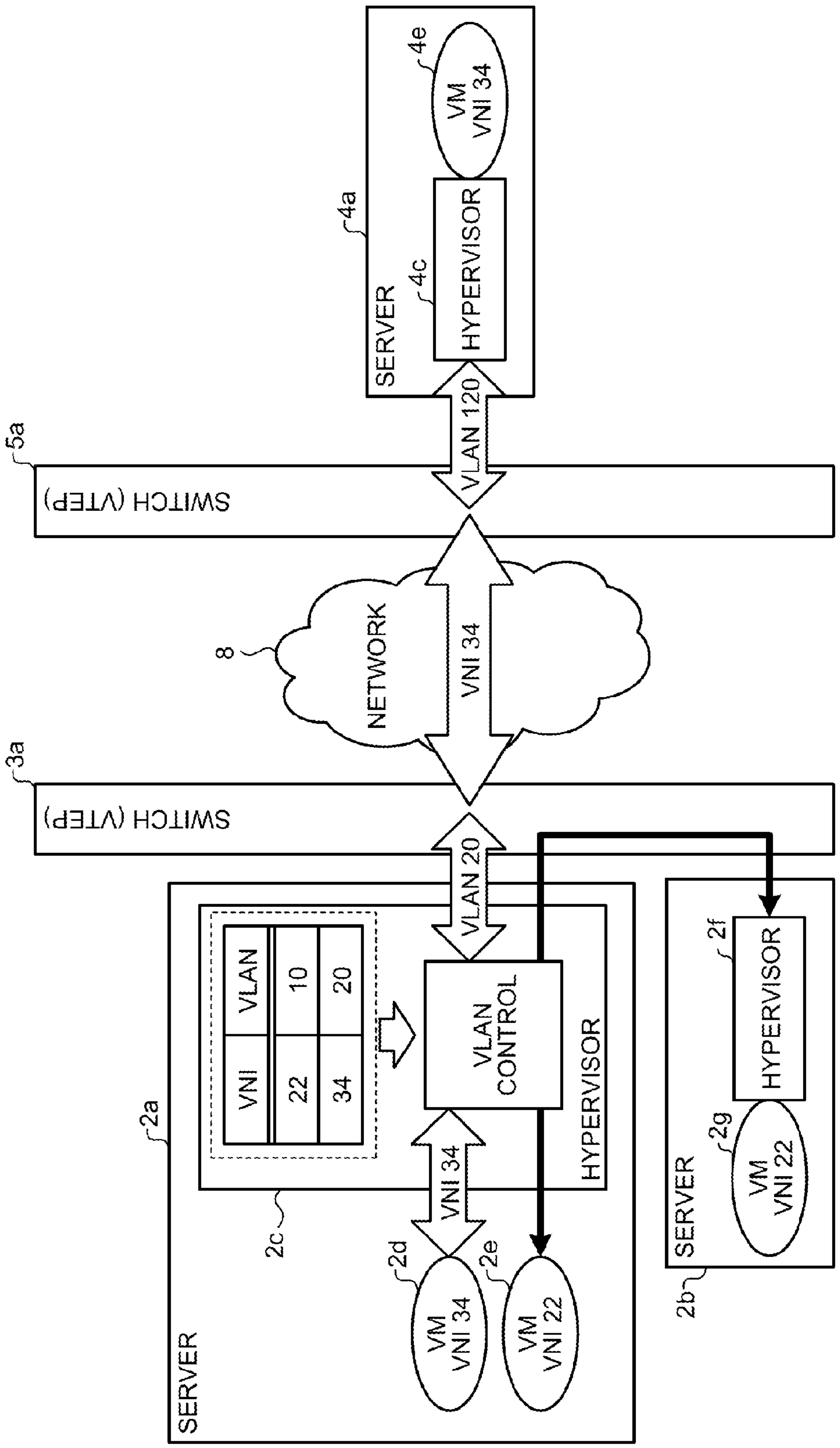
FIG. 20 is a schematic diagram illustrating a process performed by the server according to the second embodiment.

In the following, a process performed by the server 2*a* according to the second embodiment will be described with reference to FIG. 20. FIG. 20 is a schematic diagram illustrating a process performed by the server according to the second embodiment. In the example illustrated in FIG. 20, a VNI conversion process and a VLAN change process are running on the hypervisors 2*c*, 2*f*, and 4*c*.

For example, the VM 2*d* with the VNI number "34" outputs a packet that is addressed to the VM 4*e*. Then, the VLAN control unit 36*a* on the hypervisor 2*c* attaches a VLAN tag by using the VLAN number "20" that is associated with the VNI number "34" and then outputs the packet to the switch 3*a*. Then, the switch 3*a* encapsulates the packet at the VTEP and then transmits the encapsulated packet to the switch 5*a* via the network 8.

In contrast, the switch 5*a* converts the encapsulated packet to the VLAN number "120" at the VTEP and then transmits the packet to the server 4*a*. Then, the VLAN control unit 36*a* on the hypervisor 4*c* that is executed by the server 4*a* removes the VLAN tag from the packet and then outputs the packet to the VM 4*e*.

In contrast, the VM 2*e* with the VNI "22" outputs the packet that is addressed to the VM 2*g*. Then, the VLAN control unit 36*a* running on the hypervisor 2*c* uses the VLAN number "10" that is associated with the VNI "22" to attach a VLAN tag to the packet and outputs the packet to the switch 3*a*. In such a case, the switch 3*a* performs the transfer process on the packet by using the VLAN number "10" and the MAC address and then outputs the packet to the server 2*b*.

Then, the VLAN control unit running on the hypervisor 2*f* that is executed by the server 2*b* removes the VLAN tag from the packet and then outputs the packet to the VM 2*g*.

The server 2*a* according to the second embodiment described above may also be used, in combination, with the multi-tenant system 1 according to the first embodiment. Specifically, when transmitting a packet to one of the switches 3*a*, 5*a*, and 7*a* that includes a VTEP, if each of the servers 2*a*, 4*a*, and 6*a* transmits a packet in which a VLAN number is retained, each of the servers 2*a*, 4*a*, and 6*a* may also identify a VM to be operated by using its VNI or by using the VLAN number.

Furthermore, the management server 10 may also select, for each assembly of VMs belonging to a VTEP that performs the termination process, a VLAN number that indicates a tenant that uses a VM regardless of the location of the VTEP. Consequently, the management server 10 can allow each VTEP to appropriately perform the conversion process regardless of the location in which each VTEP is installed. Specifically, the management server 10 can allow each VTEP to perform the conversion process regardless of whether each of the servers 2*a*, 2*b*, 4*a*, 4*b*, 6*a*, and 6*b* offload the function of its associated VTEP.

For example, when the server 2*a* transmits a packet to the server 4*a*, the server 2*a* may or may not offload the function of the VTEP to the switch 3*a*. Furthermore, when the server 4*a* receives a packet from the server 2*a*, the server 4*a* may or may not offload the function of the VTEP to the switch 5*a*.

Figure 21:
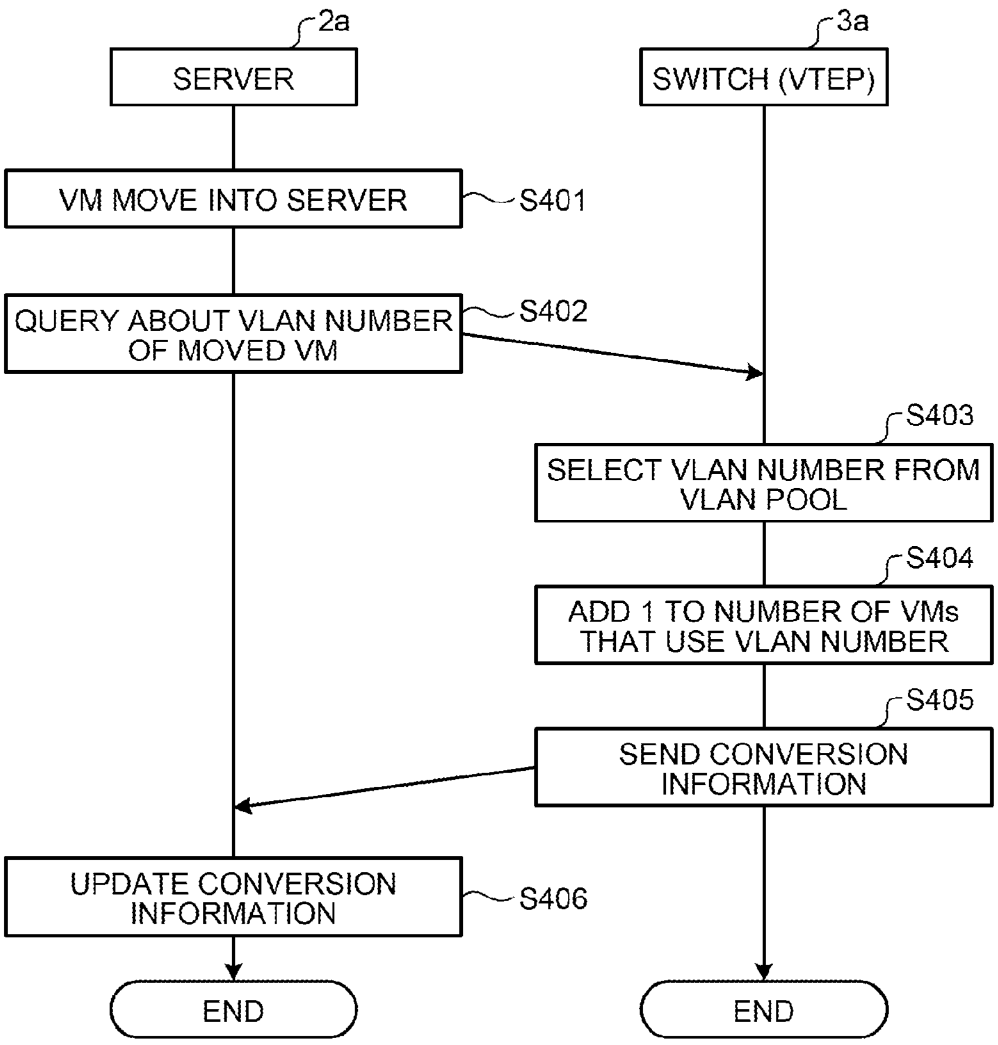
FIG. 21 is a sequence diagram illustrating an example of a process performed by a server corresponding to the move destination of the VM.
Figure 22:
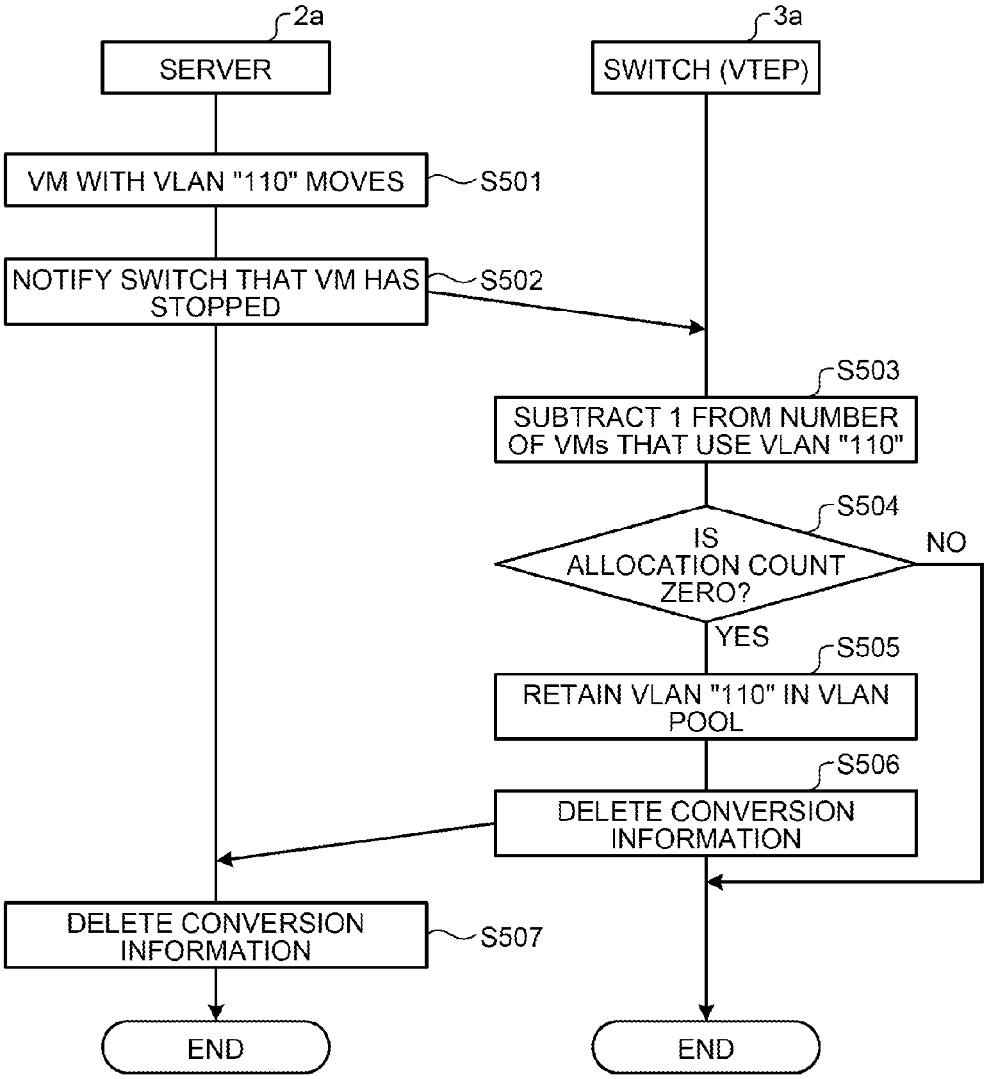
FIG. 22 is a sequence diagram illustrating an example of a VM process performed by a VTEP corresponding to the move source.

In the following, a process performed, by the server 2*a* and the switch 3*a*, when a VM is moved will be described with reference to FIGS. 21 and 22. First, the flow of a process performed by the server 2*a* and the switch 3*a* when the server 2*a* is the move destination of the VM will be described with reference to FIG. 21. FIG. 21 is a sequence diagram illustrating an example of a process performed by a server corresponding to the move destination of the VM. First, a VM moves to the server 2*a* (Step S401). Then, the server 2*a* sends, to the switch 3*a*, a query about the VLAN number of the moved VM (Step S402).

Then, the switch 3*a* selects a VLAN number to be allocated from among the VLAN numbers stored in the VLAN pool 14*a* (Step S403). Furthermore, the switch 3*a* adds 1 to the allocation count of the VM that uses the selected VLAN number (Step S404). Then, the switch 3*a* transmits the new conversion information to the server 2*a* (Step S405). In contrast, the server 2*a* retains the received conversion information in the VNI conversion table 31*a* (Step S406) and then ends the process.

In the following, the flow of a process performed, by the server 2*a* and the switch 3*a*, when the server 2*a* is the move source of the VM will be described with reference to FIG. 22. FIG. 22 is a sequence diagram illustrating an example of a VM process performed by a VTEP corresponding to the move source. In the example illustrated in FIG. 22, the VM with the VLAN number of "110" moves (Step S501). Then, the server 2*a* notifies the switch 3*a* that the VM has stopped (Step S502).

In such a case, the switch 3*a* subtracts 1 from the allocation count of the VLAN "110" (Step S503) and determines whether the allocation count is "0" (Step S504). If it is determined that the allocation count is "0" (Yes at Step S504), the switch 3*a* retains the VLAN number "110" in the VLAN pool (Step S505). Then, the switch 3*a* notifies the server 2*a* of the deletion of the conversion information (Step S506). Then, the server 2*a* deletes the conversion information on the VLAN number "110" (Step S507). In contrast, if it is determined that the allocation count is not "0" (No at Step S504), the switch 3*a* skips the processes at Steps S505 and S506.

Advantage of the Switch 3*a*

As described above, the switch 3*a* includes the VLAN pool 14 and the allocation count management DB 15*a*. The switch 3*a* transmits, to the VTEP 3*b* in accordance with a request from the VTEP 3*b* that is running on the server 2*a*, the conversion information in which a VLAN number of the server 2*a* is associated with a VNI across the entire multi-tenant system 1. Accordingly, the switch 3*a* can create conversion information that is used to perform the header conversion process that converts a VNI to a VLAN number by the server 2*a* without using the management server 10.

[c] Third Embodiment

In the first and the second embodiments, examples thus far have been given of a case in which the multi-tenant system 1 operates the VTEP 3*b* on the switch 3*a* or on the server 2*a*; however, the embodiment is not limited thereto. For example, the multi-tenant system 1 may also offload the function of the header conversion process to a network interface card (NIC), such as a single root input output virtualization (SR-IOV) adapter or a multiple physical function (MPF) adapter. In the following, an embodiment will be described in which the header conversion process running on such a NIC.

Figure 23:
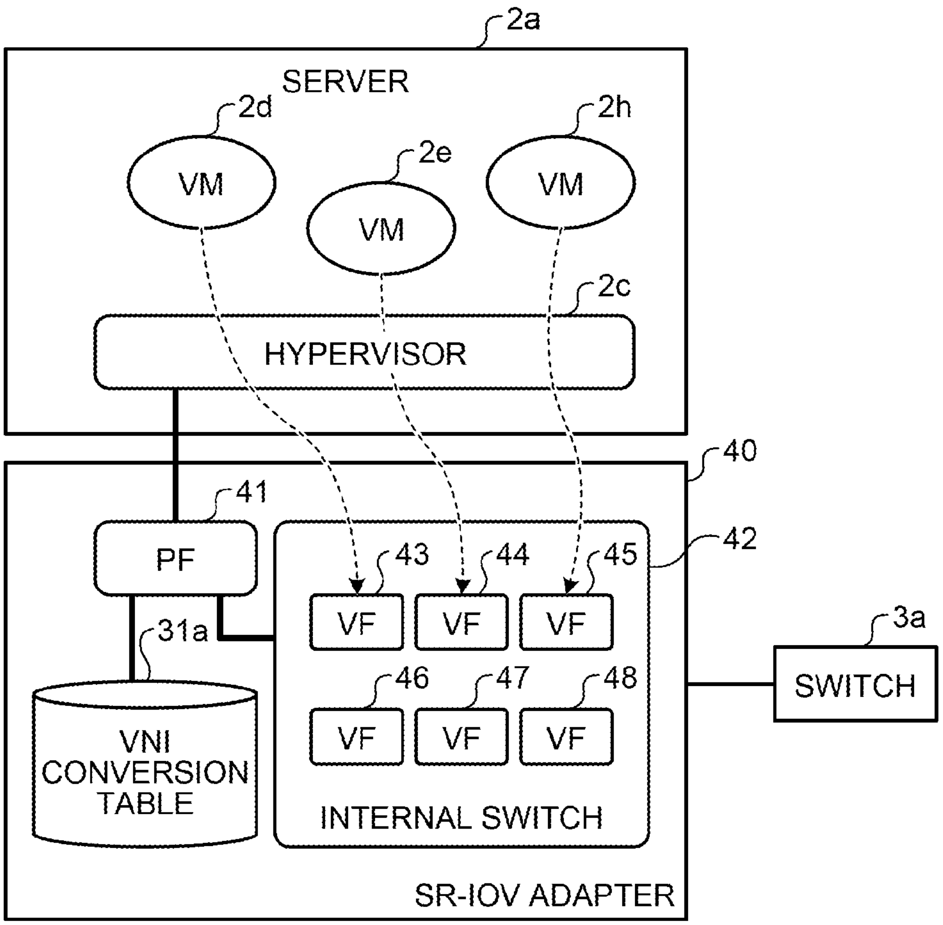
FIG. 23 is a schematic diagram illustrating an example of an SR-IOV adapter that has a conversion function.

In the following, an example of a NIC will be described with reference to a drawing. First, an example of an SR-IOV adapter will be described with reference to FIG. 23. FIG. 23 is a schematic diagram illustrating an example of an SR-IOV adapter that has a conversion function. For example, in the example illustrated in FIG. 23, the server 2*a* operates the hypervisor 2*c*, whereby the server 2*a* operates the multiple VMs 2*d* to 2*h* on the hypervisor 2*c*.

Furthermore, in the example illustrated in FIG. 23, an SR-IOV adapter 40 is installed between the server 2*a* and the switch 3*a*. The SR-IOV adapter 40 includes a single physical function (PF) 41, an internal switch 42, and the VNI conversion table 31*a*. Furthermore, the internal switch 42 includes multiple Virtual Functions (VFs) 43 to 48.

The PF 41 is a physical information processing unit that operates each of the VFs 43 to 48 included in the internal switch 42. The VFs 43 to 48 are virtual information processing units. The VFs 43 to 48 each operate as a direct input/output Virtual Network Interface Card (vNIC) that can directly be used, via the hypervisor 2*c*, by each of the VMs 2*d* to 2*h* running on the server 2*a*. For example, the VM 2*d* exchanges packets via the VF 43. Furthermore, the VM 2*e* exchanges packets via the VF 44. Furthermore, the VM 2*h* exchanges packets via the VF 45.

Here, the PF 41 acquires, from the VNI conversion table 31*a*, conversion information that includes VLAN numbers and VNIs that are allocated to the VMs 2*d* to 2*h* that use the VFs 43 to 48, respectively, and then allocates the acquired conversion information to the VFs 43 to 48. Then, by using the allocated conversion information, each of the VFs 43 to 48 performs the conversion process on a packet. For example, if the VM 2*d* uses the VF 43, the PF 41 allocates, to the VF 43, the conversion information in which the VNI that is allocated to the VM 2*d* is associated with the VLAN number.

Then, by using the allocated conversion information, the VF 43 performs the conversion process on a packet that is exchanged by the VM 2*d*. Specifically, each of the VFs 43 to 48 performs the header conversion process on a packet that is exchanged by its associated VM from among the VMs running on the server 2*a*.

Because a register can be easily installed in the SR-IOV adapter 40, a large number of VFs implemented in the internal switch 42 can be set. Consequently, even if many VMs are running on the server 2*a*, the SR-IOV adapter 40 can perform the header conversion process on packets exchanged by the VMs.

Furthermore, if the SR-IOV adapter 40 is used, the VMs 2*d* to 2*h* directly use the VFs 43 to 48, respectively; therefore, the hypervisor 2*c* needs to be associated with the SR-IOV adapter 40. Specifically, the hypervisor 2*c* needs to cooperate with the PF 41 to perform a process for, for example, associating the VMs 2*d* to 2*h* running on the server 2*a* with the VFs 43 to 48, respectively, or directly using the VFs 43 to 48 by the VMs 2*d* to 2*h*, respectively.

Here, the maximum number of VMs subjected to the header conversion process performed by the SR-IOV adapter 40 is the maximum number of VFs implemented in the internal switch 42. Consequently, instead of including the large-scale VNI conversion table 31*a*, the SR-IOV adapter 40 only includes the VNI conversion table 31*a* that can store therein the number of entries that is the same as that of the maximum number of VFs implemented in the internal switch 42. For example, if a peripheral components interconnect (PCI) is used, the maximum number of VFs is 256; therefore, the SR-IOV adapter 40 needs to include the VNI conversion table 31*a* that can store therein pieces of conversion information corresponding to 256 entries.

Figure 24:
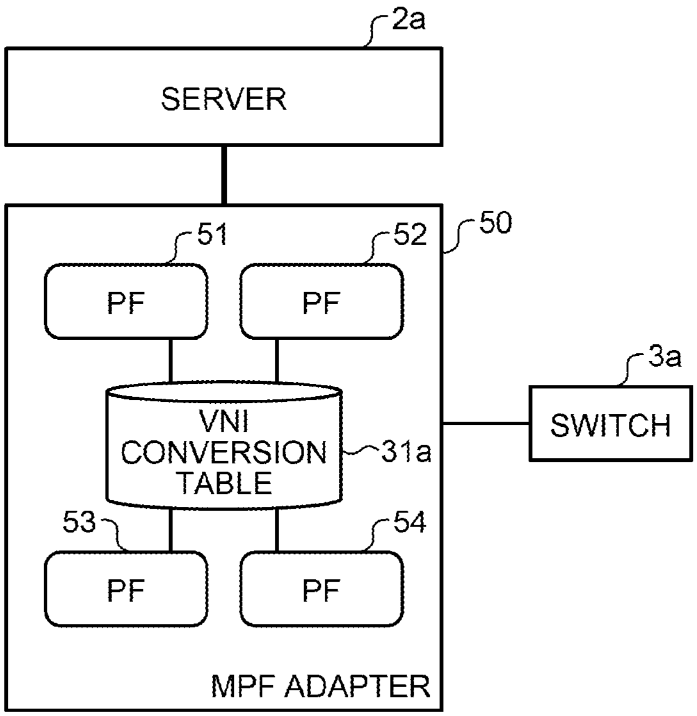
FIG. 24 is a schematic diagram illustrating an example of an MPF adapter that has a conversion function.

In the following, an example of the MPF adapter will be described with reference to FIG. 24. FIG. 24 is a schematic diagram illustrating an example of an MPF adapter that has a conversion function. As illustrated in FIG. 24, an MPF adapter 50 is installed between the server 2*a* and the switch 3*a* and performs the header conversion process on packets exchanged by the VMs that are running on the server 2*a*.

The MPF adapter 50 includes multiple PFs 51 to 54 and the VNI conversion table 31*a*. Each of the PFs 51 to 54 is a physical information processing unit that performs the header conversion process. Specifically, by using the conversion information stored in the VNI conversion table 31*a*, each of the PFs 51 to 54 performs the header conversion process on a packet exchanged between VMs running on the server 2*a*. More specifically, the MPF adapter 50 is recognized as a NIC that includes multiple ports, each of which performs the conversion process.

Here, each of the PFs 51 to 54 included in the MPF adapter 50 are independently running. Specifically, each of the PFs 51 to 54 performs the header conversion process on a packet exchanged by a VM running on the server 2$a$. Consequently, the MPF adapter 50 can be running on a standard device driver without associating the hypervisor 2$c$ executed by the server 2$a$ with the MPF adapter 50.

Furthermore, with the MPF adapter 50, each of the PFs 51 to 54 includes an independent register, and the function that can be performed by each of the PFs 51 to 54 is not limited. Consequently, an interrupt instruction, such as INTx or MSI/MSI-X, can be issued. In contrast, with the SR-IOV adapter 40, because the PF 41 centrally manages the registers of the VFs 43 to 48, the function that can be performed by each of the VFs 43 to 48 is limited. Consequently, interrupt instructions that can be issued are limited to MSI/MSI-X. An ethernet NIC or a host bus adapter (HBA) for a fibre channel may also be used for the SR-IOV adapter 40 and the MPF adapter 50.

Advantage of an NIC to which a Header Conversion Process is Offloaded

As described above, the SR-IOV adapter 40 and the MPF adapter 50 each perform the header conversion process on a packet that is exchanged between VMs running on the server 2$a$. Specifically, the SR-IOV adapter 40 and the MPF adapter 50 can offload, from the server 2$a$, the conversion process on a header in a packet. Consequently, the SR-IOV adapter 40 and the MPF adapter 50 can reduce the load placed on the server 2$a$.

Furthermore, the SR-IOV adapter 40 includes the multiple VFs 43 to 48 that are associated with VMs running on the server 2$a$. Then, each of the VFs 43 to 48 adds or deletes a VLAN tag by using a VLAN number that is associated with a VNI of a packet exchanged between the VMs. Consequently, the SR-IOV adapter 50 can simultaneously perform the conversion processes on VNIs and VLAN numbers that are included in packets exchanged by multiple VMs.

[d] Fourth Embodiment

In the first, the second, and the third embodiments, the multi-tenant system 1 allocates a VLAN number indicating a tenant that uses VMs in a network in which each of the VTEPs 3$b$ and 5$b$ performs the termination process; however, the embodiments are not limited thereto. Specifically, in the network in which each of the VTEPs 3$b$ and 5$b$ performs the termination process, the multi-tenant system 1 may also allocate a number other than the VLAN number as an identification number that indicates a tenant that uses the VMs.

In the following, a description will be given of the multi-tenant system 1 that allocates, as an identification number indicating a tenant that uses VMs, an extended VLAN number that indicates a group of the VFs 43 to 48 included in the SR-IOV adapter 40. A description will be given with the assumption that the multi-tenant system 1 has the same configuration as that illustrated in FIG. 1; therefore, a description thereof in detail will be omitted.

Figure 25:
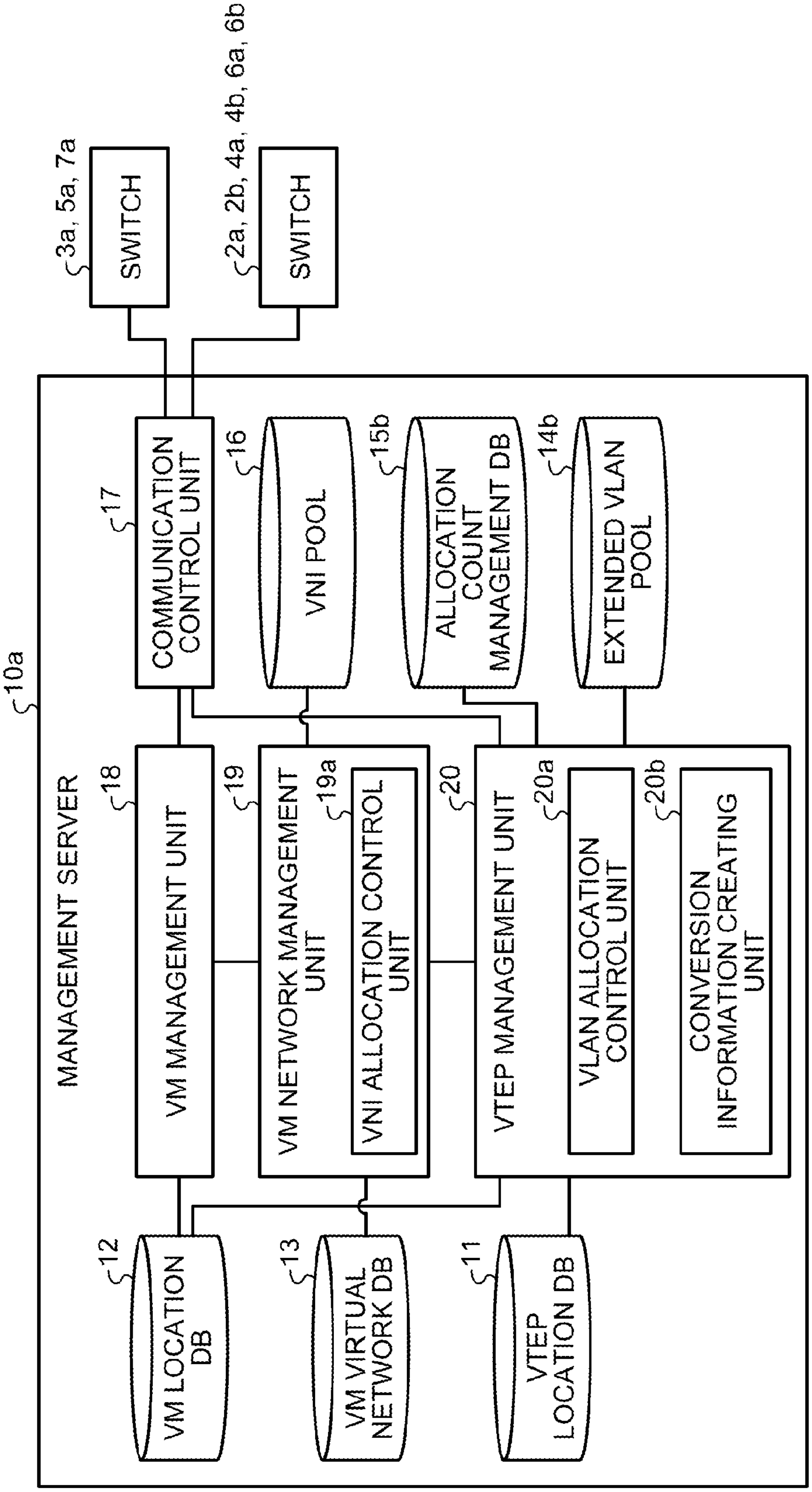
FIG. 25 is a schematic diagram illustrating an example of the functional configuration of a management server according to a fourth embodiment.

In the following, the functional configuration of a management server 10$a$ in the multi-tenant system 1 according to a fourth embodiment will be described with reference to FIG. 25. FIG. 25 is a schematic diagram illustrating an example of the functional configuration of a management server according to the fourth embodiment. As illustrated in FIG. 25, the management server 10$a$ includes the VTEP location DB 11, the VM location DB 12, the VM virtual network DB 13, an extended VLAN pool 14$b$, an allocation count management DB 15$b$, and the VNI pool 16. Furthermore, the management server 10$a$ includes the communication control unit 17, the VM management unit 18, the VM network management unit 19, and the VTEP management unit 20.

The VTEP location DB 11, the VM location DB 12, and the VM virtual network DB 13 store therein the same information as that stored in the VTEP location DB 11, the VM location DB 12, and the VM virtual network DB 13 illustrated in FIG. 5; therefore, descriptions thereof will be omitted. Furthermore, the communication control unit 17, the VM management unit 18, the VM network management unit 19, and the VTEP management unit 20 illustrated in FIG. 25 perform the same processes as those performed by the communication control unit 17, the VM management unit 18, the VM network management unit 19, and the VTEP management unit 20, respectively, illustrated in FIG. 5.

Figures 26, 27:
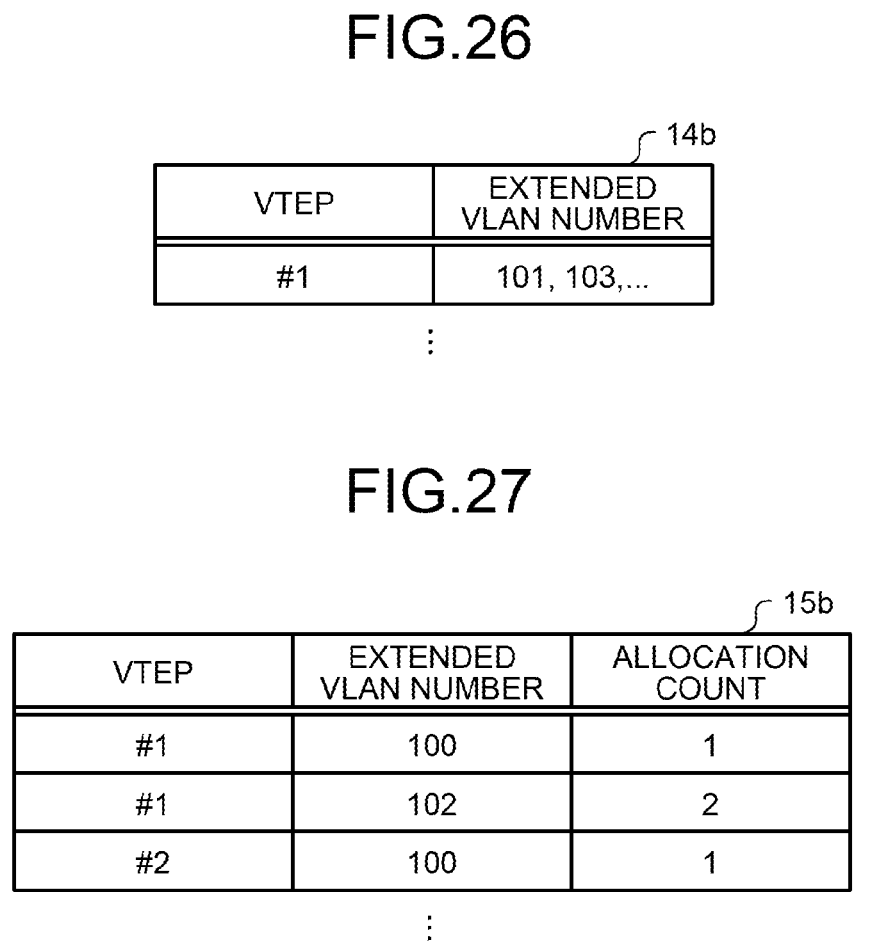

From among extended VLAN numbers that each indicate a tenant that uses VMs in a VLAN in which each VTEP performs the termination process, the extended VLAN pool 14$b$ stores therein, for each VTEP, an extended VLAN number that is not yet used. For example, FIG. 26 is a schematic diagram illustrating an example of information stored in an extended VLAN pool. In the example illustrated in FIG. 26, an extended VLAN pool 16$b$ stores therein, in an associated manner, a VTEP and an extended VLAN number. For example, in the example illustrated in FIG. 26, the extended VLAN pool 16$b$ stores therein, in an associated manner, the VTEP ID "#1", the extended VLAN numbers "101", "103", and the like.

In the following, information stored in the allocation count management DB 15$b$ will be described with reference to FIG. 27. FIG. 27 is a schematic diagram illustrating an example of information stored in an allocation count management DB according to the fourth embodiment. In the example illustrated in FIG. 27, the allocation count management DB 15$b$ stores therein, in an associated manner, a VTEP ID, an extended VLAN number, and an allocation count.

In the example illustrated in FIG. 27, the allocation count management DB 15$b$ stores therein, in an associated manner, the VTEP ID "#1", the extended VLAN number "100", and the allocation count "1". Furthermore, the allocation count management DB 15$b$ stores therein, in an associated manner, the VTEP ID "#1", the extended VLAN number "102", and the allocation count "2". Furthermore, the allocation count management DB 15$b$ stores therein, in an associated manner, the VTEP ID "#2", the extended VLAN number "100", and the allocation count "1".

In this way, the management server 10$a$ manages the extended VLAN number instead of the VLAN number that is managed by the management server 10. Consequently, the management server 10$a$ allocates, to a VM for each VNI subjected to the termination process by each VTEP, an extended VLAN number indicating a tenant and then distributes, to each VTEP, conversion information in which a VNI is associated with an extended VLAN number. Consequently, the management server 10$a$ can freely set a VLAN number to each tenant in the multi-tenant system 1.

Specifically, a tenant that moves a VM into the multi-tenant system 1 may sometimes continuously use the VLAN number that was previously used. In such a case, because the multi-tenant system 1 also uses conversion information in which an extended VLAN number is associated with a VNI, the multi-tenant system 1 can allow a tenant to freely use a VLAN number.

Furthermore, the VTEP that performs packet conversion by using conversion information in which an extended VLAN number is associated with a VNI can be located anywhere. Accordingly, in the following, a description will be given of an example of a process in which the SR-IOV adapter 40 that is installed between the server 2*a* and the switch 3*a* converts a packet by using the conversion information distributed by the management server 10*a*.

Figure 28:
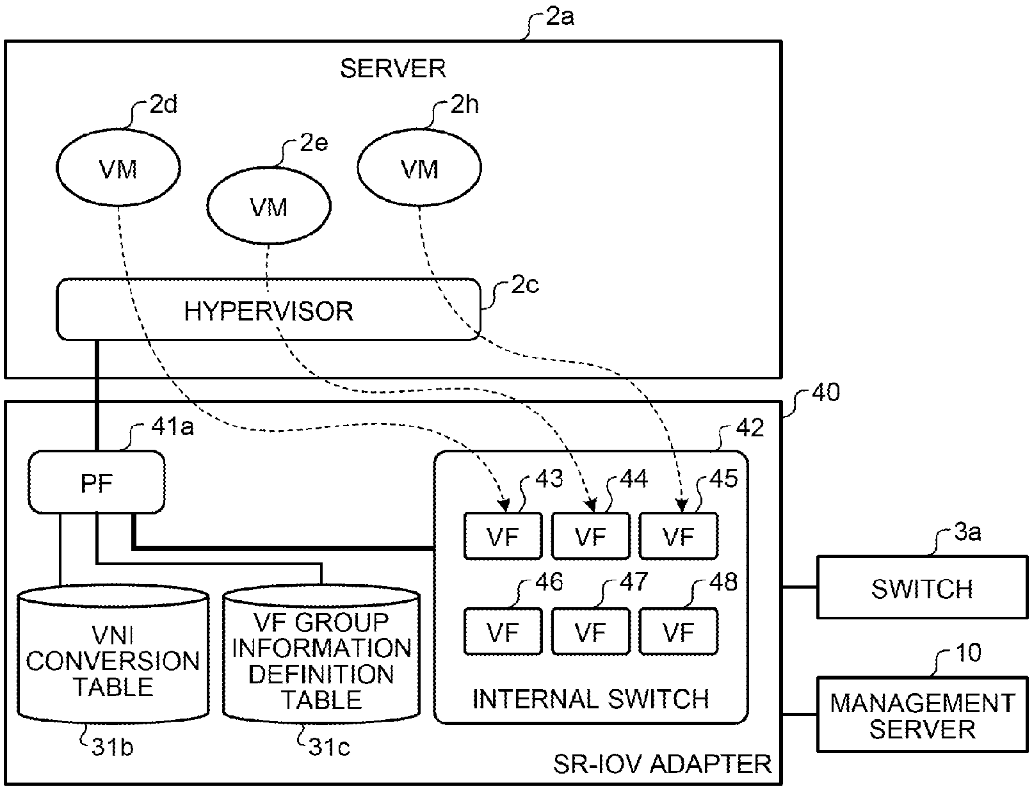
FIG. 28 is a schematic diagram illustrating an example of a server according to the fourth embodiment.

FIG. 28 is a schematic diagram illustrating an example of a server according to the fourth embodiment. In the example illustrated in FIG. 28, the SR-IOV adapter 40 is installed between the server 2*a* and the switch 3*a*. Furthermore, the SR-IOV adapter 40 includes a PF 41*a*, the internal switch 42, a VNI conversion table 31*b*, and a VF group information definition table 31*c*. Furthermore, the internal switch 42 includes the multiple VFs 43 to 48.

Figures 29, 30, 31:
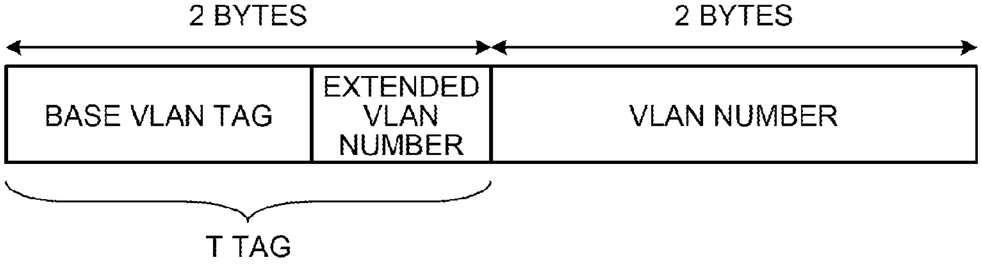
FIG. 29 is a schematic diagram illustrating an example of a VNI conversion table according to the fourth embodiment.
FIG. 30 is a schematic diagram illustrating an example of a VF group information definition table.
FIG. 31 is a schematic diagram illustrating an example of the format of a packet that is transmitted by an adapter according to the fourth embodiment.

The VNI conversion table 31*b* stores therein conversion information. For example, FIG. 29 is a schematic diagram illustrating an example of a VNI conversion table according to the fourth embodiment. As illustrated in FIG. 29, the VNI conversion table 31*b* stores therein, in an associated manner, a VNI that is allocated to each of the VMs 2*d* to 2*h*, a VLAN number that is used by each of the VMs 2*d* to 2*h*, and an extended VLAN number that is allocated to each of the VMs 2*d* to 2*h*.

In the example illustrated in FIG. 29, the VNI conversion table 31*b* stores therein, in an associated manner, the combination of the VNI "22", the VLAN number "10", and the extended VLAN number "100"; the combination of the VNI "34", the VLAN number "20", and the extended VLAN number "101"; and the combination of the VNI "50", the VLAN number "10", and the extended VLAN number "102". Furthermore, the VNI conversion table 31*b* can store therein an amount of conversion information corresponding to the number of VFs that are included in the internal switch 42.

Here, if a packet communication using a VXLAN is performed, an extended VLAN number needs to be retained in the inner header. Consequently, the management server 10*a* distributes conversion information, in which VNIs are associated with extended VLAN numbers, and the hypervisor 2*c* adds extended VLAN numbers that are used by VMs to the conversion information, whereby the management server 10*a* creates the VNI conversion table 31*b* illustrated in FIG. 29. Furthermore, the management server 10*a* may also store VNIs that are allocated to the VMs together with extended VLAN numbers and may distribute conversion information in which the VNIs, the extended VLAN numbers, and the VLAN numbers are associated.

A description will be given here by referring back to FIG. 28. The VF group information definition table 31*c* stores therein group information that indicates a group of VFs, i.e., VFs that are associated with communicable VMs, that is indicated by each of the extended VLAN numbers. For example, FIG. 30 is a schematic diagram illustrating an example of a VF group information definition table. As illustrated in FIG. 30, the VF group information definition table stores therein, in an associated manner, each extended VLAN number and group information.

The group information mentioned here is a bit string that indicates whether a VM that uses one of the VFs 43 to 48 included in the SR-IOV adapter 40 can perform packet communication. In the example illustrated in FIG. 30, the group information includes bits that are associated with the identifiers "1" to "6" of the VFs 43 to 48, respectively. Then, in the example illustrated in FIG. 30, the VF group information definition table 31*c* stores therein, in an associated manner, the extended VLAN "100" and the bit string "100110". Specifically, the VF group information definition table 31*c* stores therein information indicating that VMs that use the VFs 43, 46, and 47 whose identifiers are "1", "4", and "5", respectively, can exchange a packet in which the extended VLAN number "100" is retained.

Furthermore, the VF group information definition table 31*c* stores therein information indicating that VMs that use the VFs 44 and 48 whose identifiers are "2" and "6", respectively, can exchange a packet in which the extended VLAN number "101" is retained. Furthermore, the VF group information definition table 31*c* stores therein information indicating that a VM that uses the VF 45 whose identifier is "3" can exchange a packet in which the extended VLAN number "102" is retained.

A description will be given here by referring back to FIG. 28. The PF 41*a* creates the VF group information definition table 31*c* by using an extended VLAN for a VM that is associated with each VF. For example, for each extended VLAN number, the PF 41*a* identifies a VF that is associated with a VM to which the same extended VLAN number is allocated. Then, the PF 41*a* associates group information, in which a bit associated with the identified VF is set to "1", with an extended VLAN number and then retains the group information in the VF group information definition table 31*c*. Then, the PF 41*a* acquires, from the VNI conversion table 31*b*, the conversion information that includes therein an extended VLAN number of VMs that are associated with the VFs 43 to 48, respectively, and then allocates the acquired conversion information to each of the VFs 43 to 48.

The VF 43 performs the header conversion process on a packet that is exchanged by the VM 2*d*. Specifically, if the VF 43 receives a packet from the VM 2*d*, the VF 43 attaches a VLAN tag to the packet by using the conversion information allocated by the PF 41*a* and then retains the extended VLAN number. FIG. 31 is a schematic diagram illustrating an example of the format of a packet that is transmitted by an adapter according to the fourth embodiment.

As illustrated in FIG. 31, the VF 43 retains a base VLAN tag, an extended VLAN number, and a VLAN number in a 4-byte VLAN tag that is included in the inner header. Then, the VF 43 attaches an outer header that includes the VNI of the allocated conversion information to the packet, encapsulates the packet, and then transmits the encapsulated packet to the switch 3*a*. In the description below, a 2-byte tag that includes an extended VLAN number and a base VLAN tag is referred to as a T tag (tenant tag).

Furthermore, if the VF 43 receives a packet to which the T tag is attached from the switch 3*a*, the VF 43 acquires an extended VLAN number from the T tag in the received packet. Then, the VF 43 identifies, from the VF group information definition table 31*c*, the group information indicated by the acquired extended VLAN number and then determines whether a bit associated with the VF 43 in the identified group information is "1". If it is determined that the bit associated with the VF 43 in the identified group information is "1", the VF 43 determines that packet communication can be performed. Then, the VF 43 deletes the T tag in the packet by using the allocated conversion information and transmits the packet to the VM 2*d*.

Figure 32:
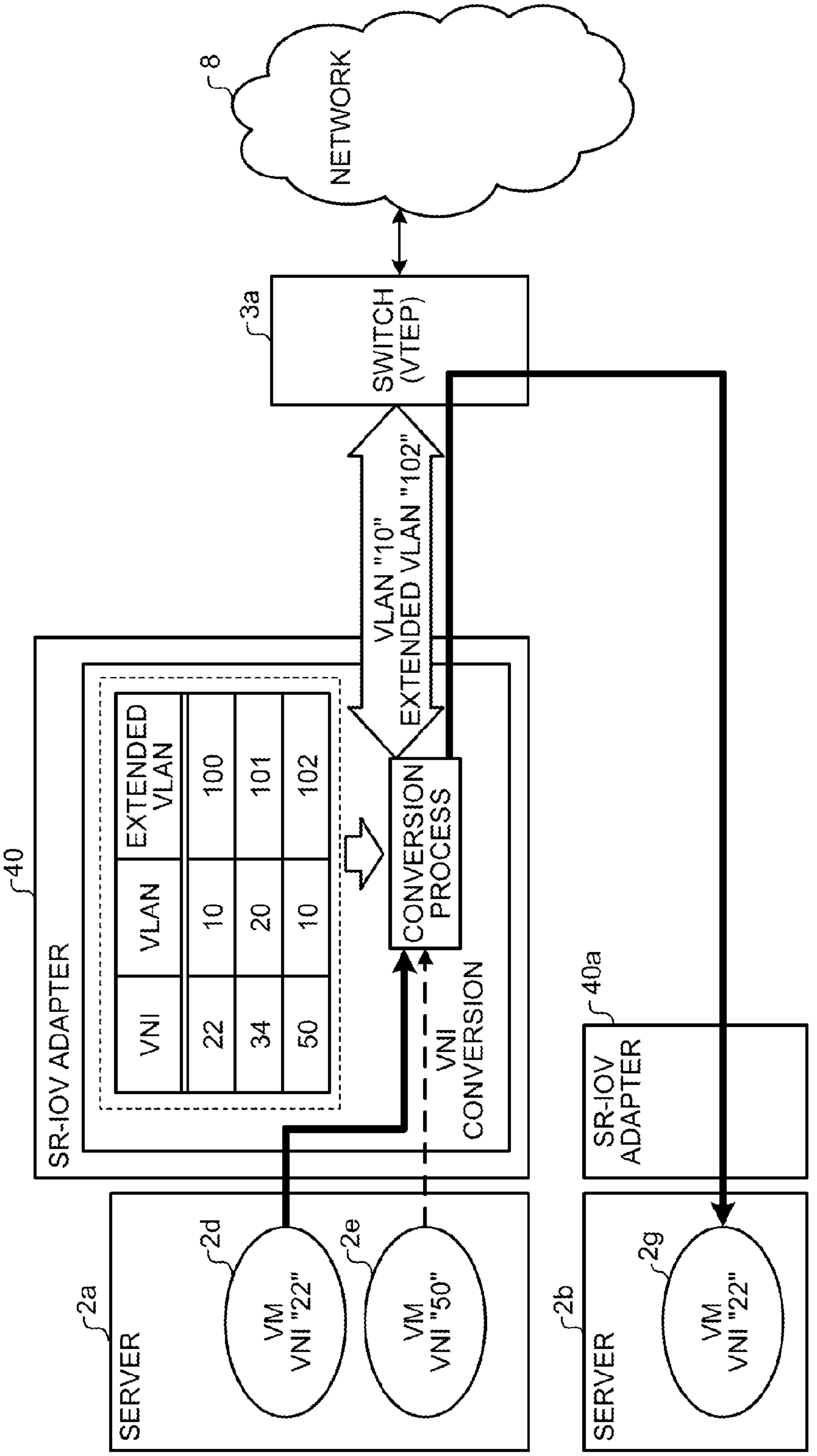
FIG. 32 is a schematic diagram illustrating an example of a process performed by an SR-IOV adapter according to the fourth embodiment.

In the following, an example of a process performed by the SR-IOV adapter 40 according to the fourth embodiment will be described with reference to FIG. 32. FIG. 32 is a schematic diagram illustrating an example of a process performed by an SR-IOV adapter according to the fourth embodiment. In the example illustrated in FIG. 32, each of the VFs 43 to 48 in the SR-IOV adapter 40 performs the header conversion process on VMs running on the server 2*a*. Furthermore, an SR-IOV adapter 40*a* is installed between the server 2*b* and the switch 3*a*.

Furthermore, the VM 2*d* uses the VLAN number "10" and the VNI "22" is allocated to the VM 2*d*. The VM 2*e* uses the VLAN number "10" and the VNI "50" is allocated to the VM 2*e*. The VM 2*g* uses the VLAN number "10" and the VNI "22" is allocated to the VM 2*g*. The extended VLAN number "100" is allocated to the VNI "22". The extended VLAN number "102" is allocated to the VNI "50".

For example, if the SR-IOV adapter 40 receives a packet from the VM 2*e*, the SR-IOV adapter 40 acquires, from the conversion information, the extended VLAN number "102" that is associated with both the VLAN number "10" of the VM 2*e* and the VNI "50". Then, the SR-IOV adapter 40 creates, in a packet, a T tag in which the extended VLAN number "102" is retained and then outputs the packet to the network 8 via the switch 3*a*.

In contrast, if the SR-IOV adapter 40 receives a packet to which the T tag is attached, the SR-IOV adapter 40 acquires the extended VLAN number "102" from the T tag in the received packet. Then, the SR-IOV adapter 40 identifies, from the VF group information definition table, the group information indicated by the acquired extended VLAN number, determines whether packet communication can be performed, and then deletes the T tag in the packet. If it is determined that the packet communication can be performed, the SR-IOV adapter 40 transmits the packet to the VM 2*e*.

Furthermore, if the VM 2*d* outputs a packet addressed to the VM 2*g*, the SR-IOV adapter 40 performs the conversion process by using the conversion information. Consequently, the SR-IOV adapter 40 transmits a packet in which the extended VLAN number "100" that is associated with both the VLAN number "10" and the VNI "22" is retained.

At this point, because the switch 3*a* performs the transfer process by using a destination MAC address, the VLAN number "10", and the extended VLAN number "100" that are stored in the packet, the switch 3*a* also stores the extended VLAN number in the MAC table 32. Then, the switch 3*a* performs the transfer process by using the destination MAC address, the VLAN number "10", and the extended VLAN number "100" that are retained in the packet. Consequently, the switch 3*a* transfers the packet to the VM 2*g* via the SR-IOV adapter 40*a*.

As described above, because the multi-tenant system 1 according to the fourth embodiment indicates a tenant that uses each virtual machine in a VLAN in which each of the VTEPs 3*b* and 5*b* performs the termination process, an extended VLAN number is attached instead of a VLAN number. Consequently, the multi-tenant system 1 according to the fourth embodiment can freely attach a VLAN number to a virtual machine that is used by each tenant.

Furthermore, if the multi-tenant system 1 according to the fourth embodiment indicates a tenant that uses virtual machines in a VLAN in which each of the VTEPs 3*b* and 5*b* performs the termination process, other information may also be attached. Specifically, because the multi-tenant system 1 according to the fourth embodiment indicates a tenant that uses virtual machines in a VLAN in which each of the VTEPs 3*b* and 5*b* performs the termination process, a double tag that uses both a VLAN number and an external VLAN number may also be used.

Figures 33, 34, 35:
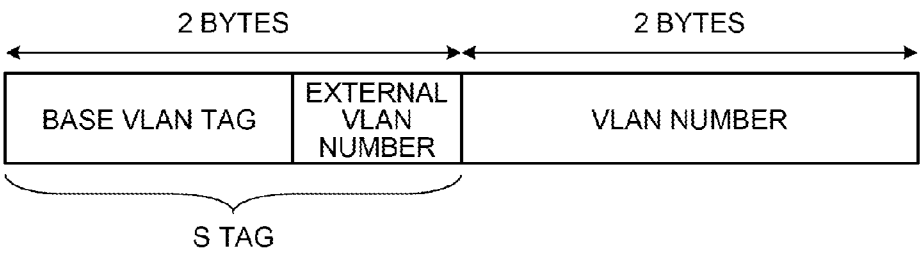
FIG. 33 is a schematic diagram illustrating an example of the variation in the VNI conversion table according to the fourth embodiment.
FIG. 34 is a schematic diagram illustrating an example of the variation in a VF group information definition table according to the fourth embodiment.
FIG. 35 is a schematic diagram illustrating an example of the variation in a packet according to the fourth embodiment.

For example, FIG. 33 is a schematic diagram illustrating an example of the variation in the VNI conversion table according to the fourth embodiment. In the example illustrated in FIG. 33, the VNI conversion table 31*b* stores therein a conversion table in which a VNI, a VLAN number, and an external VLAN number are associated with each other. Specifically, the VNI conversion table 31*b* stores therein information in which the extended VLAN number in the conversion information illustrated in FIG. 29 is replaced with the external VLAN number.

FIG. 34 is a schematic diagram illustrating an example of the variation in a VF group information definition table according to the fourth embodiment. In the example illustrated in FIG. 34, the VF group information definition table 31*c* stores therein, in an associated manner, group information and an external VLAN number. Specifically, the VF group information definition table 31*c* stores therein group information by associating it with an external VLAN number instead of the extended VLAN number illustrated in FIG. 30.

As illustrated in FIGS. 33 and 34, if the SR-IOV adapter 40 identifies, by using an external VLAN instead of an extended VLAN, a tenant that uses VMs in each VLAN, the SR-IOV adapter 40 retains an external VLAN number instead of an extended VLAN number in a VLAN tag. For example, FIG. 35 is a schematic diagram illustrating an example of the variation in a packet according to the fourth embodiment. As illustrated in FIG. 35, the SR-IOV adapter 40 retains, in the VLAN tag, a base VLAN tag, an external VLAN number, and a VLAN number.

Specifically, instead of the T tag illustrated in FIG. 31, the SR-IOV adapter 40 retains, in a packet, an S tag in which the base VLAN tag and the external VLAN number are retained. Consequently, the switch 3*a* performs the transfer process on a packet by using the destination MAC address, the external VLAN number in the S tag, and the VLAN number that are retained in the packet.

Figure 36:
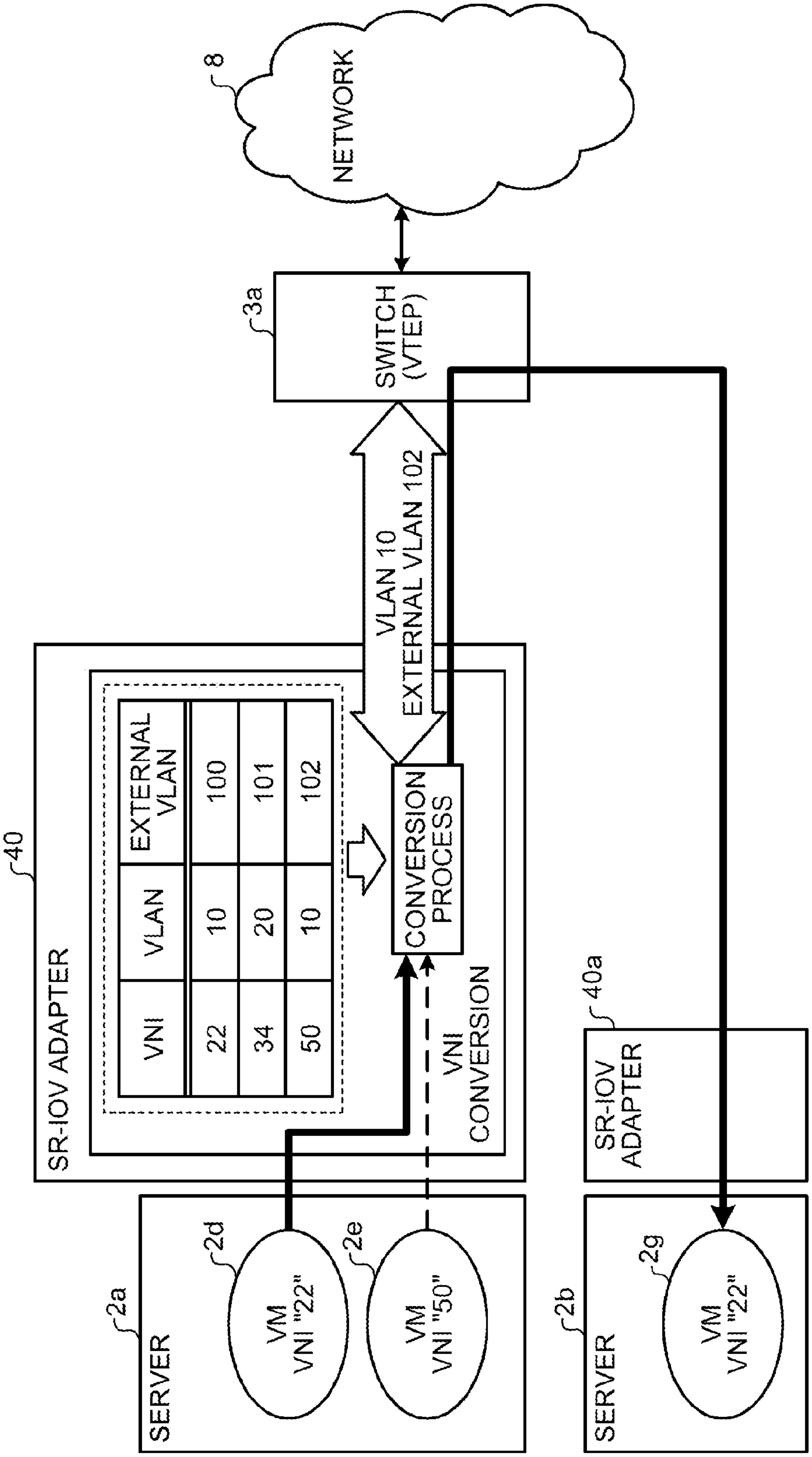
FIG. 36 is a schematic diagram illustrating an example of a process performed by the SR-IOV adapter according to the fourth embodiment.

In the following, the variation of the process performed by the SR-IOV adapter 40 according to the fourth embodiment will be described with reference to FIG. 36. FIG. 36 is a schematic diagram illustrating an example of a process performed by the SR-IOV adapter according to the fourth embodiment. In the example illustrated in FIG. 36, the VM 2*d* uses the VLAN number "10" and the VNI "22" is allocated to the VM 2*d*. The VM 2*e* uses the VLAN number "10" and the VNI "50" is allocated to the VM 2*e*. The VM 2*g* uses the VLAN number "10" and the VNI "22" is allocated to the VM 2*g*. The external VLAN number "100" is allocated to the VNI "22". The external VLAN number "102" is allocated to the VNI "50".

For example, if the SR-IOV adapter 40 receives a packet from the VM 2*e*, the SR-IOV adapter 40 attaches a double tag to the packet by using the external VLAN number "102" that is associated with both the VLAN number "10" and the VNI "50" and then outputs the packet to the network 8. In contrast, if the SR-IOV adapter 40 receives a packet to which a double tag is attached, the SR-IOV adapter 40 determines whether the packet can be transmitted by using the external VLAN number "102" and the VLAN number "10" that are associated with the VNI "50". If it is determined that the packet can be transmitted, the SR-IOV adapter 40 removes the double tag from the packet and then transmits the packet to the VM 2*e*.

Furthermore, the switch 3*a* performs the transfer process by using the destination MAC address, the VLAN number "10", and the external VLAN number "100" that are retained in the packet. Then, the switch 3*a* performs the transfer process by using the destination MAC address, the VLAN number "10", and the external VLAN number "100" that are retained in the packet.

Advantage of the Multi-Tenant System 1 According to the Fourth Embodiment

As described above, the multi-tenant system 1 allocates, to VMs, VNIs that indicate VMs across the multi-tenant system 1. Furthermore, the multi-tenant system 1 allocates, to the VMs in VLANs in which the VTEPs 3*b* and 5*b* perform the termination process, extended VLAN numbers or external VLAN numbers that indicate the tenants. Furthermore, the multi-tenant system 1 distributes conversion information, in which VNIs are associated with extended VLANs or associated with external VLANs, and then allows the VTEPs 3*b* and 5*b* to perform the conversion process.

Accordingly, in VLANs in which the VTEPs 3*b* and 5*b* perform the termination process, the multi-tenant system 1 can attach a given VLAN number to VMs that are used by each tenant. Consequently, in VLANs in which the VTEPs 3*b* and 5*b* perform the termination process, the multi-tenant system 1 can use VMs to which the same VLAN number is allocated and also identify tenants that use the VMs.

[e] Fifth Embodiment

In the above explanation, a description has been given of the embodiment according to the present invention; however, the embodiment is not limited thereto and can be implemented with various kinds of embodiments other than the embodiment described above. Therefore, another embodiment will be described as a fifth embodiment below.

(1) VTEP

In the first embodiment described above, the switches in the fabrics 3, 5, and 7 operate as VTEPs; however, the embodiment is not limited thereto. A given switch can be used as a VTEP in accordance with a combination of virtual machines used in a VLAN in which a VTEP performs the termination process.

Furthermore, multiple logical fabrics may also be accommodated in a single physical fabric and a VTEP may also be installed in each logical fabric. Furthermore, a VLAN number may also be allocated to a tenant that uses VMs running on a single server such that VLAN numbers are not overlapped with each other.

(2) Functional Configuration

Of the processes described in the embodiments, the whole or a part of the processes that are mentioned as being automatically performed can be manually performed, or the whole or a part of the processes that are mentioned as being manually performed can be automatically performed using known methods. Furthermore, the flow of the processes, the specific names, and the information containing various kinds of data or parameters indicated in the above specification and drawings can be arbitrarily changed unless otherwise stated.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. For example, an information processing apparatus running on a so-called cloud network executes a part of the function performed by the management servers 10 and 10*a*, thereby implementing the function performed by the management servers 10, 10*a*.

Furthermore, all or any part of the processing functions performed by each device can be implemented by a CPU and by programs analyzed and executed by the CPU or implemented as hardware by wired logic.

(3) Program

The various processes described in the above embodiments may also be implemented by a program prepared in advance and executed by a computer, such as a personal computer or a workstation. Accordingly, in the following, an example of a computer that executes a management program having the same function as that performed by the management server 10 will be described, as an example, with reference to FIG. 37.

Figure 37:
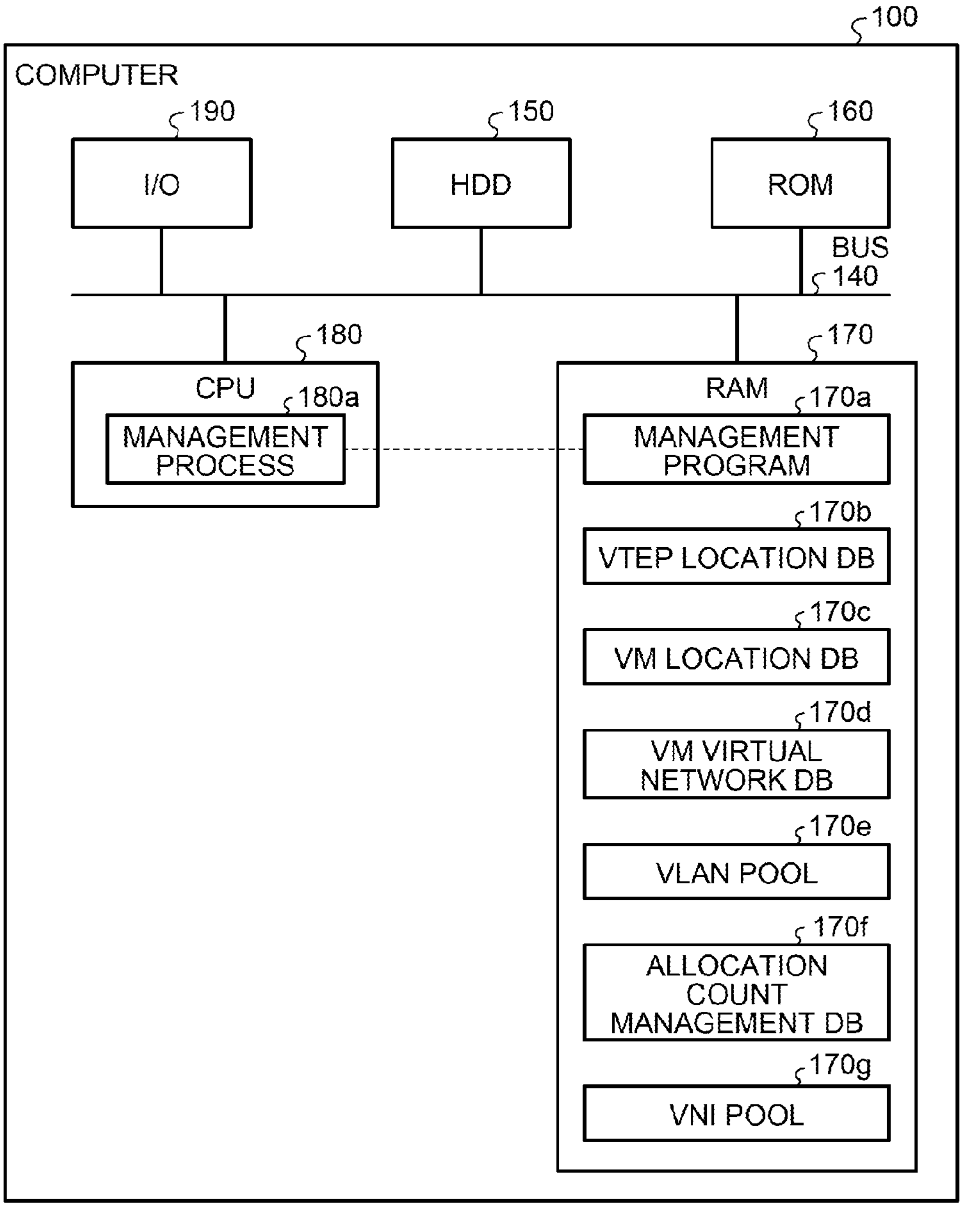
FIG. 37 is a block diagram illustrating an example of a computer that executes a management program.
Figure 38:
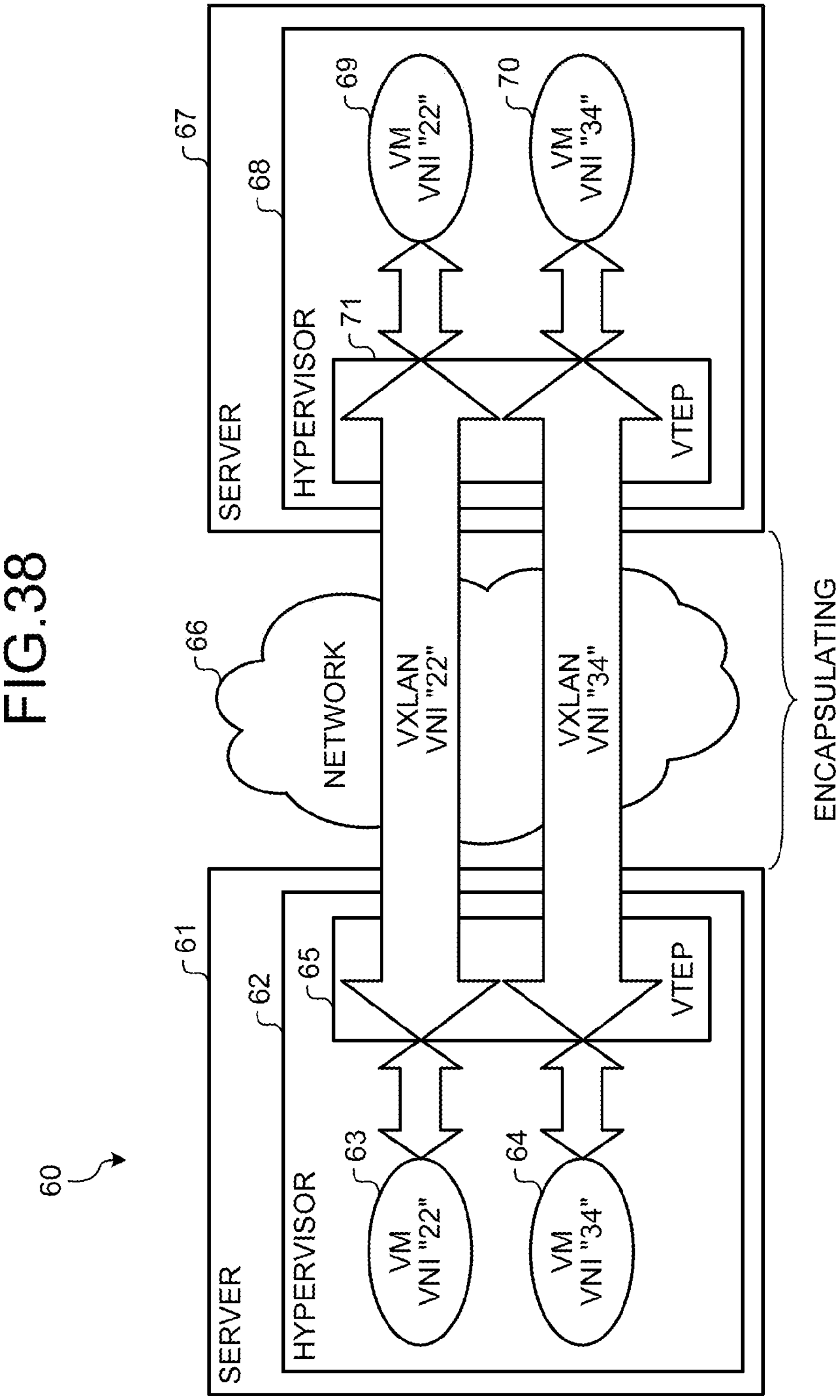
FIG. 38 is a schematic diagram illustrating a VXLAN.
Figure 39:
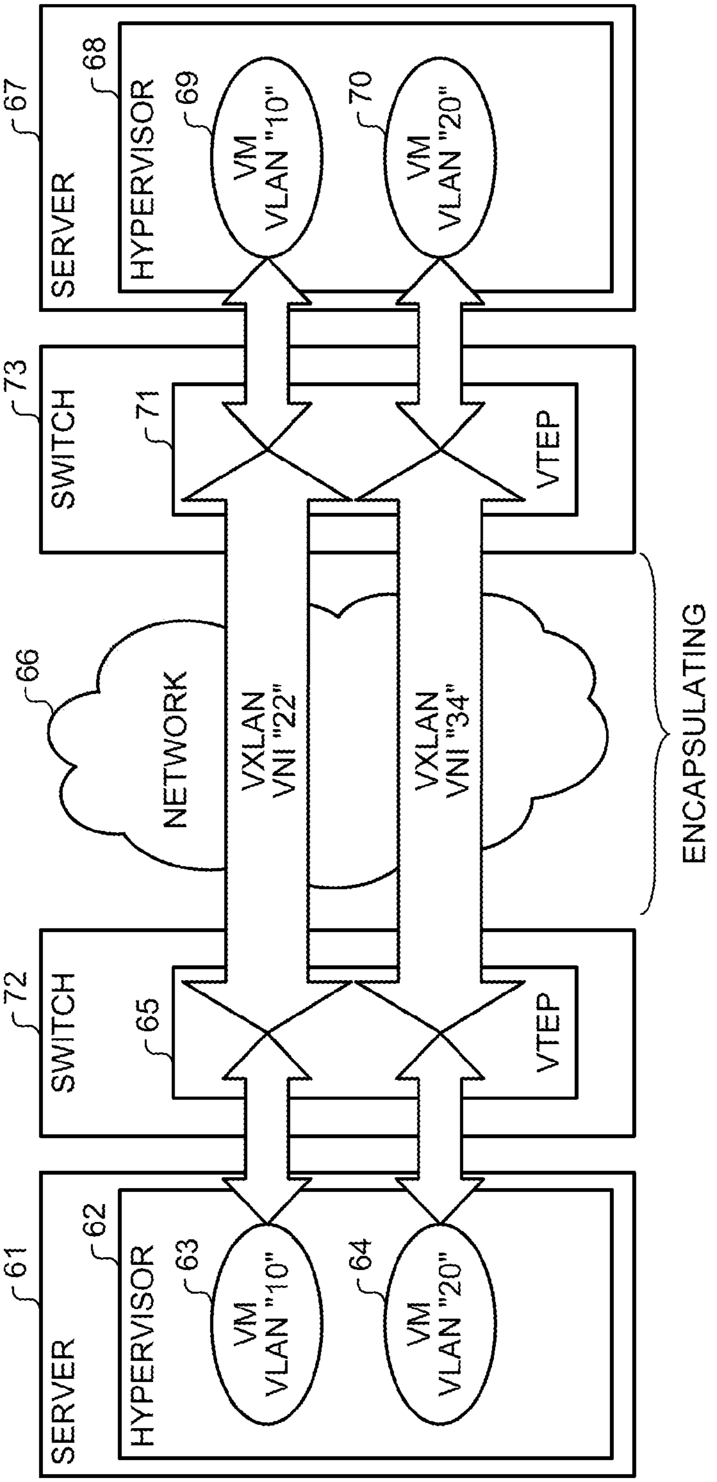
FIG. 39 is a schematic diagram illustrating the conversion of a VXLAN performed at switches.

FIG. 37 is a block diagram illustrating an example of a computer that executes a management program. As illustrated in FIG. 37, a computer 100 includes a hard disk drive (HDD) 150, a read only memory (ROM) 160, a random access memory (RAM) 170, a central processing unit (CPU) 180, and input/output (I/O) 190. The units 150 to 190 are connected via a bus 140.

The RAM 170 stores therein, in advance, a management program 170*a* that allows the CPU 180 to perform the function performed by the management server 10. Furthermore, The RAM 170 stores therein, in advance, a VTEP location DB 170*b*, a VM location DB 170*c*, a VM virtual network DB 170*d*, a VLAN pool 170*e*, an allocation count management DB 170*f*, and a VNI pool 170*g*. Similarly to the components described in the first embodiment, the management program 170*a* may also be integrated or separated.

The VTEP location DB 170*b*, the VM location DB 170*c*, and the VM virtual network DB 170*d* store therein the same information as that stored in the VTEP location DB 11, the VM location DB 12, and the VM virtual network DB 13, respectively, illustrated in FIG. 5. Furthermore, the VLAN pool 170*e*, the allocation count management DB 170*f*, and the VNI pool 170*g* store therein the same information as that stored in the allocation count management DB 15, the VNI pool 16, and the VLAN pool 14, respectively, illustrated in FIG. 5.

Then, the CPU 180 reads and loads the management program 170*a* to execute the program, thereby the management program 170*a* functions as a management process 180*a*. This management process 180*a* performs various processes from the RAM 170 on the basis of the VTEP location DB 170*b*, the VM location DB 170*c*, the VM virtual network DB 170*d*, the VLAN pool 170*e*, the allocation count management DB 170*f*, and the VNI pool 170*g*.

Furthermore, the CPU 180 that executed the management process 180*a* executes the same processes as those performed by the VM management unit 18, the VM network management unit 19, and the VTEP management unit 20. Furthermore, for processes virtually implemented in the CPU 180, not all of the processing unit is needed to be always operated in the CPU 180 as long as only a processing unit needed to be processed is virtually implemented.

Furthermore, the management program 170*a* described above does not need to be stored in the RAM 170 from the beginning. For example, the program is stored in a "portable physical medium", such as a flexible disk (FD), a compact disk (CD)-ROM, a digital video disk (DVD), a magneto-optic disk, an IC card, or the like that is to be inserted into the computer 100.

Then, the computer 100 may acquire and execute the program from the portable physical medium. Furthermore, the computer 100 may acquire the program stored in another computer or a server device via a public circuit, the Internet, a LAN, a wide area network (WAN), or the like and then execute the program.

In addition to the management program 170*a*, the computer 100 illustrated in FIG. 37 can execute a management program that has the same function as that performed, for example, by the management server 10*a*.

According to one aspect of an embodiment, it is possible to eliminate limitations on the number of VNIs that can be used when the conversion of a VLAN and a VXLAN is performed.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A multi-tenant system comprising:

multiple terminating devices each of which transfers, via a layer 3 (L3) network, a packet that is output from a virtual machine among a plurality of virtual machines included in the multi-tenant system and arranged in one of a plurality of layer 2 (L2) networks; and a management device that manages the multiple terminating devices, the management device including a first allocating unit that allocates, to each of the plurality of virtual machines, a first identifier that identifies, from among tenants included in the multi-tenant system, a tenant that uses the each of the plurality of virtual machines running on the multi-tenant system, a second allocating unit that allocates to each of the plurality of virtual machines, a second identifier that identifies, from among the tenants included in the multi-tenant system, a tenant that uses the each of the plurality of virtual machines running on the multi-tenant system, the second identifier being set independently for each of the multiple terminating devices, the second allocating unit allocates a same second identifier to more than one virtual machines used by a same tenant and included in a same L2 network, a creating unit that creates, for each of the multiple terminating devices, conversion information in which the first identifier that is allocated to each of the virtual machines by the first allocating unit is associated with the second identifier that is allocated to each of the virtual machines by the second allocating unit, and a distributing unit that distributes the conversion information created by the creating unit to each of the multiple terminating devices, and each of the multiple terminating devices includes a storing unit that stores therein the conversion information distributed by the distributing unit, an acquiring unit that acquires, from the conversion information stored in the storing unit when the acquiring unit receives a packet, one of a first identifier that is associated with a second identifier included in an outer header of the received packet, and a second identifier that is associated with a first identifier included in an inner header of the received packet, a converting unit that, when the acquiring unit acquires the second identifier, attaches, to the received packet, an outer header that includes the second identifier acquired by the acquiring unit and encapsulates the packet, and, when the acquiring unit acquires the first identifier, deletes the second identifier in the outer header and changes the first identifier in the inner header of the received packet to the first identifier acquired by the acquiring unit, and a transmitting unit that transmits the packet encapsulated by the converting unit to a terminating device via the L3 network, the converting unit does not encapsulate the received packet when a same second identifier is allocated to both the virtual machine that transmitted the received packet and a virtual machine to which the received packet is addressed, and the transmitting unit transmits the received packet to the L3 network when the received packet is encapsulated by the converting unit, and transmits the received packet to the L2 network when the received packet is not encapsulated by the converting unit.

2. The multi-tenant system according to claim 1, wherein when the acquiring unit receives the encapsulated packet from one of the multiple terminating devices, the acquiring unit acquires, from the conversion information stored in the storing unit, a second identifier that is associated with the first identifier included in the encapsulated packet, the converting unit converts the encapsulated packet to a packet that is addressed to a virtual machine that is identified by the second identifier acquired by the acquiring unit, and the transmitting unit transmits the packet addressed to the virtual machine via the L2 network in which the terminating device which receives the encapsulated packet is installed.

3. The multi-tenant system according to claim 1, wherein the management device includes an identifier storing unit that stores therein, in an associated manner, a terminating device identifier that identifies one of the multiple terminating devices and a second identifier that is not allocated to a virtual machine running on one of the L2 networks in which the one of the multiple terminating devices is installed, and when a virtual machine used by a new tenant is to be run, the second allocating unit selects, from among second identifiers that are stored in the identifier storing unit and that are associated with terminating device identifiers of the terminating devices installed in the L2 network in which the virtual machine used by the new tenant is running, a second identifier that is allocated to the virtual machine that is used by the new tenant and then allocates the selected second identifier to the virtual machine that is used by the new tenant.

4. The multi-tenant system according to claim 3, wherein the management device includes a use count storing unit that stores therein, in an associated manner, the terminating device identifiers, the second identifiers that are allocated to the virtual machines running on the L2 network in which the terminating devices indicated by the terminating device identifiers are installed, and the number of virtual machines that use the second identifiers that are allocated to the virtual machines running on the L2 network, a subtracting unit that subtracts, when a virtual machine is made to stop, 1 from the number of virtual machines that is stored in the use count storing unit and that is associated with both a second identifier, which is allocated to the virtual machine to be stopped, and a terminating device identifier, which indicates one of the terminating devices installed in the L2 network in which the virtual machine to be stopped is running, and a retaining unit that, when the number of virtual machines is zero, retains, in an associated manner in the identifier storing unit, the second identifier that is allocated to the virtual machine to be stopped and the terminating device identifiers that indicate the terminating devices installed in the L2 network in which the virtual machine to be stopped is running.

5. The multi-tenant system according to claim 1, wherein a VLAN number, an extended VLAN number, or an external VLAN number used in the L2 networks is used as the second identifier.

6. The multi-tenant system according to claim 1, wherein the terminating devices each include multiple converting units that are associated with the virtual machines running on the plurality of L2 network in which the terminating devices are installed, the acquiring unit acquires, from the conversion information, a first identifier that is associated with the second identifier that is allocated to a virtual machine that is associated with one of the converting units and notifies each of the converting units of the acquired first identifier, and the converting unit encapsulates, by using the first identifier that is received from the acquiring unit as a notification, a packet that is output by the associated virtual machine.

7. A non-transitory computer-readable recording medium having stored therein a management program causing a computer to execute a process comprising:

allocating a first identifier to each of a plurality of virtual machines included in a multi-tenant system and arranged in one of a plurality of layer 2 (L2) networks, the first identifier identifying, from among tenants included in the multi-tenant system, a tenant that uses the each of the plurality of virtual machines running on the multi-tenant system;

allocating a second identifier to each of the plurality of virtual machines, where the second identifier identifies, from among the tenants included in the multi-tenant system, a tenant that uses the each of the plurality of virtual machines running on the multi-tenant system, the second identifier being set independently for each of multiple terminating devices arranged respectively in the plurality of L2 networks, the second allocating unit allocates a same second identifier to more than one virtual machines used by a same tenant and included in a same L2 network;

creating, for each of the multiple terminating devices, conversion information in which the first identifier is associated with the second identifier that is allocated to each of the virtual machines; and setting each of the multiple terminating devices such that each of the multiple terminating devices (i) acquires, from the created conversion information when a packet is received, one of a first identifier that is associated with a second identifier included in an outer header of the received packet, and a second identifier that is associated with a first identifier included in an inner header of the received packet, (ii-a) when acquiring the second identifier, attaches, to the received packet, an outer header that includes the acquired second identifier and encapsulates the packet, and, (ii-b) when acquiring the first identifier, deletes the second identifier in the outer header and changes the first identifier in the inner header of the received packet to the acquired first identifier; and; and outputting a packet to the layer 3 network when the packet is encapsulated, and outputting a packet to the layer 2 network when the packet is not encapsulated.

8. A control method of a multi-tenant system that includes multiple terminating devices that transfer, via a layer 3 (L3) network, a packet output from a virtual machine among a plurality of virtual machines included in the multi-tenant system and arranged in one of a plurality of layer 2 (L2) network, and that includes a management device that manages the multiple terminating devices, the control method of the multi-tenant system comprising:

firstly allocating by the management device, to each of the plurality of virtual machines, a first identifier that identifies, from among tenants included in the multi-tenant system, a tenant that uses the each of the plurality of virtual machines running on the multi-tenant system;

secondly allocating by the management device, to each of the plurality of virtual machines, a second identifier that identifies, from among tenants included in the multi-tenant system, a tenant that uses the each of the plurality of virtual machines running on the multi-tenant system, the second identifier being set independently for each of the multiple terminating devices, the second allocating unit allocates a same second identifier to more than one virtual machines used by a same tenant and included in a same L2 network;

creating by the management device, for each of the multiple terminating devices, conversion information in which the first identifier that is allocated to each of the virtual machines at the firstly allocating is associated with the second identifier that is allocated at the secondly allocating to each of the virtual machines;

distributing by the management device, the conversion information created at the creating to each of the multiple terminating devices;

storing by each of the multiple terminating devices, the conversion information distributed at the distributing;

acquiring by the terminating device, from the conversion information stored at the storing when the terminating device receives a packet, one of a first identifier that is associated with a second identifier included in an outer header of the received packet, and a second identifier that is associated with a first identifier included in an inner header of the received packet;

attaching by the terminating device, when acquiring the second identifier at the acquiring, an outer header that includes the second identifier acquired at the acquiring to the received packet and encapsulating the packet, and, when acquiring the first identifier at the acquiring, deleting the second identifier in the outer header and changing the first identifier in the inner header of the received packet to the first identifier acquired at the acquiring; and transmitting by the terminating device, the encapsulated packet to a terminating device via the L3 network, the attaching by the terminating device includes not encapsulating the received packet when a same second identifier is allocated to both the virtual machine that transmitted the received packet and a virtual machine to which the received packet is addressed, and the transmitting transmits the received packet to the L3 network when the received packet is encapsulated in the attaching, and transmits the received packet to the L2 network when the received packet is not encapsulated in the attaching.

* * * * *